US010255763B2

(12) United States Patent
Washington et al.

(10) Patent No.: US 10,255,763 B2
(45) Date of Patent: Apr. 9, 2019

(54) INTERACTIVE EVENT OUTCOME REVEAL TECHNIQUES IMPLEMENTED IN WAGER-BASED VIDEO GAMES AND NON WAGER-BASED VIDEO GAMES

(71) Applicant: SYNERGY BLUE, LLC, Palm Desert, CA (US)

(72) Inventors: Georg Washington, Rancho Mirage, CA (US); Joe Serra, Palm Desert, CA (US)

(73) Assignee: Synergy Blue, LLC, Palm Desert, CA (US)

( * ) Notice: Subject to any disclaimer, the term of this patent is extended or adjusted under 35 U.S.C. 154(b) by 0 days.

(21) Appl. No.: 15/635,109

(22) Filed: Jun. 27, 2017

(65) Prior Publication Data

US 2017/0294081 A1 Oct. 12, 2017

Related U.S. Application Data

(63) Continuation-in-part of application No. 14/865,538, filed on Sep. 25, 2015, now Pat. No. 9,542,799.

(60) Provisional application No. 62/356,239, filed on Jun. 29, 2016, provisional application No. 62/091,451, filed on Dec. 12, 2014, provisional application No. 62/127,821, filed on Mar. 3, 2015.

(51) Int. Cl.

| | |
|---|---|
| ***G07F 17/32*** | (2006.01) |
| ***A63F 13/837*** | (2014.01) |
| ***A63F 13/69*** | (2014.01) |
| ***A63F 13/822*** | (2014.01) |
| ***A63F 13/352*** | (2014.01) |

(52) U.S. Cl.

CPC ........ *G07F 17/3267* (2013.01); *A63F 13/352* (2014.09); *A63F 13/69* (2014.09); *A63F 13/822* (2014.09); *A63F 13/837* (2014.09); *G07F 17/32* (2013.01); *G07F 17/3209* (2013.01); *G07F 17/3213* (2013.01); *G07F 17/3227* (2013.01); *G07F 17/3251* (2013.01); *G07F 17/3288* (2013.01); *G07F 17/3286* (2013.01)

(58) Field of Classification Search

CPC ............. G07F 17/3209; G07F 17/3262; G07F 17/3267

See application file for complete search history.

(56) References Cited

U.S. PATENT DOCUMENTS 6,672,960 B1 * 1/2004 B-Jensen ............ G07F 17/3211 463/16
7,252,591 B2 * 8/2007 Van Asdale ............ G07F 17/32 463/20
8,062,115 B2 * 11/2011 Thomas .................. G07F 17/32 463/16
8,430,737 B2 * 4/2013 Saunders ........... G07F 17/3211 463/16
9,005,022 B2 * 4/2015 Saunders ........... G07F 17/3211 463/16

(Continued)

OTHER PUBLICATIONS

International Search Report, PCT/US2017/039581, dated Sep. 7, 2017.

*Primary Examiner* — David Duffy

(74) *Attorney, Agent, or Firm* — Wolf IP Law PLLC; Dena E. Wolf, Esq.

(57) ABSTRACT

Various techniques are disclosed for implementing different types interactive event outcome reveal techniques during play of wager-based games and/or non-wager-based games conducted at an electronic gaming device of a gaming network.

18 Claims, 26 Drawing Sheets

1806
1806
1804

(56) References Cited

U.S. PATENT DOCUMENTS

2002/0094857 A1* 7/2002 Meyer ................. G07F 17/3265 463/16
2002/0160825 A1* 10/2002 Nicastro ................. A63F 13/12 463/9
2004/0023714 A1* 2/2004 Asdale .................... G07F 17/32 463/22
2006/0178199 A1* 8/2006 Thomas .................. G07F 17/32 463/20
2009/0117983 A1 5/2009 Visser
2009/0191946 A1* 7/2009 Thomas .................. G07F 17/32 463/20
2011/0042896 A1* 2/2011 Napolitano ......... G07F 17/3267 273/269
2011/0111843 A1* 5/2011 Nicely .................... G07F 17/32 463/27
2011/0281630 A1* 11/2011 Omar ...................... G06F 21/33 463/17
2011/0294561 A1* 12/2011 Shaw ...................... G07F 17/32 463/20
2011/0306416 A1* 12/2011 Kelly ...................... G07F 17/32 463/31
2013/0023325 A1* 1/2013 Saunders ................ G07F 17/32 463/20
2013/0023328 A1* 1/2013 Saunders ............ G07F 17/3211 463/20
2014/0011567 A1 1/2014 Penacho
2014/0080566 A1* 3/2014 Lovell, Sr. .............. G07F 17/32 463/18
2014/0315614 A1* 10/2014 Granich .............. G07F 17/3209 463/17
2015/0325078 A1 11/2015 Alsip
2017/0228973 A1* 8/2017 Ovalle ................ G07F 17/3223
2017/0228985 A1* 8/2017 Berman .............. G07F 17/3267

* cited by examiner

INTERACTIVE EVENT OUTCOME REVEAL TECHNIQUES IMPLEMENTED IN WAGER-BASED VIDEO GAMES AND NON WAGER-BASED VIDEO GAMES

RELATED APPLICATION DATA

The present application claims benefit, pursuant to the provisions of 35 U.S.C. § 119, of U.S. Provisional Application Ser. No. 62/356,239, titled "INTERACTIVE EVENT OUTCOME REVEAL TECHNIQUES IMPLEMENTED IN WAGER-BASED VIDEO GAMES AND NON-WAGER-BASED VIDEO GAMES", naming Washington et al. as inventors, and filed 29 Jun. 2016, the entirety of which is incorporated herein by reference for all purposes.

This application is a continuation-in-part (CIP) application, pursuant to the provisions of 35 U.S.C. § 120, of prior U.S. patent application Ser. No. 14/865,538, issued as U.S. Pat. No. 9,542,799 on 10 Jan. 2017) titled "HYBRID ARCADE-TYPE, WAGER-BASED GAMING TECHNIQUES AND PREDETERMINED RNG OUTCOME BATCH RETRIEVAL TECHNIQUES" by Washington et al., filed on 25 Sep. 2015, the entirety of which is incorporated herein by reference for all purposes.

U.S. patent application Ser. No. 14/865,538 claims benefit, pursuant to the provisions of 35 U.S.C. § 119, of U.S. Provisional Application Ser. No. 62/091,451, titled "HYBRID ARCADE-TYPE, WAGER-BASED GAMING TECHNIQUES", naming Washington et al. as inventors, and filed 12 Dec. 2014, the entirety of which is incorporated herein by reference for all purposes.

U.S. patent application Ser. No. 14/865,538 also claims benefit, pursuant to the provisions of 35 U.S.C. § 119, of U.S. Provisional Application Ser. No. 62/127,821, titled "RPG AND SPORTS THEMED HYBRID ARCADE-TYPE, WAGER-BASED GAMING TECHNIQUES", naming Washington et al. as inventors, and filed 3 Mar. 2015, the entirety of which is incorporated herein by reference for all purposes.

The present Application is a continuation-in-part (CIP) application of pending International Patent Application No. PCT/US17/39581, titled "INTERACTIVE EVENT OUTCOME REVEAL TECHNIQUES IMPLEMENTED IN WAGER-BASED VIDEO GAMES AND NON-WAGER-BASED VIDEO GAMES", naming Washington et al. as inventors, filed on 27 Jun. 2017, designating the United States, the entirety of which is incorporated herein by reference for all purposes.

BACKGROUND

U.S. patent application Ser. No. 14/865,538 (herein "Parent Application") discloses various aspects for implementing hybrid arcade/wager-based gaming techniques in casino gaming networks, in which the hybrid arcade/wager-based game may include a non-wager based gaming portion and a wager-based gaming portion. A player engaged in play of the hybrid arcade/wager-based game is able to concurrently engage in continuous game play of the non-wager based gaming portion during execution of wager-based gaming events which are automatically triggered based on events which occur during play of the non-wager based gaming portion. One of the benefits of the hybrid arcade/wager-based gaming techniques disclosed in the Parent Application is that various hybrid arcade/wager-based game embodiments may be configured or designed such that the outcomes and/or payouts of the wager-based game events are not dependent on, or influenced by, the level of skill of the player. Accordingly, many of the hybrid arcade/wager-based game embodiments disclosed in the Parent Application may be characterized (e.g., from a regulatory perspective) as games of chance since, for example, in at least some embodiments, the wager-based game events are implemented as a RNG-based games of chance. In at least some embodiments described in the Parent Application, the outcome of at least one wager-based game event occurring in the hybrid arcade/wager-based game may be predetermined before initiation of the wager-based game event, and the outcome of the wager-based game event may be subsequently revealed to the player in response to input provided by the player during play of the hybrid arcade/wager-based game. In other embodiments, the outcome of at least one wager-based game event occurring in the hybrid arcade/wager-based game may be determined after initiation of the wager-based game event, and the outcome of the wager-based game event may be subsequently revealed to the player in response to input provided by the player during play of the hybrid arcade/wager-based game.

DETAILED DESCRIPTION OF EXAMPLE EMBODIMENTS

Overview

Figure 1:
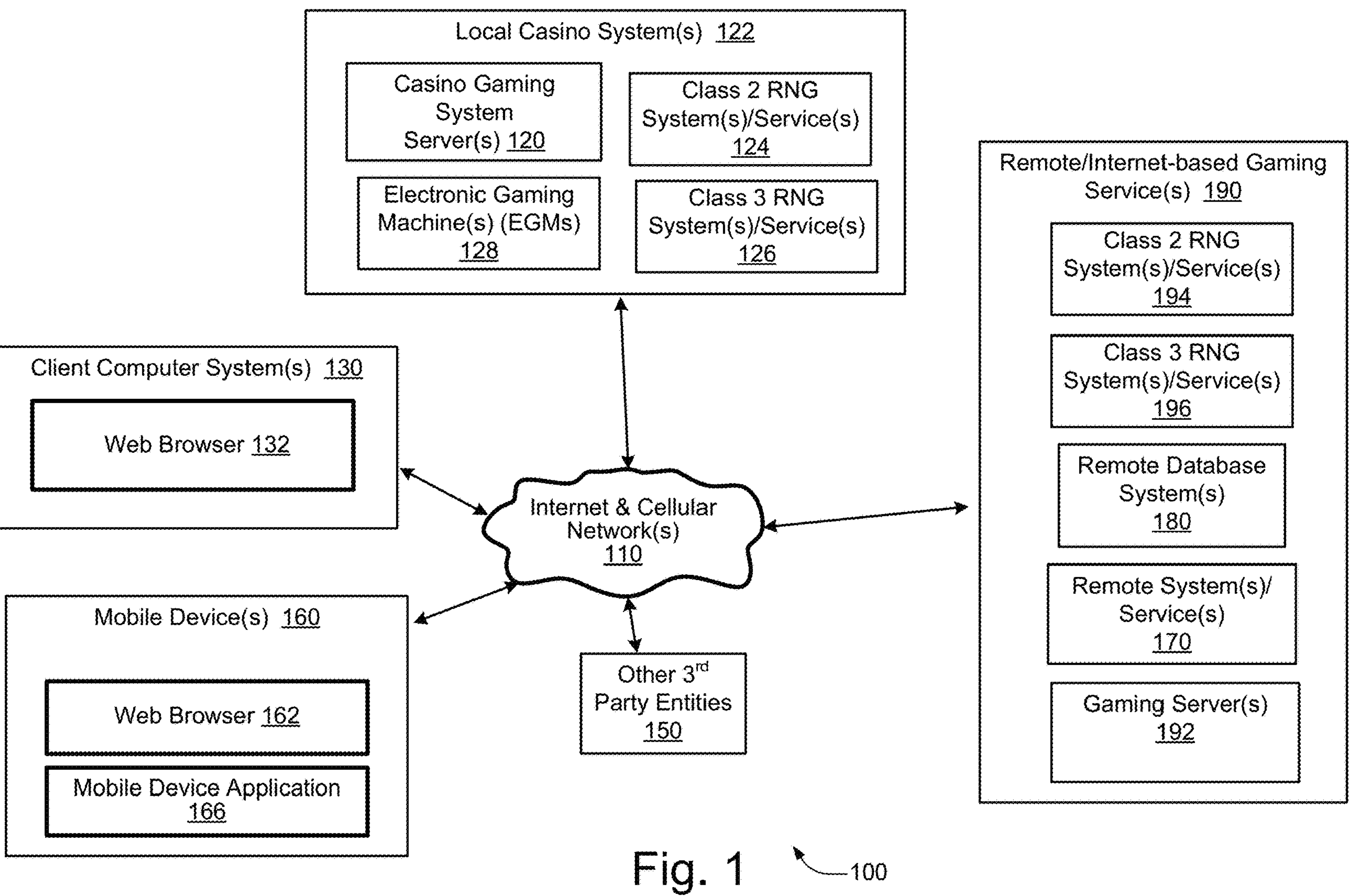
FIG. 1 illustrates a simplified block diagram of a specific example embodiment of a Gaming Network 100 which may be configured or designed to implement various hybrid arcade/wager-based gaming techniques described and/or referenced herein.

Recognizing that the revealing of game event outcome(s) to players provides entertainment value, various aspects described herein are directed to different types of interactive event outcome reveal techniques implemented in both wager-based video games and non-wager-based video games.

In at least one embodiment, various method(s), system(s) and/or computer program product(s) may be operable to cause at least one processor to execute a plurality of instructions to: enable a player to engage in interactive game play of a hybrid arcade/wager-based game at a first EGD, wherein the hybrid arcade/wager-based game includes a non-wager based gaming portion and a wager-based gaming portion; link a first predetermined wager-based game event outcome to a first in-game event which may occur during play of the non-wager based game portion; detect an occurrence of the first in-game event in the non-wager based game portion; determine if the occurrence of the first in-game event qualifies as a wager-based triggering event; if it is determined that the occurrence of the first in-game event qualifies as a wager-based triggering event, initiate a first wager-based game event; automatically fund an amount wagered on the first wager-based game event; and reveal, after initiation of the first wager-based game event, the first predetermined wager-based game event outcome as an outcome of the first wager-based game event.

Additional method(s), system(s) and/or computer program product(s) may be further operable to cause at least one processor to execute additional instructions to: enable the player to concurrently engage in continuous game play of the non-wager based gaming portion of the hybrid arcade/wager-based game during execution of the first wager-based game event.

Additional method(s), system(s) and/or computer program product(s) may be further operable to cause at least one processor to execute additional instructions to: analyze the first wager-based game event outcome to determine whether or not to automatically modify an availability of at least one resource or attribute of the non-wager based gaming portion; if the first wager-based game event outcome satisfies a first set of conditions, automatically modify an availability of at least one resource or attribute of the non-wager based gaming portion; if the first wager-based game event outcome does not satisfy the first set of criteria, not perform modification of the at least one resource or attribute of the non-wager based gaming portion in response to the first wager-based game event outcome.

Additional method(s), system(s) and/or computer program product(s) may be further operable to cause at least one processor to execute additional instructions to: analyze the first wager-based game event outcome to determine whether or not a non-wager based gaming award should be distributed at the non-wager based gaming portion; if the first wager-based game event outcome satisfies a first set of criteria, automatically cause the non-wager based gaming award to be distributed at the non-wager based gaming portion; and wherein the distribution of the non-wager based gaming award includes causing at least one component of the gaming network to modify at least one in-game resource or attribute which is available for use by an in-game character during play of the non-wager based gaming portion.

Additional method(s), system(s) and/or computer program product(s) may be further operable to cause at least one processor to execute additional instructions to: automatically retrieve a first batch of predetermined wager-based game event outcomes from a first RNG engine; and select the first wager-based game event outcome from the first batch of predetermined wager-based game event outcomes.

According to different embodiments, various method(s), system(s) and/or computer program product(s) are described for implementing various types interactive event outcome reveal techniques during play of wager-based games and/or non-wager-based games conducted in a gaming network. In at least one embodiment, the gaming network includes a first electronic, wager-based gaming device ("first EGD") having a first display and a first input interface. In at least one embodiment, at least one processor may be configured or designed to execute a plurality of instructions stored in a memory for causing at least one component of the gaming network to: enable a player to engage in a first interactive gaming session of a wager-based game conducted at the first EGD; initiate, during the first interactive gaming session, a first wager-based game event at the first EGD; determine an event outcome of the first wager-based game event, the event outcome having associated therewith game event outcome content; obscure or prevent a display of a first portion of the game event outcome content at the first display; display, at a first region of the first display, and prior to displaying the first portion of game event outcome content, a first portion of interactive reveal region content; determine if the player has performed a first interaction activity with the first portion of interactive reveal region content; and cause the first portion of game event outcome content to be displayed or revealed at the first display in response to determining that the player has performed the first interaction activity with the first portion of interactive reveal region content.

Additional method(s), system(s) and/or computer program product(s) may be further operable to cause at least one processor to execute instructions stored in the memory to: maintain the obscuring of the first portion of game event outcome until a first condition has been detected at the first EGD; and wherein the first condition corresponds to determining that the player has performed the first interaction activity with the first portion of interactive reveal region content.

Additional method(s), system(s) and/or computer program product(s) may be further operable to cause at least one processor to execute instructions stored in the memory to: obscure or prevent a display of a second portion of the game event outcome content at the first display; display, at a second region of the first display, and prior to displaying the second portion of game event outcome content, a second portion of interactive reveal region content; determine if the player has performed a second interaction activity with the second portion of interactive reveal region content; and cause the second portion of game event outcome content to be displayed or revealed at the first display in response to determining that the player has performed the second interaction activity with the second portion of interactive reveal region content.

In at least some embodiments, the first display is configured as a touchscreen display, and the first interaction activity includes at least one activity selected from a group consisting of: tapping or touching a region of the touchscreen display where the first interactive reveal region content is displayed; and swiping across a region of the touchscreen display where the first interactive reveal region content is displayed.

In at least some embodiments, first display is configured as a touchscreen display, and at least one processor may be configured or designed to execute instructions stored in the memory to: display, at a second region of the first display, and prior to displaying the second portion of game event outcome content, a second portion of interactive reveal region content; determine if the player has performed a second interaction activity with the second portion of interactive reveal region content; cause the second portion of game event outcome content to be displayed or revealed at the first display in response to determining that the player has performed the second interaction activity with the second portion of interactive reveal region content; wherein the first interaction activity includes at least one activity selected from a group consisting of: tapping or touching a region of the touchscreen display where the first portion of interactive reveal region content is displayed; and swiping across a region of the touchscreen display where the first portion of interactive reveal region content is displayed; and wherein the second interaction activity includes at least one activity selected from a group consisting of: tapping or touching a region of the touchscreen display where the second portion of interactive reveal region content is displayed; and swiping across a region of the touchscreen display where the second portion of interactive reveal region content is displayed.

In some embodiments, the first wager-based game event corresponds to a spin of at least one virtual slot reel, and at least one processor may be configured or designed to execute instructions stored in the memory to: determine the outcome of the virtual slot reel spin event, the virtual slot reel spin event outcome having associated therewith a first set of slot reel symbols including a first slot reel symbol; obscure or prevent display of an identity of the first slot reel symbol at the first display; and cause the identity of first slot reel symbol to be displayed or revealed at the first display in response to determining that the player has performed the first interaction activity with the first portion of interactive reveal region content.

In some embodiments, the first wager-based game event corresponds to a dealing of at least one virtual playing card, and at least one processor may be configured or designed to execute instructions stored in the memory to: determine the outcome of the playing card dealing event, the playing card dealing event outcome having associated therewith a first set of virtual playing cards, including a first virtual playing card; obscure or prevent display of an identity of the first virtual playing card at the first display; and cause the identity of the first virtual playing card to be displayed or revealed at the first display in response to determining that the player has performed the first interaction activity with the first portion of interactive reveal region content.

In some embodiments, the game event outcome content includes payout content representing a payout amount associated with the first wager-based game event, and at least one processor may be configured or designed to execute instructions stored in the memory to: obscure or prevent a display of a first portion of the payout content at the first display; and cause the first portion of the payout content to be displayed or revealed at the first display in response to determining that the player has performed the first interaction activity with the first portion of interactive reveal region content.

In some embodiments, the player's interaction with the first portion of interactive reveal region content does not influence the outcome of the wager-based game event. In other embodiments, the player's interaction with the first portion of interactive reveal region content influences the outcome of the first wager-based game event.

In some embodiments, the player's interaction with the first portion of interactive reveal region content influences a payout or win amount associated with the first wager-based game event. In other embodiments, the player's interaction with the first portion of interactive reveal region content does not influence a payout or win amount associated with the first wager-based game event.

In some embodiments, the first EGD includes a first bill or ticket acceptor, and at least one processor may be configured or designed to execute instructions stored in the memory to: establish an account balance using at least a portion of cash or credit received via the first bill or ticket acceptor; and automatically fund an amount wagered on the first wager-based game event using the account balance.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Currently existing slot machine technology is dated and lacking younger demographics due to the same format of gambling gameplay element displays. Problems with existing slot machine and video-based casino gaming technology include: the gambling gameplay display method, and the player interaction method with the gambling game elements using a slot machine.

Veteran gamblers (e.g., older gambler demographic age 50+) have been accustomed to a standard set of video gaming symbols (e.g., A, J, K, Q) which, for example, may be accompanied with a multitude of additional themed symbols (e.g., animals, fantasy creatures, media personas, etc.) presented on a series of wheels or drums. Newer technology has made possible the use of digital display screens that present the reels and symbols in a digital format. Younger generations of gamblers (e.g., herein referred to as "gamers"), on the other hand, have been accustomed to increasingly intense and graphically glorified 2D & 3D world environments where an untold amount of possibilities may arise. These gamers, who are used to fast paced, energetic, and visually stunning games, feel that the display method of the traditional slot machines are "boring." As for the veteran gamblers, they feel that the fast paced, new aged action, is "too much."

Veteran gamblers have experienced player interaction in a few different ways: (1) a pull lever (2) a spin button (3) interact with a touch screen. Gamers have experienced player interaction in dozens of different ways, such as, for example:

- gaming controllers (e.g., Nintendo, PlayStation, XBOX, Wii)
- PC HIDs (e.g., mouse, trackball, keyboard)
- joy sticks
- shooting apparatuses
- head & body gear (e.g., Victormaxx, Power Glove)
- etc.

Much like the comparison between gamers and gamblers in regards to gambling gameplay display methods, the results are similar. The younger players are "bored" whereas the older players feel "intimidated."

In many existing casino venues, standard classic slot machines are deployed which include an electromagnetic mechanism with a "lever" interface device. Slot machines have also evolved using video screens and electronic push button interfaces, which are typically referred to as "Hybrid Machines" that use a combination of both the mechanical portion and video elements of both designs.

In light of the above, it may be desirable to create and/or implement "hybrid arcade/wager-based games" or "Gambling Arcade Games" which provide hybrid arcade-style, wager-based gaming techniques which may more suitably appeal to the Casino Gamer demographic. However, one significant obstacle regarding such hybrid arcade-style, wager-based gaming techniques is that they are often comprised of new/different and complex back end solutions that may require lengthy and costly processes of regulatory review and approvals in many different gaming jurisdictions.

One possible workaround to this significant obstacle is to configure/design a hybrid arcade-style, wager-based game such that it is compliant with currently approved wager-based gaming regulatory standards such as, for example, the well-known GLI standards, which have already been approved in various gaming jurisdictions. One example of a GLI standard is the GLI-11 standard version 3.0, Published Sep. 21, 2016 by Gaming Laboratories International, LLC, the entirety of which is herein incorporated by reference for all purposes.

For example, in one embodiment, a hybrid arcade-style, wager-based game may be configured or designed to provide an arcade-style gaming interface which enables a player to participate in an arcade-style game at the wager-based gaming machine. One or more events and/or activities performed by the player (e.g., during play of the arcade-style game) may automatically trigger an RNG wager-based event such as, for example, one or more of the following (or combinations thereof):

- the spinning of a virtual wager-based slot machine reel (e.g., which may be configured or designed to be compliant with the GLI standard(s));
- the spinning of a virtual wheel such as a roulette wheel or "Wheel-of-Fortune"™ wheel;

the throwing/rolling of one or more dice;
the dealing of one or more card(s);
and/or other types of RNG-based video games of chance (preferably which have been configured or designed to be compliant gaming standards, rules and regulations).

Because the wager-based activities of the hybrid arcade-style, wager-based game comply with currently existing GLI standard(s) (and/or other national, regional, local gaming rules and regulations), such hybrid arcade-style, wager-based games may not require additional regulatory approval for deployment in Casino venues.

Some benefits and advantages of the hybrid arcade/wager-based gaming techniques described herein may include, but are not limited to, one or more of the following (e.g., or combinations thereof):

- Enabling the utilization of the same (e.g., proven/GLI approved) slot machine back end and RNG for gambling functionality.
- Enables new and unique ways to display a slot machine gambling game to specific demographics based on gameplay type and/or theme.
- May increase overall house gambling demographics, revealing untapped markets, more profits, more coinins & more "butts in seats."
- Hybrid arcade-style, wager-based games may be purposefully configured or designed to avoid (or to not require) any additional regulatory approval for deployment in Casino venues.
- Provides mechanisms to Casinos/gaming establishments for facilitating achievement of desired minimum wagering goals (e.g., over time), such as those established by Casinos (e.g., Casino desires at least one wager-based reel spin by a given player every 10 seconds).
- Etc.

In one embodiment, a hybrid arcade-style, wager-based game may be created by combining a new and different visual game representation with a new and different method of player interaction on a slot machine. The hybrid arcade-style, wager-based game may be configured or designed to provide the assemblage of graphical elements and gameplay features for portraying a visually different experience while also providing the enhanced method of player interaction via a particular Human Interface Device (e.g., HID), which is based on the theme/style of the visually enhanced gambling game. For example, the game "Duck Hunt" uses a gun controller where as "Super Mario Bros." utilizes a D-pad multi-button controller as the HID. According to different embodiments, either (or both) of these arcade-style video games may be adapted (e.g., using the hybrid arcade/wager-based gaming techniques described and/or referenced herein) to function as hybrid arcade/wager-based games. According to different embodiments, one or more hybrid arcade/wager-based game(s) may also be configured or designed to include one or more of the following (or combinations thereof): graphical elements (e.g., 2D and/or 3D) animations, sound effects, programming, etc.

In some embodiments, the format of the hybrid arcade-style, wager-based game may focus on "first person shooter" type, arcade-style games such as, for example, "House of the Dead," "Area 51", "Lethal Enforcers", etc. At least a portion of such games may feature a player character that automatically moves on a "rail" system (e.g., automatically moving the player's character through different scenes of the game, without requiring the player to provide input for moving his/her game character), which allows the player to concentrate his/her focus on shooting the targets which appear throughout gameplay.

The format of the hybrid arcade-style, wager-based game may also focus on other types of video and/or arcade-style games such as, for example, one or more of the following (e.g., or combinations thereof):

- "non-linear" (e.g., open world) type video and/or arcade-style games such as, for example, Grand Theft Auto
- "linear" type video and/or arcade-style games such as, for example, Half-Life
- Massively multiplayer online "MMO" type video and/or arcade-style games such as, for example, World of Warcraft
- Role-playing game "RPG" type video and/or arcade-style games such as, for example, Final Fantasy.

Such games may feature a player character that may be moved through the game world via player input, e.g., HID), which allows for an increased sense of excitement through gameplay by providing a multitude of player-choice possibilities through a wide-array of path directions.

In some embodiments, the format of the hybrid arcade-style, wager-based game may facilitate a gameplay environment in which multiplayer functionality takes place. The multiplayer gameplay may have multiple "enrollment" aspects in which one, for example, particular player could be on location at a casino playing a hybrid arcade/wager-based game, while another (e.g., different) player could be at a different location (e.g., at a different location in the casino, at a different casino, at a different establishment such as a home or office, etc.), concurrently participating in the same hybrid arcade/wager-based game, but without participating in any wagering aspect/portions of hybrid arcade/wager-based game. A non-wagering game such as this is commonly known as a "free to play" game, in which the player is allowed to download and install said game on their own devices, which then allows the player progress through the game (e.g., which is no different than the wager based counter-part) without taking place in wager based events. Examples of some popular "free to play" games are, "TERA", "Marvel Puzzle Quest", "Planetside 2", etc. Gaming situations such as these may promote a "clicks to bricks" outcome where a casino property could promote at home users to "login over the weekend to play Super Zombie Bash! Free! Come down to the casino and play Super Zombie Bash for a chance to win big!" Such property advertisement may entice more patrons to visit the casino in order to "win big" on their favorite hybrid arcade/wager-based game.

In some embodiments, different players concurrently participating in the same hybrid arcade/wager-based game may each separately configure his/her respective wagering parameters/amounts, which may be different from the wagering parameters/amounts configured by other game player-participants.

The various hybrid arcade/wager-based gaming techniques described herein may be used to improve the visual relationship between player and machine to increase player immersion and facilitate longer more exciting gambling durations without providing a completely new back-end delivery structure. It also improves the player method of interaction with the gambling game by allowing for a plethora of new age interface devices to be coupled with specific themed games (e.g., guns, joysticks, controllers, etc.). Existing technology and gameplay, although proven, is becoming dated and "not as fun" to younger players. The hybrid arcade/wager-based gaming techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate. The hybrid arcade/wager-based gaming techniques described herein may also be utilized for enabling enhanced slot machine gambling with new and exciting twists, while still being compliant with local/state/Federal gaming regulations.

Walkthrough of Examples Hybrid Arcade/Wager-Based Game Embodiment(s)

The following example is intended to help illustrate some of the various types of functions, operations, actions, and/or other features which may be provided by the Hybrid Arcade/Wager-Based Gaming System. At least a portion of these various processes, procedures and activities may also be illustrated and described with respect to the flow diagrams of FIGS. 10-13.

Initially, it is assumed that a player (e.g., or players) engages with a hybrid arcade/wager-based gaming device via standard method (e.g., inserting monetary amount), selects gameplay and wagering options via button panel (e.g., different "characters" equal different bet/wager amounts e.g. 1 line vs 30 lines), "shoots" moving elements on the display (e.g., destroying a target qualifies as a triggering event for causing initiation of a wager-based event (e.g., initiating a wager-based spin of a virtual slot reel, which collects a specified amount of wagered credits), claims winnings/payouts (e.g., based on the outcome of the virtual slot reel spin), and continues to "shoot" until additional monetary amount is needed to continue play (e.g., out of credits) and/or until player is satisfied with gambling duration and decides to discontinue gameplay.

In some embodiments, the player character is on a "rail" (e.g., "House of the Dead", "Area 51", "Lethal Enforcers" one or more of which are classic arcade rail styled shooter games) which does not allow for free range of movement or choice of direction within the gaming environment (e.g., commonly referred to as "game world" or "game level").

The automated movement of the player's character is determined by the game's functionality and whether or not the player is actually playing (e.g., destroying zombies). By way of illustration, let's envision a short animated sequence—the player's mercenary character kicks down a door and enters a small maintenance room, Upon entering the room he stops to make sure the environment is safe to move on, however, 5 NPC's (e.g., Non Player Characters) heard the noise (e.g., from the door being kicked down) and have now surrounded the mercenary and are beginning to attack. Once the player character is in the room and surrounded, the rail movement (e.g., kicking down the door and walking into the room) stops. Once stopped, the player may use the game's HID (e.g., an electro-mechanical gun, which, for example, may be electronically tethered to the gaming device) to shoot and destroy the 5 NPC's.

According to different embodiments, one or more different types of gameplay-related triggering event(s)/condition(s) may be defined for initiating a wager-based event to occur during game play (e.g., execution of wager-based slot reel spin may take place concurrently with or simultaneously with the player's continued and active participation in the arcade-style portion of the game). Examples of different types of triggering event(s)/condition(s) may include, but are not limited to, one or more of the following (e.g., or combinations thereof):

- Pulling a trigger;
- Firing a shot with a gun or other weapon;
- Hitting a specified target;
- Destroying a specified virtual object;
- One or more character movements such as, for example, jumping, ducking, punching, hitting, running, sitting, etc.;
- An environmental object event, such as, for example, volcano eruption, avalanche, earthquake, or sci-fi/fantasy element (e.g., a strange alien world may harbor anti-matter pockets and/or worm-holes in space-time) and/or weather (e.g., "Lightning Strike" trigger);
- NPC or Boss event such as, for example, a mage or magic wielding character casting a specific spell (e.g., Fire Flare bonus round), a boss summoning a group of minions during a battle (e.g., Golden Goblin minions with multipliers);
- Predetermined outcome via host application such as, for example, a property may "credit/reward" a specific patron by triggering an event (e.g., "Hot Seat bonus" etc.), and/or may initiate an event based on a situation deemed necessary for triggering such an event. (e.g., See, e.g., 1208, FIG. 12);
- A multiplayer and/or team and/or co-op event (e.g., similar to other embodiments described and/or referenced herein) in occurrence with multiple players and situations thereof;
- And/or other types of event(s)/condition(s) may be defined for initiating a wager-based event to occur during game play.

Examples of different types of wager-based gaming events which may be initiated may include, but are not limited to, one or more of the following (e.g., or combinations thereof):

- spin of virtual slot reel (e.g., based on RNG)
- spin of roulette wheel
- throw of dice
- dealing of one or more cards
- pick & choose/find hidden item
- scramble elements/find hidden item
- "scratch off"/reveal hidden item
- a pachinko round
- "virtual" carnival/parlor events/spin of a wheel, etc.
- and/or other types of wager-based gaming events (e.g., or wager-based games) known in the art and/or described and/or referenced herein.

In at least one embodiment, it is preferable that the gameplay-related triggering event(s)/condition(s) (e.g., for triggering initiation of a wager-based event to occur) relates to an event which repeatedly occurs during the player's active participation in the arcade-style portion of the game, such as, for example pulling of a trigger, firing of a weapon, hitting an object/target, destroying and object, etc.

For example, in one embodiment, each time the player fires a shot (e.g., by pulling a trigger of the gun-HID device) during play of the arcade portion of the hybrid game, the system may automatically initiate a wager-based spin of a virtual slot reel. In other embodiments, each time the player destroys a specified target (e.g., destroys a zombie) during play of the arcade portion of the hybrid game, the system may automatically initiate a wager-based spin of the virtual slot reel.

In some embodiments, the hybrid arcade/wager-based game may be configured or designed as a "rail movement"

type game, where the player's character is automatically moved through various scenes of the game (e.g., as if the player's character were riding on an automated rail or transport). Rail movement advances the player's character into next game world location. The rail movement durations may be short, as to not interfere with quickly repetitive and continuous shoot/spin gameplay situations. In some embodiments, there may be stopping points of play as well as regulated movement intervals which comply with then current gambling regulations and/or local casino gaming requirements/preferences (e.g., casino may deem it desirable that play of the hybrid arcade/wager-based game achieves at least 8 spins of virtual slot reel per minute). In at least some embodiments, the hybrid arcade/wager-based game may also be configured or designed to take into account standard slot game feature transition times, bonus round intro's, wild animations, etc., when determining rail movements and sequence zones.

In some embodiments, if the player decides not to shoot or destroy the Non Player Characters ("NPCs"), the NPC's may eventually destroy the player character. In at least one embodiment, when this occurs, the player character may automatically rejuvenate (e.g., come to life again), and the player may be provided with additional opportunities to destroy the NPC's at the current visual gaming location (e.g., level), before being allowed to proceed to the next level. Thus it will be appreciated that, in at least some embodiments, the hybrid arcade/wager-based game may be configured or designed to provide a minimal/no cost of failure (e.g., as compared with traditional arcade-style video games where loss of lives/credits=game over). Such techniques provide an advantage of allowing a player to temporarily depart from the game (e.g., to order a drink, have a smoke, etc.) as a traditional slot player might do. During such moments, play of the hybrid arcade/wager-based gaming device may be considered to be in an idle state. However, in some embodiments, even though the hybrid arcade/wager-based game may provide idle benefits, the game may continue to display or impart a visual sense of urgency to promote/stimulate gameplay (e.g., zombies continue to attack player character during idle game state).

According to different embodiments, different hybrid arcade/wager-based games may be configured or designed to include at least one arcade-style game play portion and at least one wager-based game play portion. Examples of various arcade-style games or arcade-style themes which may be used in implementing the arcade-style game play portion of the hybrid arcade/wager-based game may include, but are not limited to, one or more of the following (or combinations thereof):

- "First person shooter" type, arcade-style games such as, for example, "House of the Dead," "Area 51", "Lethal Enforcers".
- "Non-linear" (e.g., open world) type video and/or arcade-style games such as, for example, Grand Theft Auto.
- "Linear" type video and/or arcade-style games such as, for example, Half-Life.
- Massively multiplayer online "MMO" type video and/or arcade-style games such as, for example, World of Warcraft.
- Role-playing game "RPG" type video and/or arcade-style games such as, for example, "Final Fantasy".
- Racing/Driving arcade style game(s) (e.g., Cars, boats, planes etc.).
- Sports-themed arcade style game(s) (e.g., Football, Baseball, downhill skiing, etc.).
- Challenge arcade style game(s) (e.g., Archery, Darts, Hunting, Shooting, etc.).
- Recreation arcade style game(s) (e.g., Horseshoes, Croquet, Fishing etc.).
- TV-themed arcade style game(s).
- And/or other types of arcade-style games.

Examples of various wager-based games or wager-based themes which may be used in implementing the wager-based game play portion of the hybrid arcade/wager-based game may include, but are not limited to, one or more of the following (or combinations thereof):

- Spin of virtual slot reel (e.g., based on RNG). Examples of these types of wager-based games of chance include the RNG-based virtual slot games.
- Throw of virtual dice. An example of this type of wager-based game of chance includes the RNG-based virtual dice game.
- Spin of a virtual roulette wheel or other type of wheel (such as, for example, "Wheel of Fortune"). Examples of these types of wager-based games of chance include the RNG-based virtual roulette game, and the RNG-based "Wheel of Fortune" game.
- Dealing of one or more virtual cards.
- Pick & choose/find hidden item.
- Scramble elements/find hidden item.
- "Scratch off"/reveal hidden item.
- A pachinko-type game.
- A bingo-type game.
- "Virtual" carnival/parlor events/spin of a wheel, etc.
- And/or other types of RNG-based games of chance known in the art and/or described and/or referenced herein.

According to different embodiments, different types of electronic gaming machine cabinets may be configured with different human interface devices ("HIDs") for enabling players/participants to engage in one or more of the hybrid arcade/wager-based gaming activities described and/or referenced herein. Examples of different human interface devices ("HIDs") may include, but are not limited to, one or more of the following (or combinations thereof):

- Touchscreen interfaces
- Mechanical Buttons
- Gun, Pistol, Shooting Device
- Mechanical Joystick
- Gaming Controller such as, for example, remote gaming controllers similar to those used for X-Box™, Playstation™, Wii™, etc.
- Mechanical vehicle components such as, for example, vehicle steering wheel, gear shift, gas pedal, brake pedal, clutch pedal, etc.
- And/or other types of HIDs described and/or referenced herein and/or commonly known.

Example Hybrid Arcade/Wager-Based Game GUIs and Procedures

FIGS. 10-13 illustrate various example embodiments of different Hybrid Arcade/Wager-Based Gaming procedures and/or procedural flows which may be used for facilitating activities relating to one or more of the Hybrid Arcade/Wager-Based Gaming aspects disclosed herein.

Figure 15:
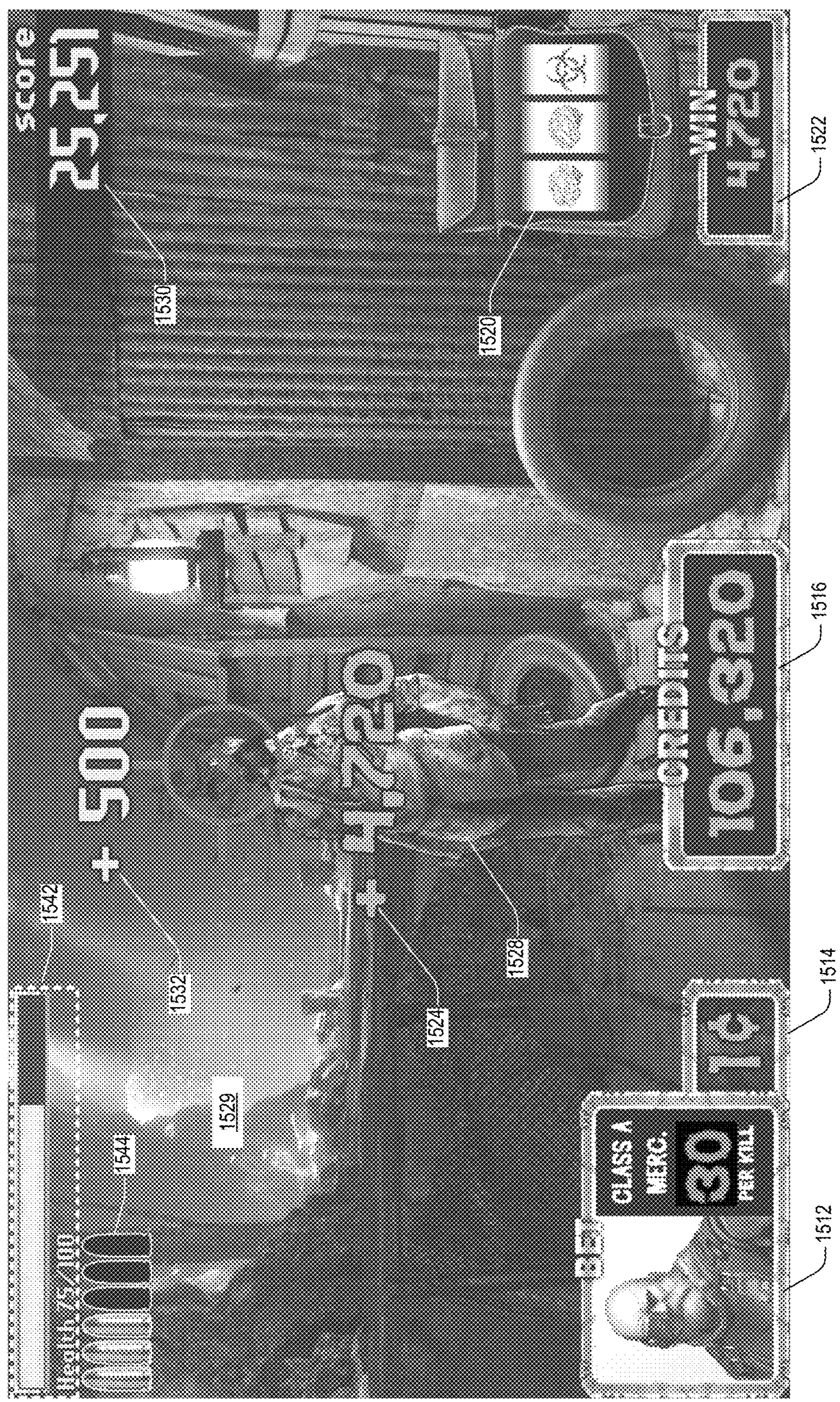
FIG. 15 illustrates an example screenshot of a hybrid arcade/wager-based game GUI which may be used for facilitating activities relating to one or more of the Hybrid Arcade/Wager-Based Gaming aspects disclosed herein. In at least one embodiment, at least a portion of the GUIs may be configured or designed for use at one or more mobile devices and/or at one or more casino gaming machines.

FIG. 15 illustrates an example screenshots of a hybrid arcade/wager-based game GUIs which may be used for facilitating activities relating to one or more of the Hybrid Arcade/Wager-Based Gaming aspects disclosed herein. In at least one embodiment, at least a portion of the GUIs may be configured or designed for use at one or more mobile devices and/or at one or more casino gaming machines.

According to different embodiments, at least a portion of the various types of functions, operations, actions, and/or other features provided by the Hybrid Arcade/Wager-Based Gaming Procedures of FIGS. 10-13 may be implemented at one or more client systems(s), at one or more System Servers (s), and/or combinations thereof.

In at least one embodiment, one or more of the Hybrid Arcade/Wager-Based Gaming procedures may be operable to utilize and/or generate various different types of data and/or other types of information when performing specific tasks and/or operations. This may include, for example, input data/information and/or output data/information. For example, in at least one embodiment, the Hybrid Arcade/Wager-Based Gaming procedures may be operable to access, process, and/or otherwise utilize information from one or more different types of sources, such as, for example, one or more local and/or remote memories, devices and/or systems. Additionally, in at least one embodiment, the Hybrid Arcade/Wager-Based Gaming procedures may be operable to generate one or more different types of output data/information, which, for example, may be stored in memory of one or more local and/or remote devices and/or systems. Examples of different types of input data/information and/or output data/information which may be accessed and/or utilized by the Hybrid Arcade/Wager-Based Gaming procedures may include, but are not limited to, one or more of those described and/or referenced herein.

In at least one embodiment, a given instance of the Hybrid Arcade/Wager-Based Gaming procedures may access and/or utilize information from one or more associated databases. In at least one embodiment, at least a portion of the database information may be accessed via communication with one or more local and/or remote memory devices. Examples of different types of data which may be accessed by the Hybrid Arcade/Wager-Based Gaming procedures may include, but are not limited to, one or more of those described and/or referenced herein.

According to specific embodiments, multiple instances or threads of the Hybrid Arcade/Wager-Based Gaming procedures may be concurrently implemented and/or initiated via the use of one or more processors and/or other combinations of hardware and/or hardware and software. For example, in at least some embodiments, various aspects, features, and/or functionalities of the Hybrid Arcade/Wager-Based Gaming procedures may be performed, implemented and/or initiated by one or more of the various systems, components, systems, devices, procedures, processes, etc., described and/or referenced herein.

According to different embodiments, one or more different threads or instances of the Hybrid Arcade/Wager-Based Gaming procedures may be initiated in response to detection of one or more conditions or events satisfying one or more different types of minimum threshold criteria for triggering initiation of at least one instance of the Hybrid Arcade/Wager-Based Gaming procedures. Various examples of conditions or events which may trigger initiation and/or implementation of one or more different threads or instances of the Hybrid Arcade/Wager-Based Gaming procedures may include, but are not limited to, one or more of those described and/or referenced herein.

According to different embodiments, one or more different threads or instances of the Hybrid Arcade/Wager-Based Gaming procedures may be initiated and/or implemented manually, automatically, statically, dynamically, concurrently, and/or combinations thereof. Additionally, different instances and/or embodiments of the Hybrid Arcade/Wager-Based Gaming procedures may be initiated at one or more different time intervals (e.g., during a specific time interval, at regular periodic intervals, at irregular periodic intervals, upon demand, etc.).

In at least one embodiment, initial configuration of a given instance of the Hybrid Arcade/Wager-Based Gaming procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Hybrid Arcade/Wager-Based Gaming procedures may correspond to and/or may be derived from the input data/information.

For purposes of illustration, an example walk-through of a specific embodiment of a hybrid arcade/wager-based game will now be described by way of example with reference to the FIGS. 10-13.

It is to be noted that, although various process steps, method steps, algorithms or the like may be described in a sequential order, such processes, methods and algorithms may be configured to work in alternate orders. Accordingly, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

Figure 10:
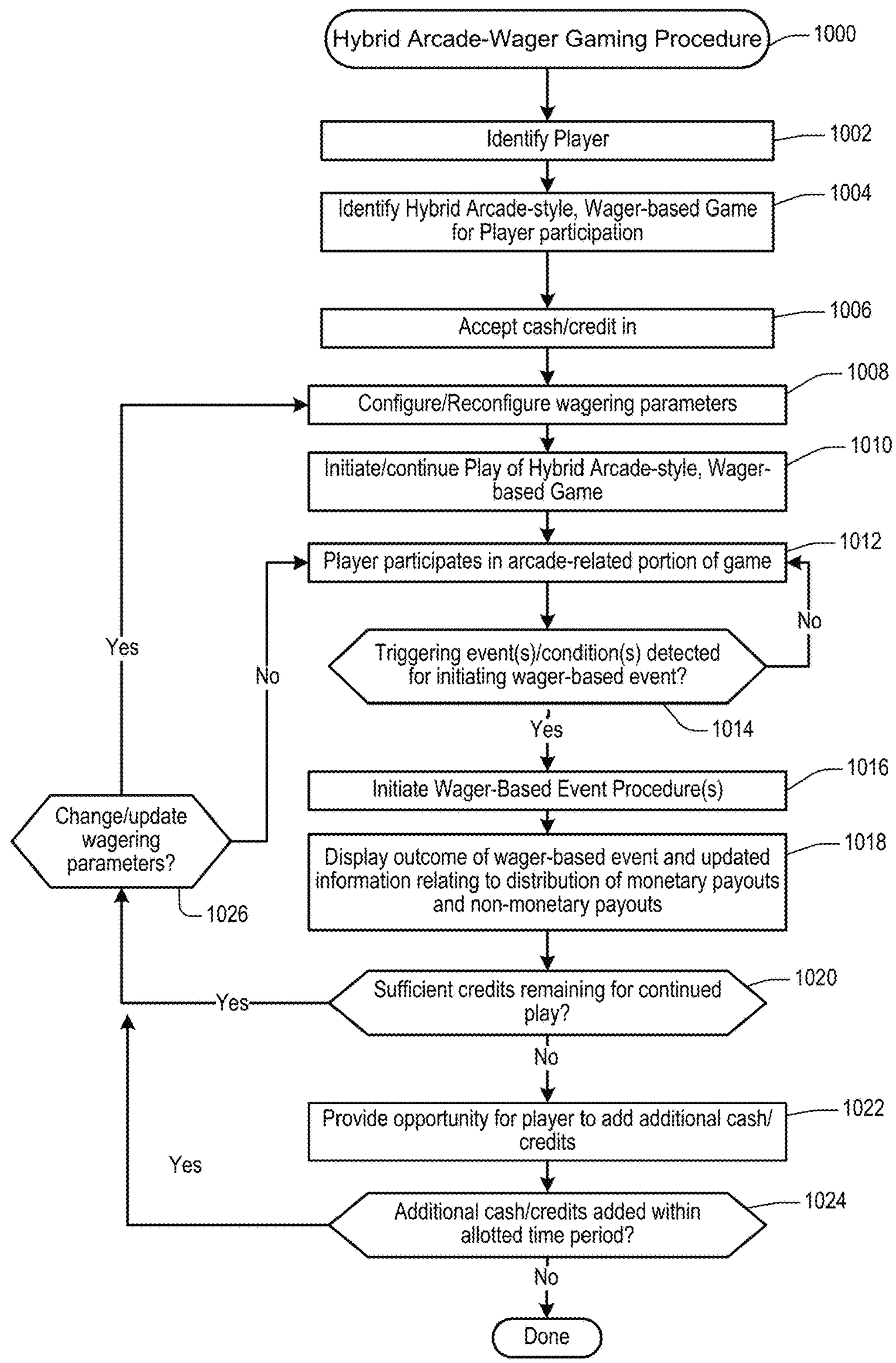
FIGS. 10-13, and 27 illustrate various example embodiments of different computer-implemented gaming procedures and/or procedural flows which may be used for facilitating activities relating to one or more of the interactive event outcome reveal aspects disclosed herein.

FIG. 10 shows an illustrative example of an embodiment of a Hybrid Arcade-Wager Gaming Procedure 1000. As illustrated in the example embodiment of FIG. 10, the Hybrid Arcade-Wager Gaming Procedure may facilitate, enable, initiate, and/or perform one or more of the following operation(s), action(s), and/or feature(s) (or combinations thereof):

- Identify Player 1002.
- Identify Hybrid Arcade-style, Wager-based Game for Player participation 1004.
- Accept cash/credit in 1006.
- Configure/Reconfigure wagering parameters 1008. Reconfigure wagering parameters during continued game play, if desired
- Initiate/continue Play of Hybrid Arcade-style, Wager-based Game 1010. Continue play of game (if start of game already initiated).
- Player participates in arcade-related portion of game 1012, which corresponds to the non-wager based portion of the hybrid arcade/wager-based game.
- Triggering event(s)/condition(s) detected for initiating wager-based event? For example:
  - NPC hit/destroyed?
  - NPC damaged by player's character?
  - Wagering Object collected by player's character?
  - Achievement satisfied or accomplished in non-wager-based portion of game?
  - Other type of wager-based triggering event detected?
- If yes to 1014, Initiate Wager-Based Event Procedure(s) 1016, such as those described with respect to FIG. 11. By way of illustration:

Initiate wager-based virtual slot reel spin in response to successful NPC hit/destruction.

Initiate wager-based virtual slot reel spin in response to Player's character collecting "Wagering Ring" or "Gold Award Object".

Initiate wager-based virtual slot reel spin in response to player achieving an objective in the non-wager-based portion of the hybrid arcade/wager-based game.

Display outcome of wager-based event and updated information relating to distribution of monetary payouts and non-monetary payouts.

Display outcome of wager-based event and updated information relating to distribution of monetary payouts and non-monetary payouts 1018. e.g., Display outcome of virtual slot reel spin and update player's credits based on payout from virtual slot reel spin. In some embodiments, depending upon the wager-based game event outcome, one or more non-monetary payouts may also be distributed (e.g., within the non-wager-based portion of the hybrid arcade/wager-based game).

Sufficient credits remaining for continued play of hybrid arcade/wager-based game 1020?

If yes to 1020, change/update wagering parameters 1026?

If no to 1020, provide opportunity for player to add additional cash/credits 1022.

Additional cash/credits added within allotted time period 1024?

If yes to 1024, present opportunity to change wager parameters 1026, and continue game play 1012.

If no to 1024, end player's participation in hybrid arcade/wager-based game.

Figure 11:
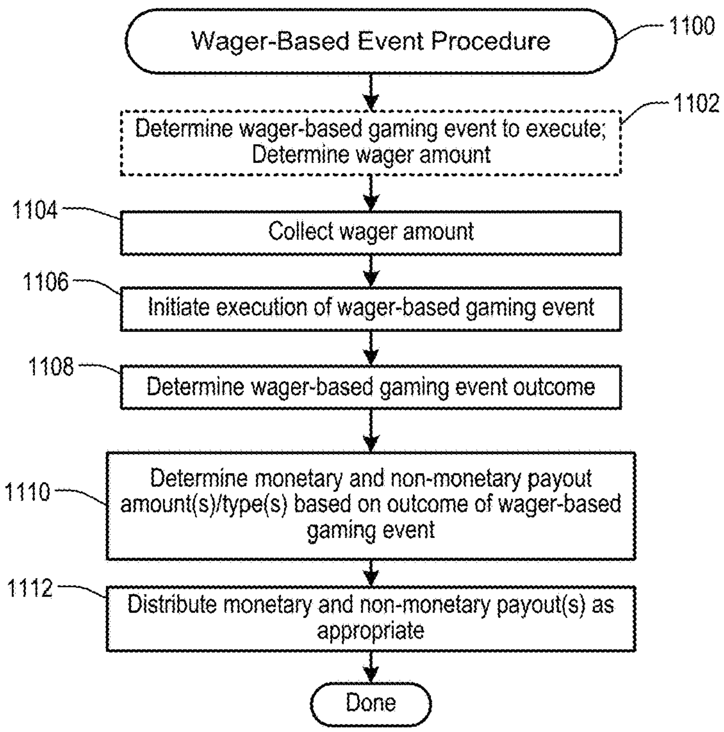

FIG. 11 shows an illustrative example of a Wager-Based Event Procedure 1100 in accordance with a specific example embodiment. In at least one embodiment, the Wager-Based Event Procedure 1100 may be initiated or implemented concurrently during hybrid arcade/wager-based game play, allowing player to seamlessly continue arcade-style game play while wagering event is executed and outcome determined. As illustrated in the example embodiment of FIG. 11, the Wager-Based Event Procedure may facilitate, enable, initiate, and/or perform one or more of the following operation(s), action(s), and/or feature(s) (or combinations thereof):

Determine wager-based gaming event to execute, and determine wager amount(s) 1102.

Collect wager amount 1104. For example, collect one credit.

Initiate execution of wager-based gaming event 1106. For example, initiate spin of RNG-based virtual slot reels.

Determine wager-based gaming event outcome 1108. For example, determine outcome of virtual slot reel spin.

Determine monetary and non-monetary payout amount (s)/type(s) (if any) based on outcome of wager-based gaming event 1110. According to different embodiments, depending on the wager-based game event outcome, monetary payouts and/or non-monetary-payouts may be identified for distribution.

Distribute monetary and non-monetary payout(s) as appropriate 1112. For example, distribute any monetary payout(s) (e.g., credits) and/or non-monetary payouts due to player based on outcome of virtual slot reel spin.

Figure 13:
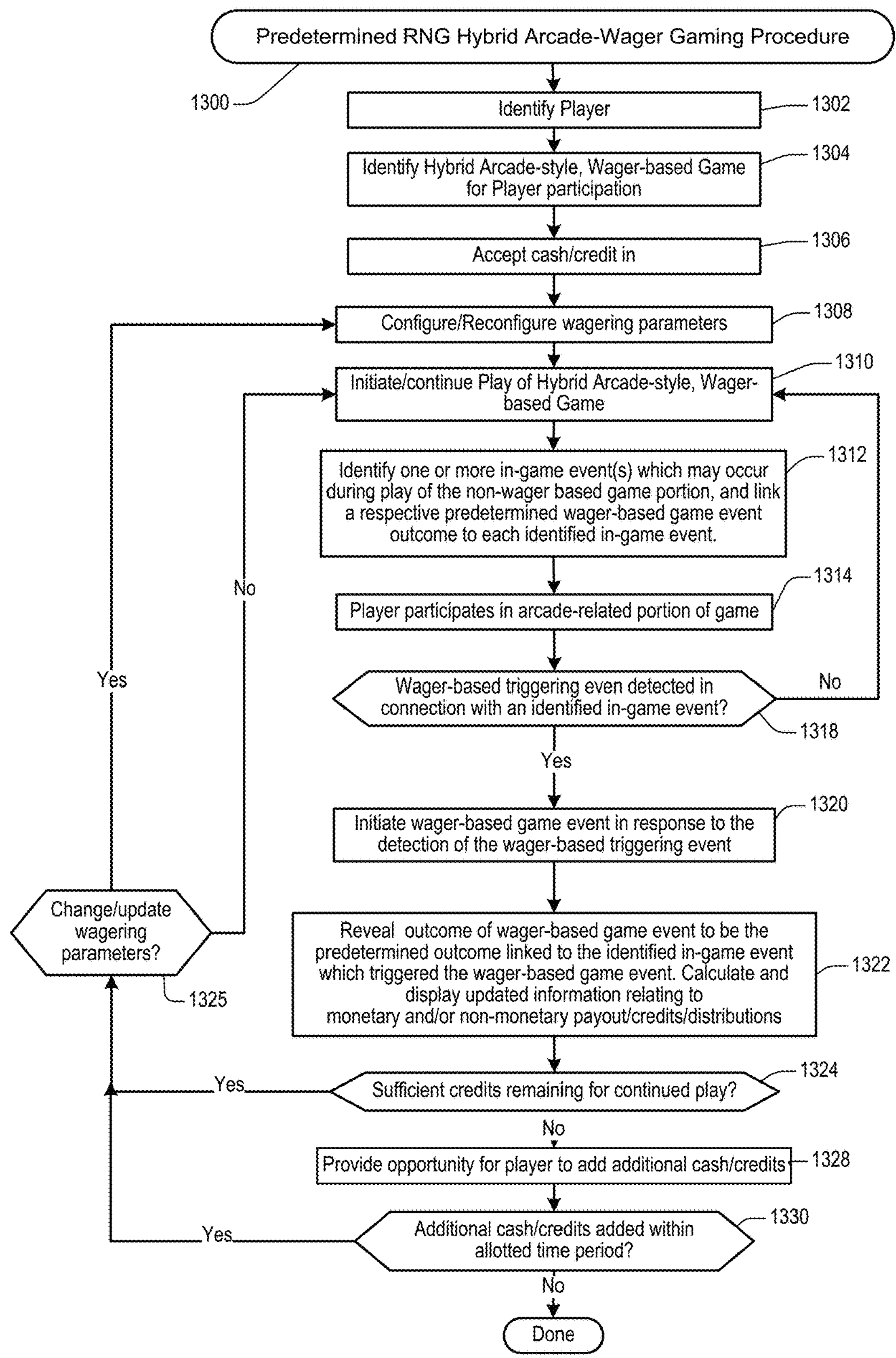

FIG. 13 shows an illustrative example of a Predetermined RNG Hybrid Arcade-Wager Gaming Procedure 1300 in accordance with a specific example embodiment. As illustrated in the example embodiment of FIG. 13, the Predetermined RNG Hybrid Arcade-Wager Gaming Procedure may facilitate, enable, initiate, and/or perform one or more of the following operation(s), action(s), and/or feature(s) (or combinations thereof):

Identify Player 1302.

Identify Hybrid Arcade-style, Wager-based Game for Player participation 1304.

Accept cash/credit in 1306.

Configure/Reconfigure wagering parameters 1308. Reconfigure wagering parameters during continued game play, if desired Initiate/continue Play of Hybrid Arcade-style, Wager-based Game 1310. Continue play of game (if start of game already initiated).

Identify one or more in-game event(s) which may occur during play of the non-wager based game portion, and link a respective predetermined wager-based game event outcome to each identified in-game event 1312. In at least one embodiment, this may involve generating or acquiring a respective, predetermined outcome (e.g., RNG-based outcome) for one or more identified in-game event(s). For example, in the zombie-themed hybrid arcade/wager-based game, each spawned NPC may have associated therewith a respective RNG-based game of chance outcome, which has been determined before the initiation of the associated RNG-based game of chance (e.g., before spin of virtual slot reels), and which has been determined before a wager-based triggering event has occurred in association with that particular NPC. However, in at least some embodiments, the hybrid arcade/wager-based game may be configured or designed to prevent the player from being aware that the outcome of the wager-based game of chance has been predetermined. In such embodiments, even though the outcome of the wager-based game of chance has been predetermined, the hybrid arcade/wager-based game may be configured or designed to lead the player to believe that the outcome of the wager-based game of chance was determined after the occurrence of the wager-based triggering event, and subsequent execution of the wager-based game of chance.

Player participates in arcade-related portion of game 1314, which corresponds to the non-wager based portion of the hybrid arcade/wager-based game.

Wager-based triggering event detected in connection with an identified in-game event 1318? For example, in at least one embodiment, the gaming device may be configured or designed to monitor activities in the entertainment portion (e.g., non-wager-based portion) of the hybrid arcade/wager-based game for occurrences of in-game event(s) which qualify as wager-based triggering event(s). In one embodiment, if an occurrence of an in-game event is detected, the gaming device may determine whether or not the occurrence of the detected in-game event qualifies as a wager-based triggering event. For example, the killing or destruction of an NPC in a zombie-themed hybrid arcade/wager-based game may correspond to an in-game event which qualifies as a wager-based triggering event.

If it is determined that the occurrence of the first in-game event qualifies as a wager-based triggering event, the gaming device may initiate 1320 a wager-based game event in response to the occurrence or detection of the wager-based triggering event. For example, in at least one embodiment, when a wager-based triggering event occurs in the arcade (e.g., non-wager-based) portion of the hybrid arcade/wager-based game, the hybrid arcade/wager-based game may respond by automatically initiating a wager-based game event such as, for example, initiating wager-based spin of a set of virtual slot reels. In at least one embodiment, the process of initiating a wager-based game event may include:

automatically identifying an amount to be wagered on the outcome of the wager-based game event; and automatically using funds from the player's account to initiate and fund a wager (for the identified wager amount) on the outcome of the wager-based game event.

Reveal outcome of wager-based game event to be the predetermined outcome linked to the identified in-game event which triggered initiation of the wager-based game event. Calculate and display updated information relating to monetary and/or non-monetary payouts/credits/distributions (if any).

Sufficient credits remaining for continued play of hybrid arcade/wager-based game 1824?

If yes to 1324, change/update wagering parameters 1325?

If no to 1324, provide opportunity for player to add additional cash/credits 1328.

Additional cash/credits added within allotted time period 1330?

If yes to 1330, present opportunity to change wager parameters 1325, and continue game play 1310.

If no to 1330, end player's participation in hybrid arcade/wager-based game.

In at least some embodiments where hybrid arcade/wager-based games are deployed in casino/regulated environments in which voluntary and/or mandatory rules/regulations are imposed (e.g., based on GLI standards, specific jurisdiction rules/regulations, and/or casino rules/regulations), one or more mechanisms may be implemented (see, e.g., FIG. 12) to cause wager-based game events to be initiated or triggered in a manner which conforms with governing rules/regulations. For example, according to different embodiments, a hybrid arcade/wager-based game may be configured or designed to automatically create conditions for a wager-based triggering event to occur in situations where there is lack of player input while credits are present, and gameplay is expected. In other embodiments, one or more hybrid arcade/wager-based games may be configured or designed to automatically cause wager-based game events to be initiated or triggered in accordance with specifically defined rules and/or criteria such as, for example, one or more of the following (or combinations thereof):

One wager-based event (e.g., virtual reel spin) about every 10 seconds (or sooner);

6 wager-based events (e.g., 6 separate reel spins) w/in 30 seconds);

10 wager-based events (e.g., 10 separate reel spins) during each level of game play);

Etc.

Additionally, in at least some embodiments, a player character's game world movement may be automatically controlled or influenced (e.g., via rail style, programmatically controlled gameplay destination paths, predetermined (and/or player-selectable) gameplay destination paths, etc.) to cause, satisfy, or achieve one or more identified or predefined goals/objectives. At least a portion of such goals/objectives may be defined by or generated by the hybrid arcade/wager-based game software and/or by local rules/regulations governing play of the hybrid arcade/wager-based game (e.g., in contrast to goals/objectives defined by the player). Additionally, in at least some embodiments, a player character's game world movement may also be automatically controlled or influenced so as to avoid the need for player input, and/or so as to avoid the need for providing specific HID hardware. For example, in one embodiment, a player character's game world movement may be automatically controlled or influenced in a manner which enables the player to interact with the gameplay elements via existing gaming cabinet hardware such as, for example, button panels, touchscreens, etc. In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., to thereby cause the game to be in conformance with standards governing the occurrence of wager-based game events, which may be imposed by local rules/regulations).

Figure 12:
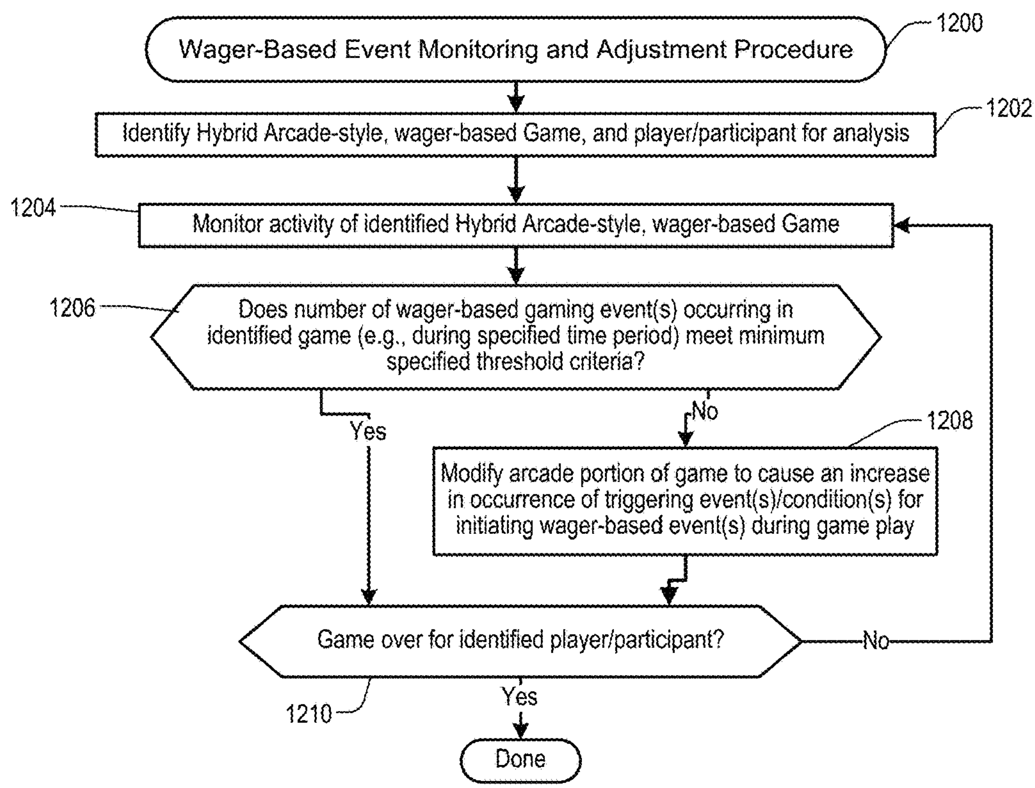

FIG. 12 shows an illustrative example of a Wager-Based Event Monitoring and Adjustment Procedure 1200 in accordance with a specific example embodiment. As illustrated in the example embodiment of FIG. 12, the Wager-Based Event Monitoring and Adjustment Procedure may facilitate, enable, initiate, and/or perform one or more of the following operation(s), action(s), and/or feature(s) (or combinations thereof):

Identify Hybrid Arcade-style, wager-based Game, and player/participant for analysis 1202.

Monitor activity of identified Hybrid Arcade-style, wager-based Game 1204.

Does number of wager-based gaming event(s) occurring in identified game (e.g., during specified time period) meet minimum specified threshold criteria 1206?

If no to 1206, modify arcade portion of game to cause an increase in occurrence of triggering event(s)/condition(s) for initiating wager-based event(s) during game play 1208. For example, in one embodiment, a minimum specified threshold criteria may be configured by the Casino such as, for example, one or more of the following (or combinations thereof):

One wager-based event (e.g., virtual reel spin) about every 10 seconds (or sooner);

6 wager-based events (e.g., 6 separate reel spins) w/in 30 seconds);

10 wager-based events (e.g., 10 separate reel spins) during each level of game play);

Etc.

If yes to 1206, game over for identified player/participant 1210?

If no to 1210, continue to monitor activity of identified hybrid arcade-style, wager-based Game 1204.

In a case where such games are featured in a casino/regulated environment, there may be a need to initiate or trigger a gambling event based on (e.g., GLI standards and/or specific jurisdiction guidelines) "lack of player input while credits are present and gameplay is expected" (e.g., 1208, FIG. 12). Also, a player characters game world movement may be automatically controlled (e.g., rail style and/or programmatically controlled predetermined (e.g., and/or selectable) gameplay destination paths) as to not facilitate the need for a specific HID, wherein the player could interact with the gameplay elements via current methods (e.g., button panel and/or touchscreen). In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., conforming to regulatory spins per minute).

FIG. 15 shows a screenshot of an example embodiment of a Hybrid Arcade/Wager-Based Game GUI 1500 which may be used for facilitating game play and wagering activities relating to one or more of the hybrid arcade/wager-based gaming aspects disclosed herein. More specifically, FIG. 15 shows an example screenshot of hybrid arcade/wager-based game GUI based on concept of a first person shooter zombie game.

In the specific example embodiment of FIG. 15 it is assumed that the hybrid arcade/wager-based game corresponds to a first person shooter zombie game. According to different embodiments, the Hybrid Arcade/Wager-Based Game GUI 1500 may be configured or designed to display graphics, animation, images, video, text, and/or other types of content such as, for example, one or more of the following (or combinations thereof):

- Player character/avatar content (e.g., 1512). As illustrated in the example embodiment of FIG. 15, this may include an image of the character, a description of the character (e.g., Class A Merc.), and other characteristics associated with the character such as, for example, character classification, skill level, strength, speed, power, knowledge, weapons, bet/wager multiplier value (e.g., 30× per kill), etc.
- Wagering content (e.g., 1514). In the specific example embodiment of FIG. 15, the wagering content 1514 includes a wager value (e.g., $0.01) representing an amount to be automatically wagered for each wager-based event which occurs during play of the hybrid arcade/wager-based game.
- Player credit information (e.g., 1516, 1524, 1522). In the specific example embodiment of FIG. 15, a first portion of player credit information 1524 may indicate recent credit(s) (e.g., "+4,720") awarded to the player (e.g., based on recent wager-based event), and a second portion of player credit information 1516 may indicate the player's current amount of total credits (e.g., 106, 320 credits).
- Wager-based event outcome information (e.g., 1522). In the specific example embodiment of FIG. 15, the wager-based event outcome information 1522 shows an amount of credits awarded to the player based on the most recent wager-based game event which was initiated and executed during play of the hybrid arcade/wager-based game.
- Player character health status information (e.g., 1542).
- Player character ammunition status information (e.g., 1544).
- Player score information (e.g. 1530, 1532). In at least one embodiment, a first portion of player score information 1530 may represent the player's current total score achieved during the hybrid arcade/wager-based game play session. In at least one embodiment, a second portion of player score information 1532 may represent the player's score or award which has been awarded to the player based on a game play event activity and/or outcome achieved during the hybrid arcade/wager-based game play session.
- Scene/Background Graphics (e.g., 1529)
- NPC graphics/content (e.g., 1528)

In the specific example embodiment of FIG. 15, a classic styled slot game (e.g., 1520) comprising 3 virtual slot reels is displayed, and configured or designed to offer a 1 line setup. In the specific example embodiment of FIG. 15, the hybrid arcade/wager-based game is configured or designed to use different player characters (e.g., "mercenaries", 1512) as bet multipliers. For example, as illustrated in the example embodiment of FIG. 15, the player may use the gaming device button panel to choose a wager amount "weapon" or "character" to use, say, an armored mercenary game character (e.g., 1512, FIG. 15) wielding a shotgun (e.g., equivalent to a 30 line max bet). A bet multiplier of "30" (e.g., 30×) is associated with Class A Mercenary character 1512. Additionally, as illustrated in the example embodiment of FIG. 15, the wagering denomination is $0.01 (e.g., 1514). Accordingly, since the selected game character/weapon (e.g., 1512) is configured to correspond to a 30× wager of the wagering denomination, this is equivalent to a $0.30 wager per kill (e.g., a $0.30 wager per kill of each NPC). Thus, for example, in the specific example embodiment of FIG. 15, when the player destroys NPC 1529, this event may qualify as a wager-based triggering event, which may cause the gaming machine to automatically place and initiate (using the player's funds) a $0.30 wager at the wager-based portion of the game (e.g., $0.30 wager automatically initiated at the slot game 1520). In some embodiments, the wager-based portion of the game is implemented as a RNG-based game of chance (e.g., such as a slot reel spin, roulette wheel spin, dice roll, etc.). In some embodiments, the outcome of the wager-based game event is determined after the wager-based triggering event has occurred. In other embodiments, as described in greater detail herein, the outcome of the wager-based game event is determined before the wager-based triggering event has occurred, but not revealed until after the wager-based triggering event has been initiated. In the specific example embodiment of FIG. 15, it is assumed that the outcome of the wager-based slot game 1520 results in the player winning 4,720 credits (1122), which may be automatically distributed to the player's account. In at least some embodiments, credits won by the player during play of the hybrid arcade/wager-based game may be converted into cash or other forms of monetary currency or credit.

Interactive Event Outcome Reveal Techniques Implemented in Wager-Based Video Games and Non-Wager-Based Video Games Recognizing that the revealing of game event outcome(s) to players provides entertainment value in and of itself, various aspects described herein are directed to different types of interactive event outcome reveal techniques implemented in both wager-based video games and non-wager-based video games.

For example, according to different embodiments, one or more interactive event outcome reveal techniques may be implemented as a series of "superstitious" symbols that may appeal to a patron's love for mystery and/or may appeal to a patron's desire to beat/tap on an electronic gaming machine ("EGM") screen. In at least some embodiments, the interactive event outcome reveal techniques may be employed to provide enhanced or additional entertainment to players by employing the use of graphic overlays or other mechanisms to cover up (or otherwise obscure or prevent display of) game event outcome content (e.g., slot symbols, playing card values, etc.) relating to wager-based game play and/or non-wager-based game play, and allowing the player to interact with (e.g., via touchscreen display) the overlay graphics to cause the game event outcome content to be revealed.

In some embodiments, at least some of the interactive event outcome reveal techniques may be employed to reveal predetermined game event outcomes. In other embodiments, at least some of the interactive event outcome reveal techniques may be employed to reveal non-predetermined game event outcomes. Additionally, in at least some embodiments, the interactive event outcome reveal techniques may be configured and/or implemented in a manner which does not cause or allow any influencing, or manipulating of the game event outcomes.

In at least one embodiment, one or more of the interactive event outcome reveal techniques may be implemented via use of "Outcome Reveal Graphical Overlays" which are configured or designed to facilitate player interaction for causing game outcome of events to be revealed or displayed. For example, according to different embodiments, in order for a player to view the outcome of an in-game game event (such as, for example, a wager-based game event or a non-wager-based game event), the player may be required to interact with an Outcome Reveal Graphical Overlay, for example, by performing one or more action(s) such as, for example: tapping individual tiles, swiping multiple tiles, wiping their palm across the screen, and/or other activities as may be required by the game. After the interaction portion, standard celebration animations, special effects, and/or graphics may follow, as may occur in normal game play. In some embodiments, one or more interactive event outcome reveal techniques may be configured or designed to include functionality for allowing players to electively skip the outcome reveal interaction portion, for example, by providing appropriate input to the gaming machine.

According to different embodiments, various features of the interactive event outcome reveal techniques described herein may be implemented in wager-based games and/or non-wager-based games. Various examples of wager-based video game environments and non-wager-based video game environments may include, but are not limited to, one or more of the following (or combinations thereof):

- internet-based games;
- smartphone-based gaming applications;
- games accessible via consumer-type game consoles such as Microsoft XBOX™, Sony Playstation™, Nintendo WII™, etc.;
- wager-based games accessible via one or more casino gaming devices, gaming networks and/or other types of gaming networks;
- multi-player wager-based games;
- hybrid arcade/wager-based (HAWG) type games;
- wager-based and/or non-wager-based games which may be accessible to users/players via one or more other types of systems and/or networks;
- and/or other types of games played on various gaming devices.

Example Embodiments of Interactive Event Outcome Reveal Techniques

FIGS. 16-26 illustrate various example screenshot embodiments of different graphical user interfaces (GUIs) which may be used to facilitate, initiate and/or perform various operation(s) and/or action(s) relating to one or more of the interactive event outcome reveal techniques described herein.

Figure 16:
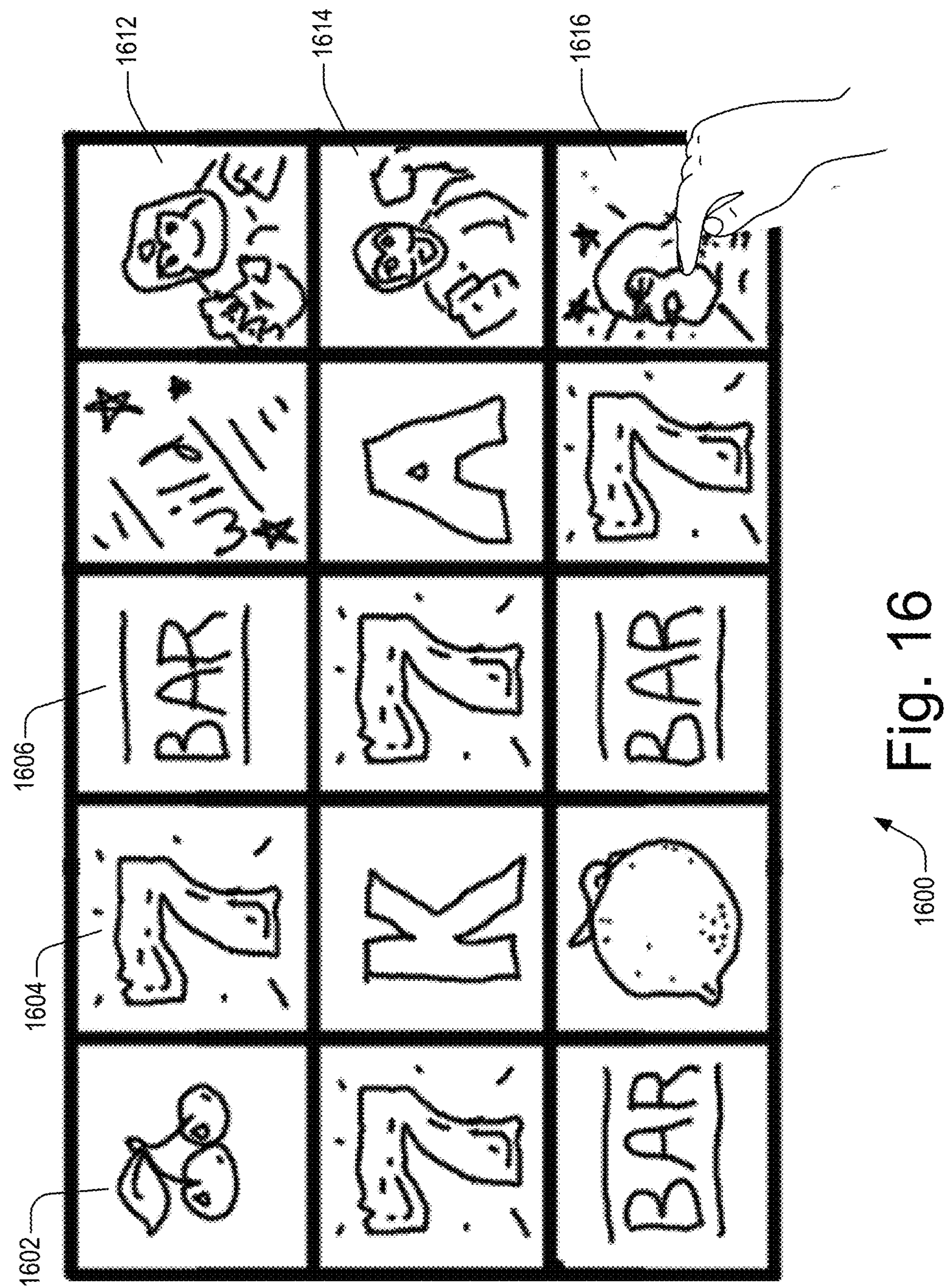
FIGS. 16-26 illustrate various example screenshot embodiments of different graphical user interfaces (GUIs) which may be used to facilitate, initiate and/or perform various operation(s) and/or action(s) relating to one or more of the interactive event outcome reveal techniques described herein.

FIG. 16 illustrates an example screenshot embodiment of a "Super Pow" interactive event outcome reveal graphical user interface (GUI) 1600 which may be used to facilitate, initiate and/or perform various operation(s) and/or action(s) relating to one or more of the interactive event outcome reveal techniques described herein. In the specific example embodiment of FIG. 16, a 3×5 grid of symbols (e.g., 1602, 1604, 1606, etc.) is displayed which collectively represent an outcome of a 3-line electronic slot game event. In at least one embodiment, one or more "interactive reveal regions" (e.g., 1612, 1614, 1616, etc.) may be displayed in a manner so as to conceal or obscure viewing of the value(s) or identities of one or more slot reel symbols. For example, as illustrated in the example embodiment of FIG. 16, interactive reveal regions 1612, 1614, 1616 are displayed in a manner so as to conceal or obscure viewing of three slot symbols.

In some embodiments, the display of the interactive reveal regions may be implemented via use of one or more overlay layer(s), which may be positioned over one or more symbols to obscure or prevent the player from viewing the value(s) or identities of the symbol(s). In other embodiments, the display of the interactive reveal regions may be temporarily displayed at location(s) where one or more symbol(s) would otherwise be displayed.

In at least one embodiment, a player may interact with the displayed interactive reveal regions in order to cause the values or identities of the obscured symbol(s) to be revealed/displayed. In embodiments where the gaming device display includes touchscreen functionality, examples of different types of interactions may include, but are not limited to, one or more of the following (or combinations thereof):

- Single Tapping one or more interactive reveal region(s).
- Multi-tapping one or more interactive reveal region(s).
- Tapping one or more interactive reveal region(s) with a single finger (or single touch-point).
- Tapping one or more interactive reveal region(s) with multiple fingers (or multiple touch-points).
- Performing a sequence of taps on one or more interactive reveal region(s).
- Swiping across one or more interactive reveal region(s) (e.g., with a finger, multiple fingers, palm, etc.).
- Swiping across one or more interactive reveal region in a particular direction (e.g., up, down, left, right).
- Slapping a region of the touchscreen display.
- Interacting with an input interface of the gaming device, as required, to cause the values or identities of one or more of the obscured symbol(s) to be revealed/displayed. For example, a player may be required to slap or press a button on the gaming device to cause the values or identities of the obscured symbol(s) to be revealed/displayed.
- And/or other types of player inputs/activities.

According to different embodiments, each interactive reveal region may be configured or designed to display a respective portion of content, which, for example, may include, but are not limited to, one or more of the following (or combinations thereof):

- Image content such as, for example, a photograph, a drawing, etc.
- Animation content such as, for example, an image of an animated character, motion or moving animated content, etc. For example, in at least one embodiment, the interactive reveal region may be configured or designed to display motion animated content which conveys the appearance of a rapidly spinning reel (e.g., as illustrated at 2112 of FIG. 21).
- Video content, such as, for example, an animated video clip, a GIF, a non-animated video clip, etc.
- Text content such as, for example, alphanumeric characters, numbers, letters, words, symbols, punctuation, etc.
- Graphical content such as, for example, a cartoon graphic, a logo, graphics which include one or more types of patterns, symbols, objects, persons, lines, shading, colors, etc.

For example, as illustrated in the example embodiment of FIG. 16, interactive reveal regions 1612, 1614, 1616 are displayed in a manner so as to conceal or obscure viewing of three slot symbols. The player may be required to tap on each of the interactive reveal regions 1612, 1614, 1616 to cause the respective values or identities of the obscured symbol(s) to be revealed/displayed. In this example, it is assumed that the player interacts with interactive reveal region 1616 by tapping on a region of the touchscreen display corresponding to the interactive reveal region 1616.

In at least one embodiment, after a user interacts with a given interactive reveal region, the gaming device may respond by displaying additional graphical content in that region (e.g., such as, for example, an animated explosion (e.g., 1902, FIG. 19), a changed facial expression of a displayed character, etc.), as desired. This additional displayed content may provide additional entertainment value to the player, and/or may be used to provide a visual knowledge meant the player of the player's interaction with the interactive reveal region.

Figure 17:
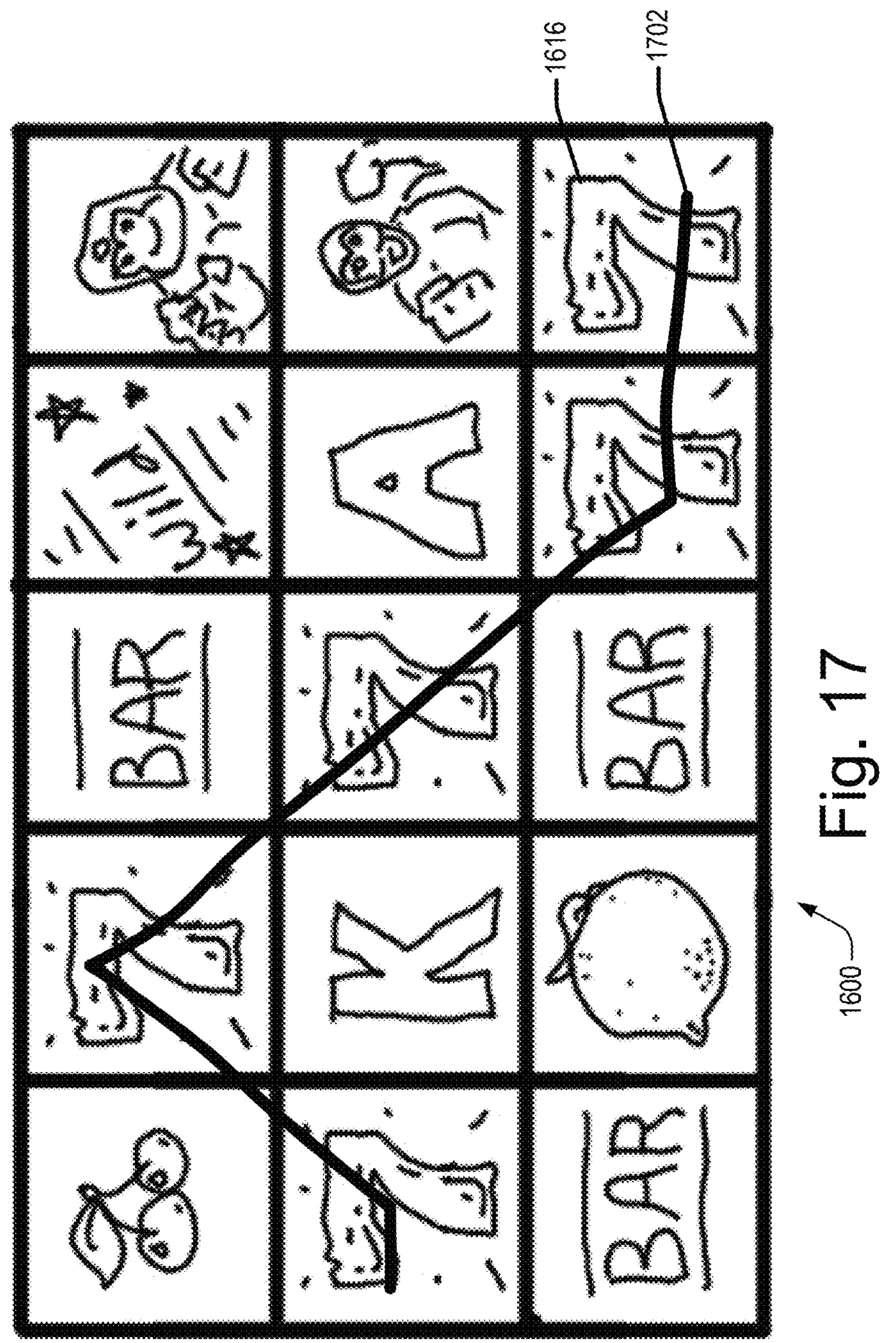

Additionally, after a user interacts with a given interactive reveal region, the gaming device may respond by revealing or displaying the value/identity of the obscured slot reel symbol, as shown, for example, at 1616 of FIG. 17.

FIG. 17 shows the example "Super Pow" screenshot GUI embodiment of FIG. 16 after the player has interacted with the interactive reveal region at 1616. As illustrated in the example embodiment of FIG. 17, the value/identity of the obscured slot reel symbol at 1616 is revealed/displayed to show a "7". In this particular example, after the revealing of the "7" symbol at 1616, the gaming device may generate and display a "win" line 1702, which visually indicates to the player a winning outcome of the wager-based slot reel spin event.

In some embodiments, the interactive reveal regions may be configured or designed to conceal, obscure, or otherwise prevent display of at least a portion of game event outcome content representing an outcome of a game event which has already been determined. For example, in one embodiment involving a wager-based electronic slot game event, the slot game event may be initiated at the gaming device, and the values/identities of each of the final slot reel symbols (representing the outcome of the slot reel spin) may be determined. However, in at least one embodiment, the interactive reveal regions may be configured or designed to conceal, obscure, or otherwise prevent display at least a portion of the determined values/identities of the slot reel symbols. An example of this technique is illustrated and described with respect to FIG. 27.

Figure 27:
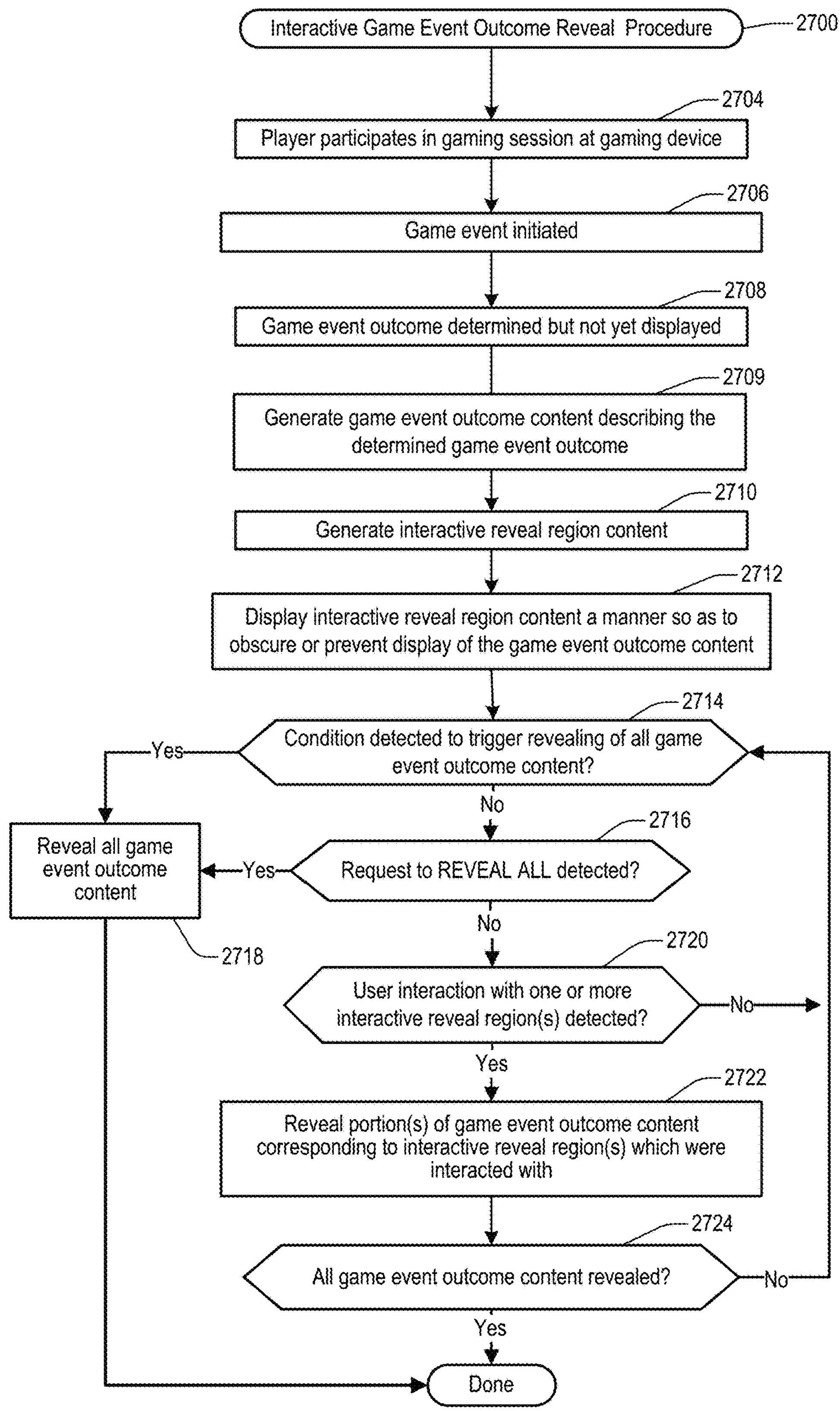

FIG. 27 shows an illustrative example of an embodiment of an Interactive Game Event Outcome Reveal Procedure 2700 in accordance with a specific embodiment. According to different embodiments, at least a portion of the various types of functions, operations, actions, and/or other features provided by the Interactive Game Event Outcome Reveal Procedure may be implemented at one or more gaming device(s), and/or at one or more server systems(s) of a gaming network.

In at least one embodiment, the Interactive Game Event Outcome Reveal Procedure may be operable to perform and/or implement various types of functions, operations, actions, and/or other features such as one or more of those described and/or referenced herein. In at least one embodiment, the Interactive Game Event Outcome Reveal Procedure may be operable to utilize and/or generate various different types of data and/or other types of information when performing specific tasks and/or operations. This may include, for example, input data/information and/or output data/information. For example, in at least one embodiment, the Interactive Game Event Outcome Reveal Procedure may be operable to access, process, and/or otherwise utilize information from one or more different types of sources, such as, for example, one or more local and/or remote memories, devices and/or systems. Additionally, in at least one embodiment, the Interactive Game Event Outcome Reveal Procedure may be operable to generate one or more different types of output data/information, which, for example, may be stored in memory of one or more local and/or remote devices and/or systems. Examples of different types of input data/information and/or output data/information which may be accessed and/or utilized by the Interactive Game Event Outcome Reveal Procedure may include, but are not limited to, one or more of those described and/or referenced herein.

In at least one embodiment, a given instance of the Interactive Game Event Outcome Reveal Procedure may access and/or utilize information from one or more associated databases. In at least one embodiment, at least a portion of the database information may be accessed via communication with one or more local and/or remote memory devices. Examples of different types of data which may be accessed by the Interactive Game Event Outcome Reveal Procedure may include, but are not limited to, one or more of those described and/or referenced herein.

According to specific embodiments, multiple instances or threads of the Interactive Game Event Outcome Reveal Procedure may be concurrently implemented and/or initiated via the use of one or more processors and/or other combinations of hardware and/or hardware and software. For example, in at least some embodiments, various aspects, features, and/or functionalities of the Interactive Game Event Outcome Reveal Procedure may be performed, implemented and/or initiated by one or more of the various systems, components, systems, devices, procedures, processes, etc., described and/or referenced herein.

According to different embodiments, one or more different threads or instances of the Interactive Game Event Outcome Reveal Procedure may be initiated in response to detection of one or more conditions or events satisfying one or more different types of minimum threshold criteria for triggering initiation of at least one instance of the Interactive Game Event Outcome Reveal Procedure. Various examples of conditions or events which may trigger initiation and/or implementation of one or more different threads or instances of the Interactive Game Event Outcome Reveal Procedure may include, but are not limited to, one or more of those described and/or referenced herein.

According to different embodiments, one or more different threads or instances of the Interactive Game Event Outcome Reveal Procedure may be initiated and/or implemented manually, automatically, statically, dynamically, concurrently, and/or combinations thereof. Additionally, different instances and/or embodiments of the Interactive Game Event Outcome Reveal Procedure may be initiated at one or more different time intervals (e.g., during a specific time interval, at regular periodic intervals, at irregular periodic intervals, upon demand, etc.).

In at least one embodiment, initial configuration of a given instance of the Interactive Game Event Outcome Reveal Procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Interactive Game Event Outcome Reveal Procedure may correspond to and/or may be derived from the input data/information. Referring to the procedural diagram of FIG. 27, as shown at 2704, it is assumed that a player participates in a gaming session at a gaming device. According to different embodiments, the gaming session may relate to a non-wager-based game, a wager-based game, or a hybrid arcade/wager-based game.

As shown at 2706, it is assumed that in-game event is initiated. As described herein, and in-game event may be characterized as an event which occurs within the gaming environment that has an associated outcome which is displayed to the player. Examples of in-game events may include wager-based game events (such as, for example, spinning of a slot reel, dealing of cards, rolling of dice, etc.), and/or non-wager-based game events (such as, for example, opening a treasure chest, casting a spell, fighting an opponent, opening a door, etc.).

As shown at 2708, an outcome of the identified game event is determined but not yet displayed. In at least one embodiment, the game event outcome may be determined using a random number generator (RNG). In at least one embodiment, the game event outcome may be determined using at least one pay table or payout schedule. In some embodiments, the game event outcome may be determined locally at the gaming device. In other embodiments, the game event outcome may be determined at a remote device. In at least some embodiments, the game event outcome may have been predetermined before the in-game event is initiated. In other embodiments, the game event outcome may be automatically and dynamically determined in response to the initiation of the in-game event.

In at least some embodiments, after the in-game event has been initiated, and its outcome determined, the system may generate (2709) a first portion of game event outcome content relating to the determined game event outcome, which is to be displayed at the gaming device display. For example, in a slot reel game, the spinning of a slot reel may correspond to the initiation of the in-game event, and the gaming device may use an RNG engine to determine a first set of numeric values which represents the outcome of the slot reel spin. In at least one embodiment, the gaming device may include a data table stored in memory of the gaming device which defines associations between each numeric value and a respective slot reel symbol. Using this data table, and the first set of numeric values representing the game event outcome, the gaming device may generate game event outcome content which, for example, may include one or more lines or rows of slot reel symbols. In at least one embodiment, the game event outcome content may also include content describing any payouts, winnings, awards, bonuses, rewards, etc. which the player has earned as a result of the game event outcome.

In conventional slot reel games, the game event outcome content, which includes the final slot reel symbols, may be displayed immediately after the spinning of the slot reels has ceased. However, unlike conventional slot reel games, the interactive event outcome reveal techniques described herein may be employed at a gaming device to obscure, cover, or otherwise prevent display of at least a portion of the game event outcome content, as illustrated, for example, in FIG. 16.

Accordingly, as shown at 2710, the system may generate interactive reveal region content which may be used to obscure, cover, or otherwise prevent display of at least a portion of the game event outcome content.

As shown at 2712, the system may cause the interactive reveal region content to be displayed a manner which obscures or prevents the display of at least a portion of the game event outcome content.

In at least one embodiment, the game may be configured or designed to allow the player to interact with the displayed interactive reveal regions in order to cause the values or identities of the obscured game event outcome content (e.g., obscured slot reel symbol(s)) to be revealed/displayed. In at least some embodiments, if the player is not interested in interacting with the displayed interactive reveal regions to reveal the game event outcome content, the system may be configured or designed to allow the player to disable this feature. Alternatively, the gaming device may be configured or designed to provide functionality (2716) for allowing the player to electively choose to “reveal all” game event outcome content (2718), for example, by pushing or tapping an appropriate button at the gaming device (e.g., such as by tapping the “REVEAL ALL” virtual button 2120 of FIG. 21).

In at least one embodiment, the gaming device may include functionality for automatically displaying the entirety of the game event outcome content (2718) in response to detecting (2714) one or more conditions for triggering the revealing of all game event outcome content, such as, for example, after a predetermined time interval has elapsed without receiving appropriate instructions for input from the player; upon detecting a wager-based triggering event; upon detecting that that a new in-game event (e.g., wager-based spin of slot reel) is to be initiated; etc.

In at least one embodiment, if the gaming device detects (2720) that the player has interacted with one or more of the displayed interactive reveal region(s), the system may respond by automatically revealing the portion(s) of game event outcome content that was obscured by the interactive reveal region(s) which have been interacted with by the player. For example, referring to FIGS. 16 and 17, if the player interacts with interactive reveal region 1616 (e.g., by tapping on a region of the touchscreen display where the interactive reveal region 1616 is displayed), the gaming device may respond by revealing or displaying the obscured slot reel symbol, as shown, for example, at 1616 of FIG. 17. In at least one embodiment, this process may continue until the entirety of the game event outcome content is revealed/displayed.

It will be appreciated that the procedural diagrams of FIGS. 10-13, and 27 are merely specific examples of procedural flows and/or other activities which may be implemented to achieve one or more aspects of the Interactive Game Event Outcome Reveal techniques described herein. Other embodiments of procedural flows (not shown) may include additional, fewer and/or different steps, actions, and/or operations than those illustrated in the example procedural diagrams of FIGS. 10-13, and 27, and/or may be configured or designed to execute the various steps, actions, operations in different orders than those described with respect to the specific example embodiments of FIGS. 10-13, and 27.

Figure 18:
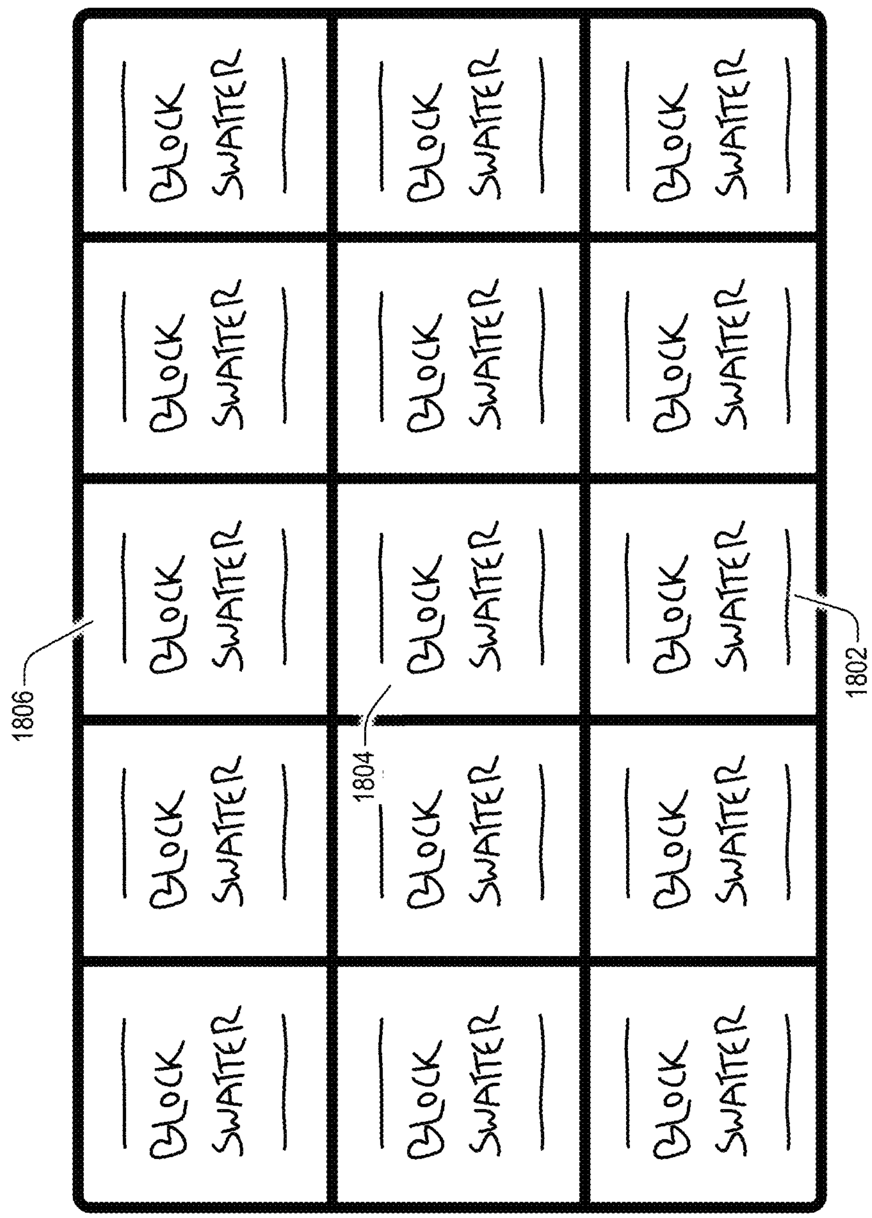
Figure 19:
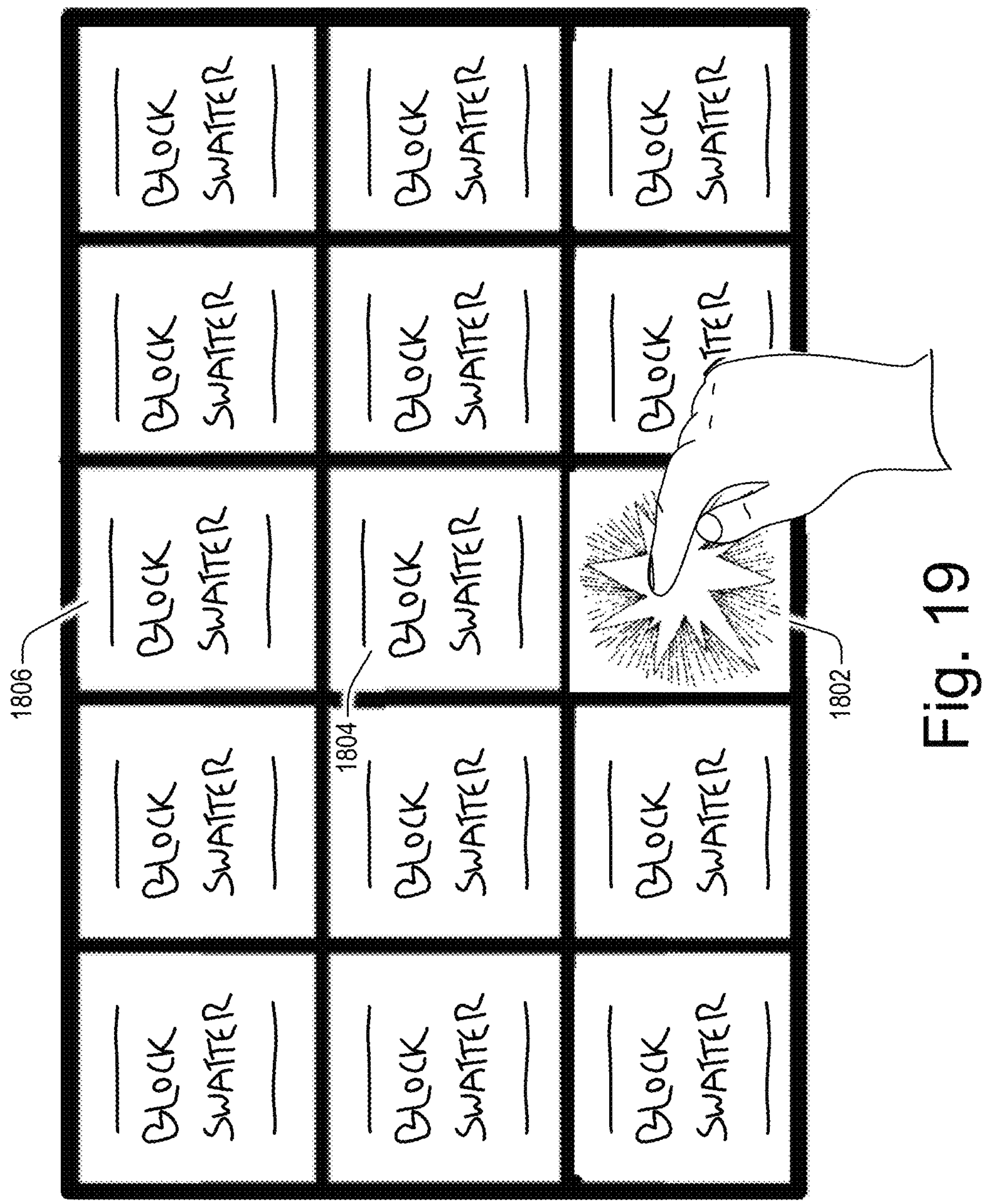
Figure 20:
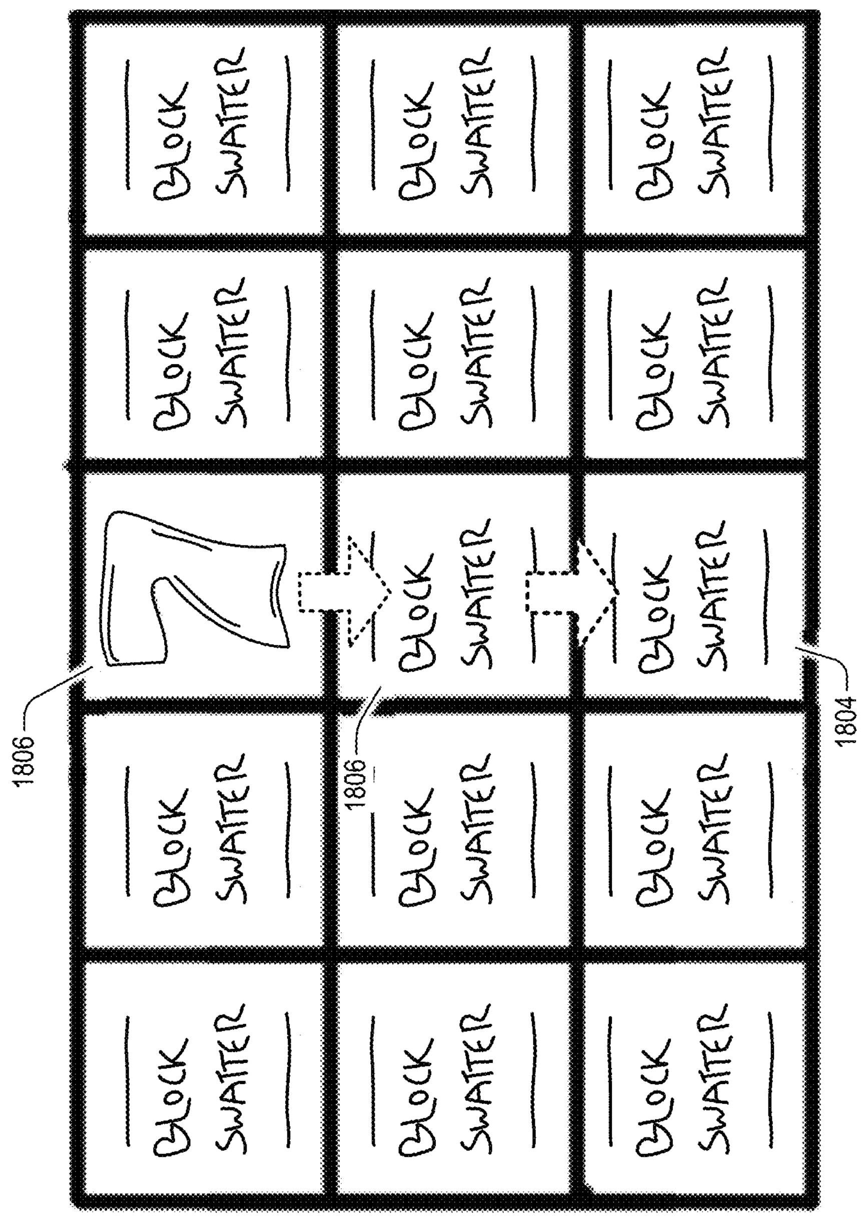

FIGS. 18-20 illustrate an example screenshot embodiments of a “Block Swatter” interactive event outcome reveal graphical user interface (GUI) which may be used to facilitate, initiate and/or perform various operation(s) and/or action(s) relating to one or more of the interactive event outcome reveal techniques described herein.

In the specific example embodiment of FIG. 18, a 3×5 grid of tiles (e.g., 1802, 1804, 1806, etc.) is displayed which collectively may be used to represent an outcome of a 3-line electronic slot game event. As illustrated in the example embodiment of FIG. 18, one or more tiles of the Block Swatter GUI may be configured or designed to display a respective portion of interactive reveal region content (e.g., "Block Swatter" graphic). The displayed portions of interactive reveal region content may be employed to conceal or obscure viewing of game event outcome content (such as, for example, the values or identities of one or more slot reel symbols representing the final outcome of a slot reel spin event).

As illustrated in the example embodiment of FIG. 18, the portions of interactive reveal region content may cover or obscure all of the slot reel symbols which represent the outcome of a slot reel spin event. In other embodiments, only a portion of the game event outcome content may be obscured.

In at least one embodiment, when the player interacts with a selected portion of interactive reveal region content (e.g., by tapping on a region of the touchscreen display corresponding to selected portion of interactive reveal region content), a portion of the game event outcome content may be revealed. However, in at least one embodiment of the Block Swatter interactive event outcome reveal technique, the portion of game event outcome content which is revealed may not necessarily correspond to the portion of game event outcome content which was obscured by the selected portion of interactive reveal region content.

For example, in at least one embodiment, the Block Swatter interactive event outcome reveal technique may be configured or designed to simulate one or more columns of physical blocks which are stacked on top of each other. When a selected block is removed from a stacked column of blocks, all blocks which were stacked above the removed block automatically shift downwards to fill the open spot(s), similar to the way it might occur in the physical world.

By way of illustration, referring to FIG. 19, it is assumed that the player has elected to tap on the portion of interactive reveal region content (e.g., "Block Swatter") displayed at tile region 1802. When the gaming device detects this activity, it may respond by removing the interactive reveal region content displayed at 1802 (e.g., which is graphically represented in FIG. 19 by displaying graphical content of an explosion at tile region 1802, and may be accompanied by sounds of an explosion emanating from the gaming device speakers). Thereafter, as shown in FIG. 20, the gaming device may shift the display of the "Block Swatter" content from 1804, 1806 downward (to 1802, 1804 respectively) to fill in the empty spaces created by the removal of the "Block Swatter" content at tile region 1802. As a result of the downward shifting of the "Block Swatter" content from 1804, 1806 to 1802, 1804, respectively, the value or identity of the slot reel symbol at tile region 1806 (e.g., "7"), which was previously obscured, is revealed/displayed to the player.

In at least some embodiments, the gaming device may be configured or designed to allow the player to determine which blocks to remove and in what order, by selectively interacting with one or more of the portions of displayed interactive reveal region content. According to different embodiments, the various types of interactions which may be performed by the player to cause the game event outcome content (including winnings, pay lines, awards, etc.) to be revealed may include one or more of the different types of interactions described herein.

Figure 21:
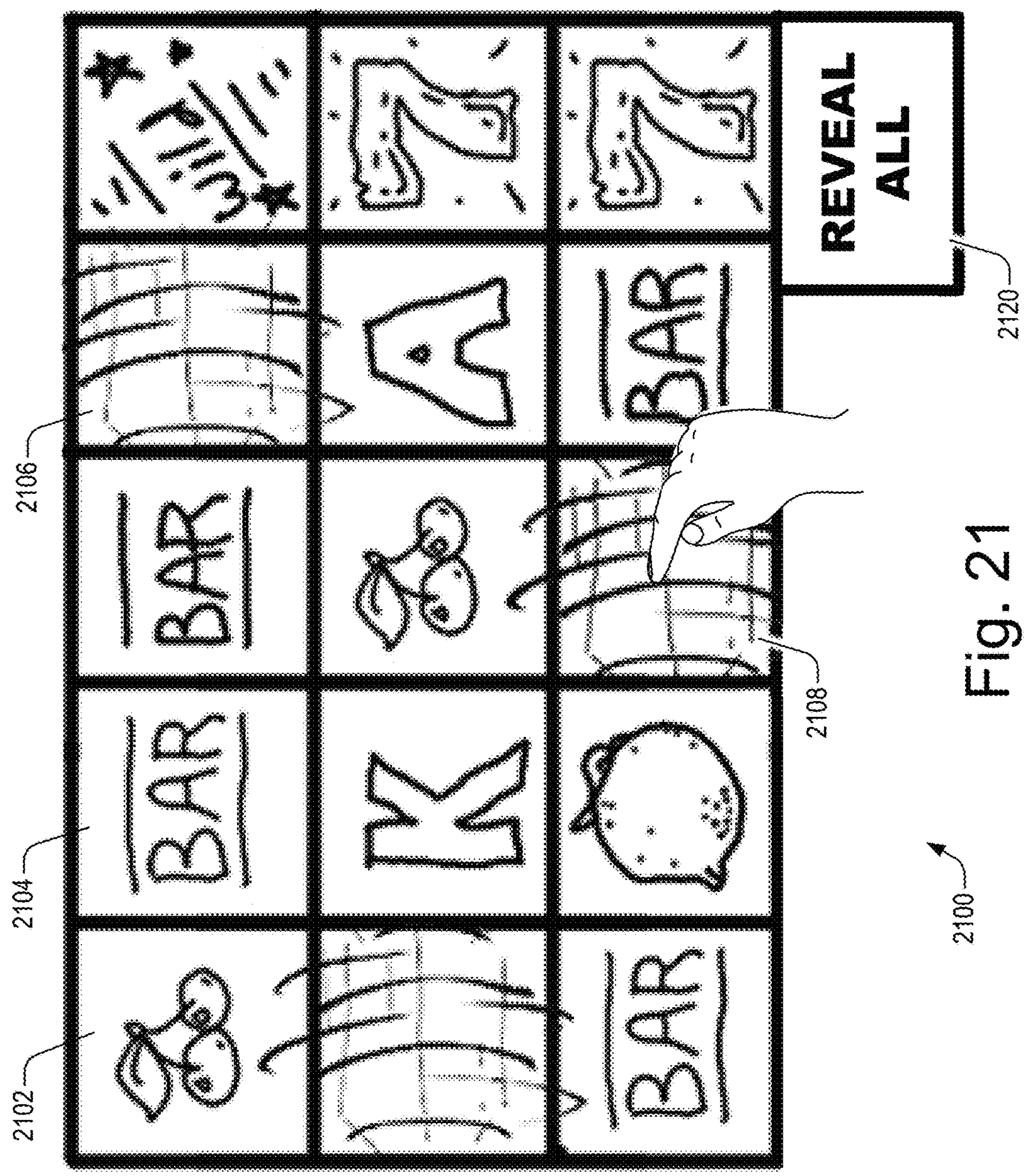
Figure 22:
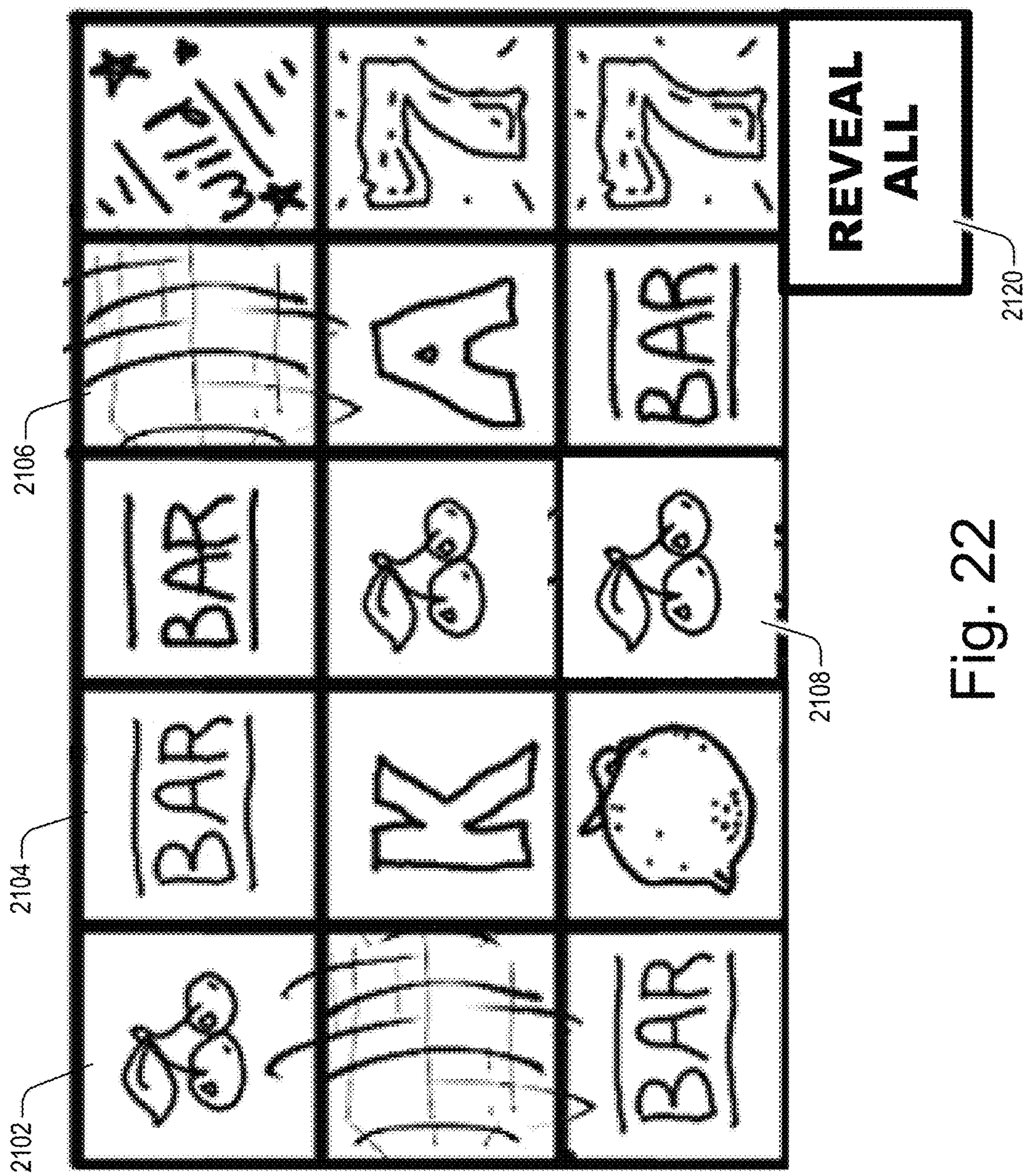

FIGS. 21-22 illustrate example screenshot embodiments of a "Flip Spin" interactive event outcome reveal graphical user interface (GUI) which may be used to facilitate, initiate and/or perform various operation(s) and/or action(s) relating to one or more of the interactive event outcome reveal techniques described herein.

In the specific example embodiment of FIG. 21, a 3×5 grid of tiles (e.g., 2102, 2104, 2106, 2108, etc.) is displayed which collectively may be used to represent an outcome of a 3-line electronic slot game event. As illustrated in the example embodiment of FIG. 21, one or more tiles of the Flip Spin GUI may be configured or designed to display a respective portion of interactive reveal region content (e.g., "Flip Spin" graphic), as illustrated, for example, at 2106, 2108. The displayed portions of interactive reveal region content may be employed to conceal or obscure viewing of game event outcome content (such as, for example, the values or identities of one or more slot reel symbols representing the final outcome of a slot reel spin event).

As illustrated in the example embodiment of FIG. 21, the portions of interactive reveal region content may cover or obscure at least a portion of the slot reel symbols representing the outcome of a slot reel spin event. In other embodiments, the portions of interactive reveal region content may obscure all of the game event outcome content.

In at least one embodiment, as illustrated in FIG. 21, for example, the portions of displayed interactive reveal region content may be configured to appear as a rapidly spinning reel, tile, or other object (e.g., which is spinning or rotating along a central axis).

In at least one embodiment, when the player interacts with a selected portion of interactive reveal region content (e.g., by tapping on a region of the touchscreen display corresponding to selected portion of interactive reveal region content), a portion of the game event outcome content may be revealed. By way of illustration, referring to FIG. 21, it is assumed that the player has elected to tap on the portion of interactive reveal region content (e.g., "Flip Spin" graphic) displayed at tile region 2108. When the gaming device detects this activity, it may respond by displaying or revealing the value or identity of the slot reel symbol at tile region 2108 (e.g., cherry symbol), which was previously obscured by the interactive reveal region content, as illustrated, for example in FIG. 22.

In at least one embodiment, after the player taps on the "Flip Spin" graphic displayed at tile region 2108, and before the game event outcome content is revealed, the gaming device may generate and/or display additional graphical content at tile region 2108 which, for example, may give the appearance of a spinning reel slowing down and finally stopping on the slot reel symbol which corresponds to the game event outcome symbol for tile region 2108 (e.g., cherry symbol).

In at least some embodiments, the gaming device may be configured or designed to allow the player to determine which game event outcome content portions to be revealed and in what order, by selectively interacting with one or more of the portions of displayed interactive reveal region content. According to different embodiments, the various types of interactions which may be performed by the player to cause the game event outcome content (including winnings, pay lines, awards, etc.) to be revealed may include one or more of the different types of interactions described herein.

In some embodiments, as illustrated in FIG. 21, for example, the gaming device may be configured or designed to include functionality for allowing the player to electively choose to "reveal all" game event outcome content (e.g., via player tapping on the "REVEAL ALL" button 2120).

In some embodiments, the identity/value of each of the obscured game event outcome symbols is known or predetermined, and thus, the player's interaction with the interactive reveal region content will not have any effect or influence on the identities/values of the game event outcome symbols which are subsequently revealed in response to the player's interactions. In such embodiments, the interactive event outcome reveal techniques may be advantageously employed to add additional excitement to the patron's game play experience, for example, by playing on the patron's various senses and beliefs such as, for example, anticipation, suspense, superstitions, etc.

In other embodiments, a player's interaction with a displayed interactive reveal region may serve as a triggering event for causing an outcome of an identified in-game event to be determined. For example, in at least some embodiments, the identity/value of a first game event outcome (e.g., slot reel symbol) may not be known or determined before the player interacts with a displayed interactive reveal region, and may be subsequently determined in response to the player's interaction with the displayed interactive reveal region.

In some embodiments, the player's interaction with the interactive reveal region may not have any effect or influence on the identities/values of the game event outcome symbols which are subsequently revealed in response to the player's interactions, such as, for example, in embodiments where the symbol(s) of a game event outcome are determined using an RNG engine.

In other embodiments, the player's interaction with the interactive reveal region may have any effect or influence on the identities/values of the game event outcome symbols which are subsequently revealed in response to the player's interactions, such as, for example, in embodiments where the player's skill or timing may affect or influence the game event outcome.

Figure 23:
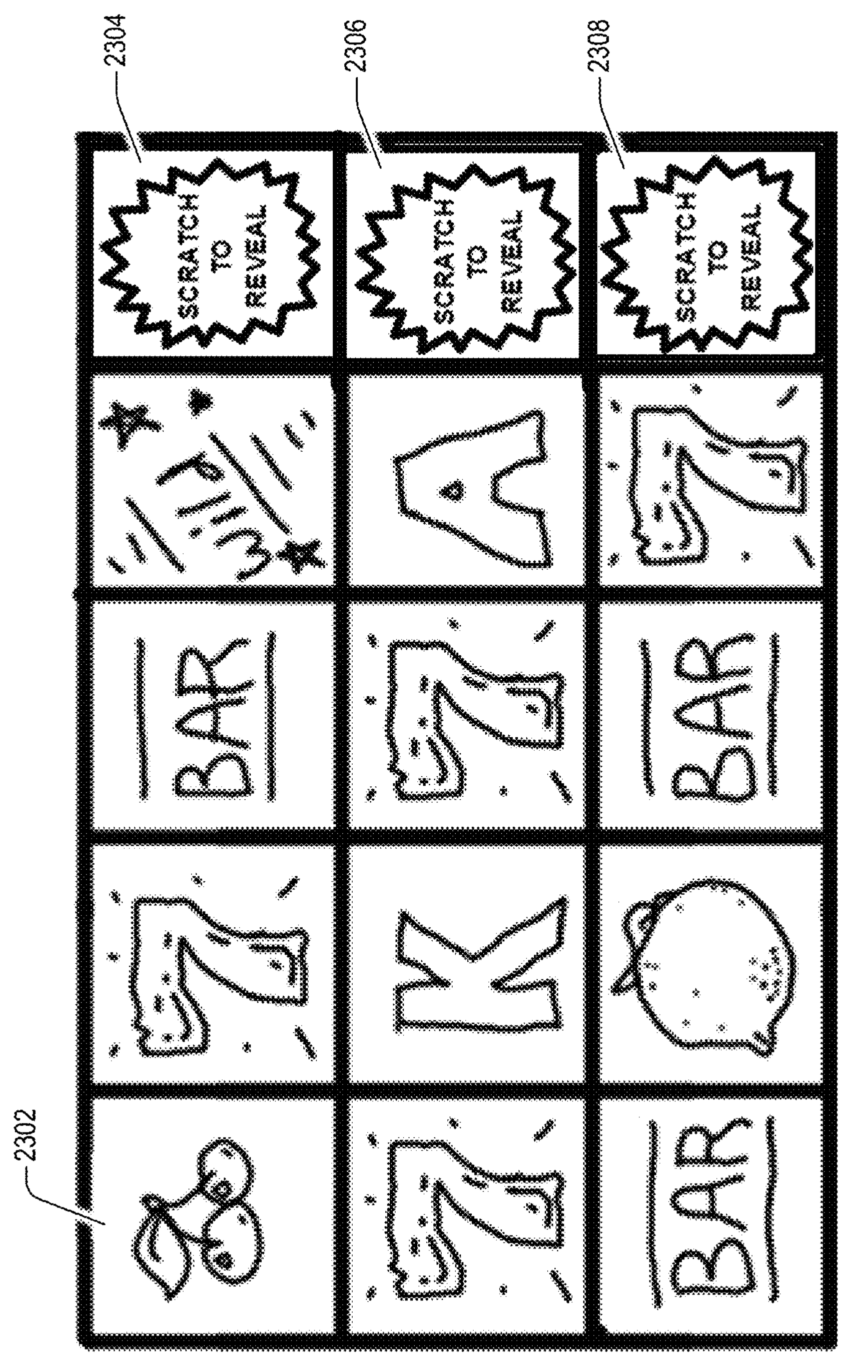

FIG. 23 illustrates example screenshot embodiment of a "Scratch Off" interactive event outcome reveal graphical user interface (GUI) which may be used to facilitate, initiate and/or perform various operation(s) and/or action(s) relating to one or more of the interactive event outcome reveal techniques described herein.

In at least one embodiment, the Scratch Off interactive event outcome reveal technique may be implemented in a manner similar to that of a physical scratch-and-win lottery ticket. In one embodiment, portions of "Scratch Off" reveal region content (e.g., "Scratch Off" graphic) may be displayed to hide or obscure game event outcome content that is displayed at the gaming device. In some embodiments where some or all of the obscured game event outcome content is predetermined, and the Scratch Off interactive event outcome reveal technique provides the patron with the illusion of skill/luck. In at least one embodiment, the patron may "scratch" the screen (e.g., touchscreen display) to reveal the obscured game event outcome content.

By way of illustration with reference to FIG. 23, a 3×5 grid of tiles (e.g., 2302, 2304, 2306, 2308, etc.) is displayed which collectively may be used to represent an outcome of a 3-line electronic slot game event. As illustrated in the example embodiment of FIG. 23, one or more tiles of the Scratch Off GUI may be configured or designed to display a respective portion of interactive reveal region content (e.g., "Scratch Off" graphic), as illustrated, for example, at 2304, 2306, 2308. The displayed portions of interactive reveal region content may be employed to conceal or obscure viewing of game event outcome content (such as, for example, the values or identities of one or more slot reel symbols representing the final outcome of a slot reel spin event).

As illustrated in the example embodiment of FIG. 23, the portions of interactive reveal region content may cover or obscure at least a portion of the slot reel symbols representing the outcome of a slot reel spin event. In other embodiments, the portions of interactive reveal region content may obscure all of the game event outcome content.

In at least one embodiment, as illustrated in FIG. 23, for example, the portions of displayed interactive reveal region content may include text content such as, for example, "scratch to reveal" and/or may include graphical content which is similar in appearance to a "scratch off" region of a lottery ticket or other type of "scratch off" instrument.

In at least one embodiment, a player may cause a desired portion of obscured game event outcome content (e.g., at region 2308) to be revealed, for example, by using his finger(s), body parts, or other suitable objects to scratch across a region of the touchscreen display corresponding to selected portion of displayed interactive reveal region content (e.g., tile region 2308). By way of illustration, referring to FIG. 23, it is assumed that the player has elected to "scratch off" a portion of interactive reveal region content displayed at tile region 2308. When the gaming device detects this activity, it may respond by displaying or revealing the value or identity of the slot reel symbol at tile region 2308 (e.g., cherry symbol), which was previously obscured by the interactive reveal region content.

In at least one embodiment, as the player scratches on the touchscreen region, the gaming device may generate and/or display additional graphical content at tile region 2308 which, for example, may give the appearance of the displayed interactive reveal region content (e.g. at region 2308) being scratched off or removed in a manner similar to that of a physical "scratch off" lottery ticket, thereby slowly revealing the value or identity of the "underlying" slot reel symbol or other game event outcome content. In at least some embodiments, the Scratch Off interactive event outcome reveal technique may allow the player to perform other types of interactions to cause the game event outcome content to be revealed such as, for example, rubbing a portion of displayed interactive reveal region content (e.g., rubbing a displayed image of a genie's lamp), shaking the gaming device (e.g., in embodiments where the game is conducted on a mobile or handheld gaming device), slapping or knocking away displayed portions of interactive reveal region content, etc.

In at least some embodiments, the gaming device may be configured or designed to allow the player to determine which game event outcome content portions to be revealed and in what order, by selectively interacting with one or more of the portions of displayed interactive reveal region content. According to different embodiments, the various types of interactions which may be performed by the player to cause the game event outcome content (including winnings, pay lines, awards, etc.) to be revealed may include one or more of the different types of interactions described herein.

In some embodiments the gaming device may be configured or designed to include functionality for allowing the player to electively choose to "reveal all" game event outcome content without requiring the player to interact with individual portions of displayed interactive reveal region content.

In some embodiments, the identity/value of each of the obscured game event outcome symbols is known or predetermined, and thus, the player's interaction with the interactive reveal region content may not have any effect or influence on the identities/values of the game event outcome symbols which are subsequently revealed in response to the player's interactions. In such embodiments, the interactive event outcome reveal techniques may be advantageously employed to add additional excitement to the patron's game play experience, for example, by playing on the patron's various senses and beliefs such as, for example, anticipation, suspense, superstitions, etc.

In some embodiments, the player's interaction with the interactive reveal region may not have any effect or influence on the identities/values of the game event outcome symbols which are subsequently revealed in response to the player's interactions, such as, for example, in embodiments where the symbol(s) of a game event outcome are determined using an RNG engine.

Figure 24:
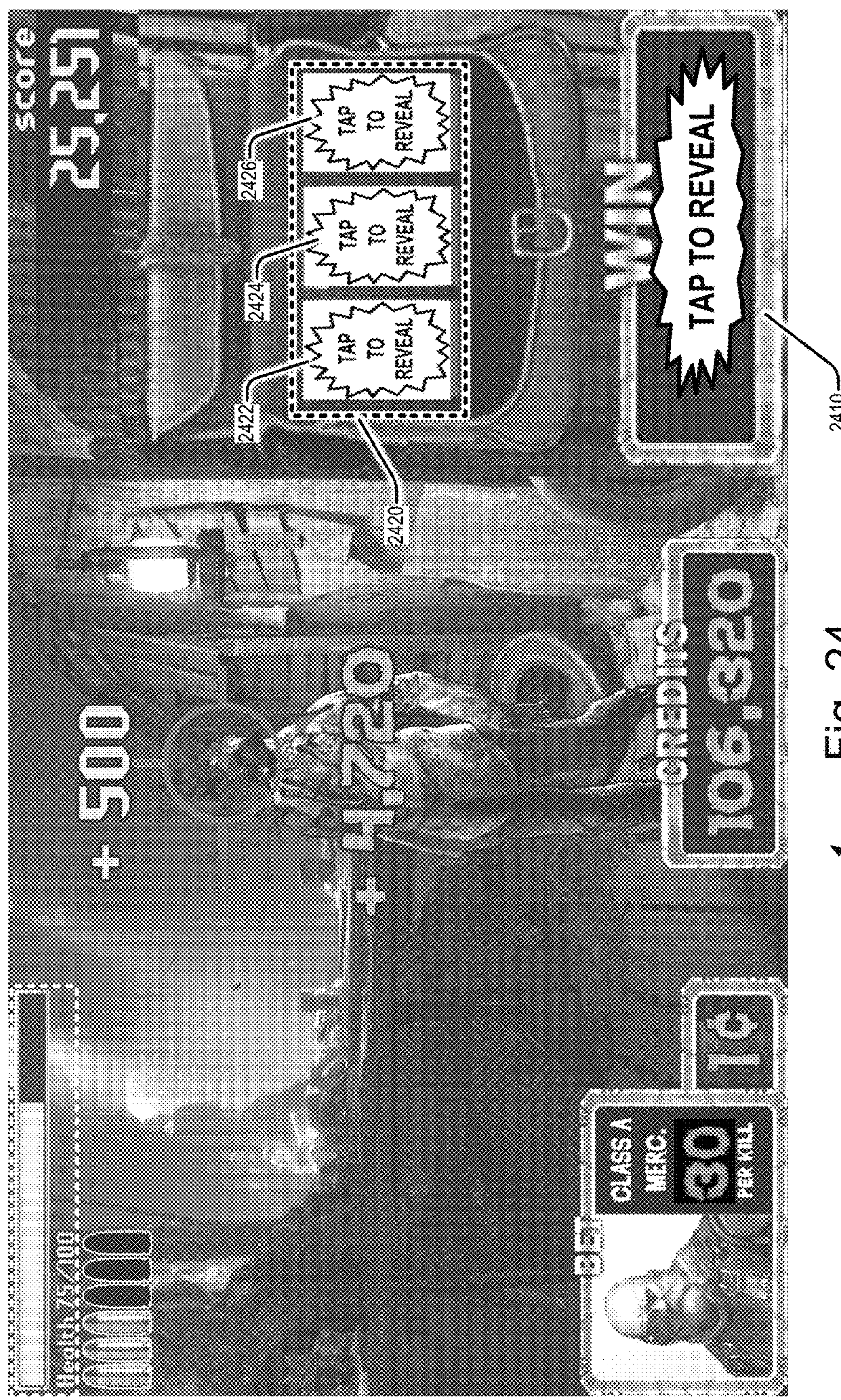
Figure 25:
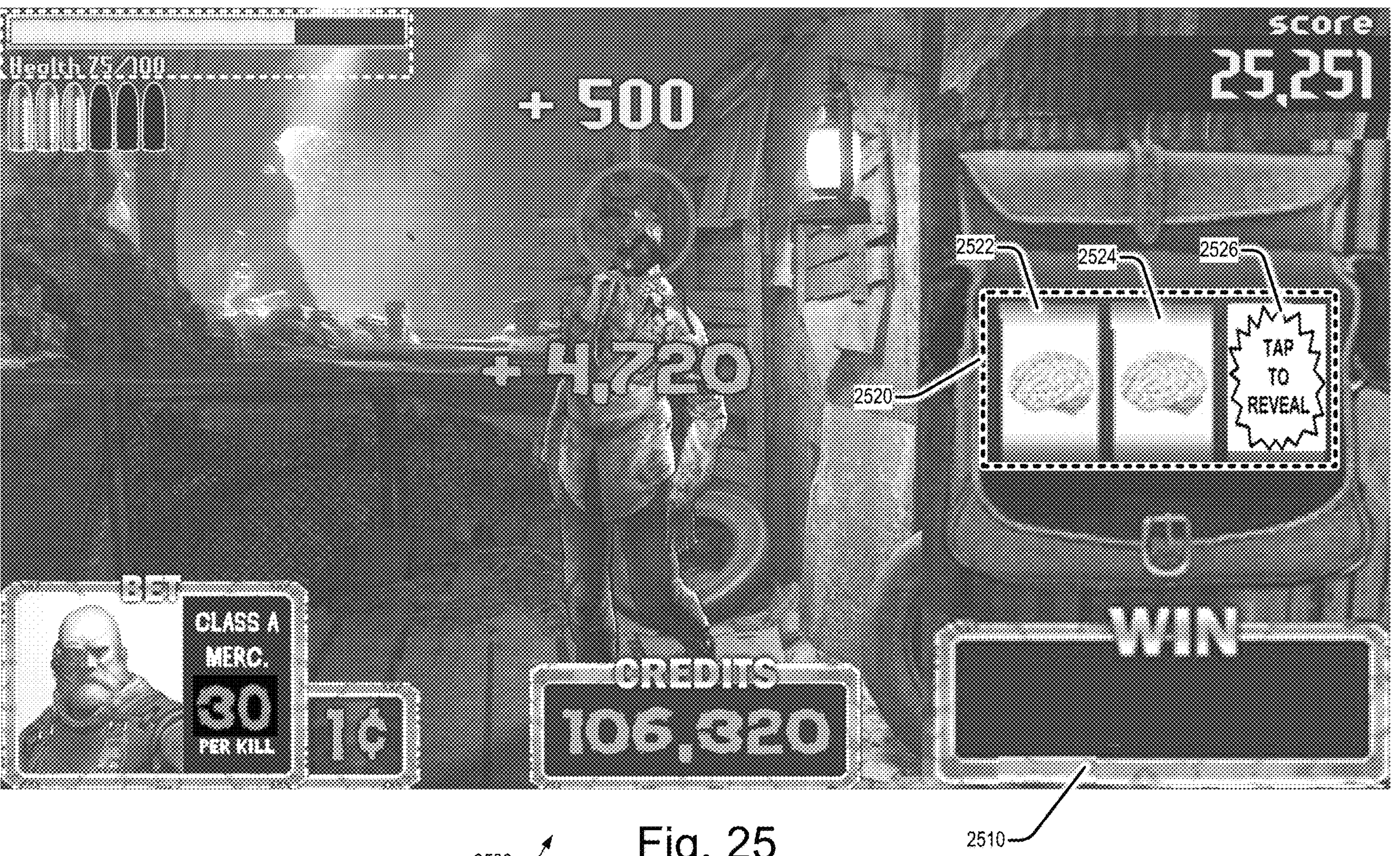
Figure 26:
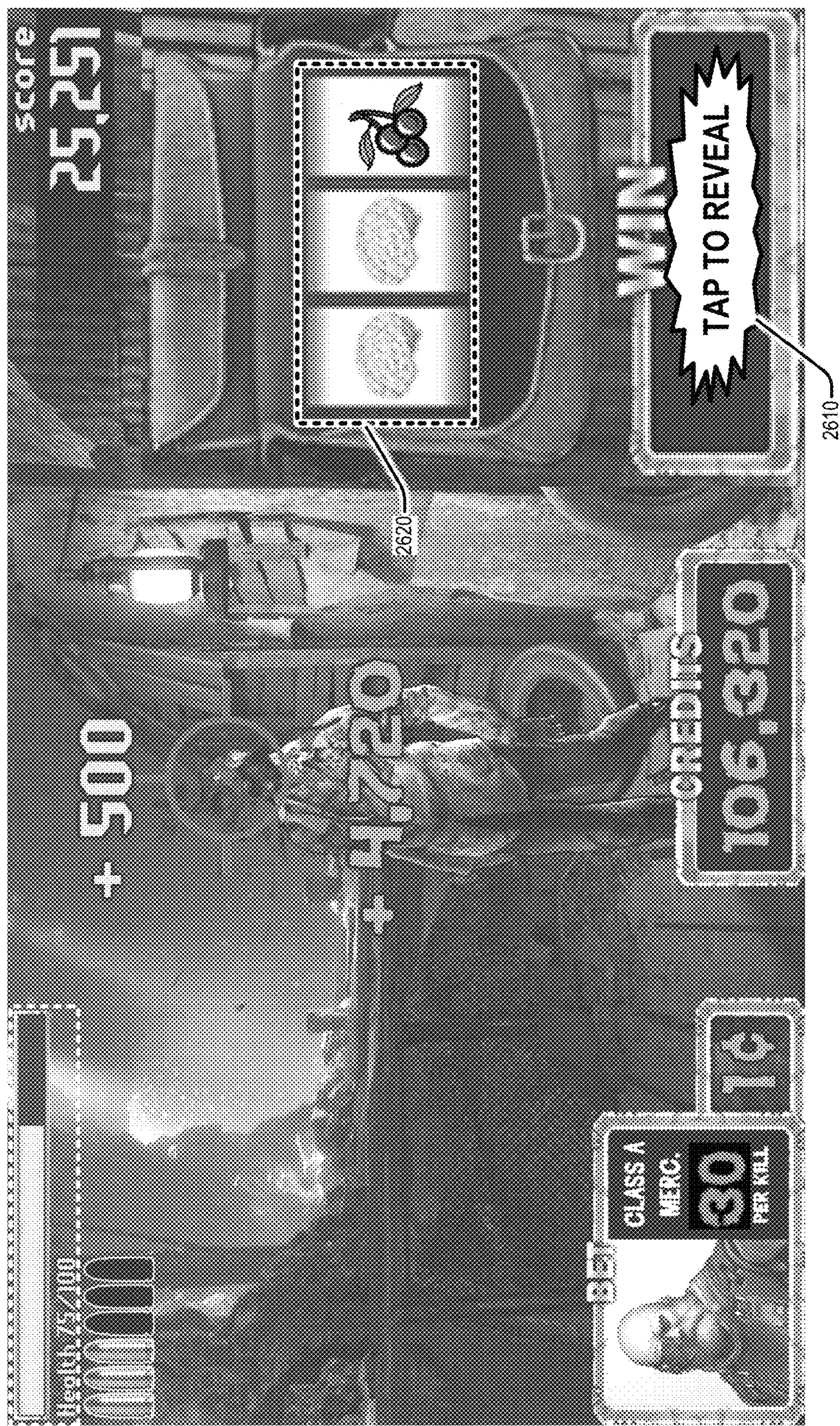

FIGS. 24-26 illustrate example screenshot embodiments of HAWG GUIs which may be configured or designed to include interactive event outcome reveal functionality for facilitating, initiating and/or performing various operation(s) and/or action(s) relating to one or more of the interactive event outcome reveal techniques described herein.

In the specific example embodiment of FIG. 24, it is assumed that the player has triggered an occurrence of a wager-based triggering event, which initiates a wager-based spin of the slot reel GUI 2420. In this particular embodiment, as illustrated in FIG. 24, the gaming device is configured or designed to display portions of interactive reveal region content at each of the slot reel symbol regions (e.g., 2422, 2424, 2426), as well as at the Win GUI region 2410. In one embodiment, the player may elect to individually tap on each of the interactive reveal region content displayed at each of the slot reel symbol regions (e.g., 2422, 2424, 2426) to cause the identities of each of the slot reel symbols to be revealed. In one embodiment, the gaming device may also be configured or designed to allow the player to tap on the interactive reveal region content displayed at the Win GUI region 2410 to cause the gaming device to display any payout(s) or winning(s) which the player has been awarded in connection with the outcome of the wager-based slot reel spin. In one embodiment, if the player elects to first tap on the interactive reveal region content displayed at the Win GUI region 2410, the gaming device may respond by displaying the identities of each of the slot reel symbols, as well as any payout(s) or winning(s) which the player has been awarded in connection with the outcome of the wager-based slot reel spin.

In some embodiments, after a slot reel spin event has been initiated, and the slot reel spin outcome symbols have been determined or identified at the gaming device (but not yet displayed), any row(s) and/or column(s) which are to display "winning symbol(s)" for one or more payout line(s) may be automatically covered or obscured by interactive reveal region content, in order to conceal the fact that that the player has already won, and provide an opportunity for the player to experience increased enjoyment or exhilaration by allowing the player to control the revealing of the "winning symbol(s)". By way of illustration, referring to FIG. 25, it is assumed that the player has triggered the occurrence of a wager-based triggering event, which initiates a wager-based spin of the slot reel GUI 2520.

In a first scenario, the gaming machine may determine that the symbols to be displayed as the slot reel spin outcome are: Brain, Brain, Brain, which represents a jackpot win. In this example scenario, the gaming device may be configured or designed to display the first two Brain symbols at 2522, 2524, and to obscure the identity of the third slot reel symbol by displaying interactive reveal region content (e.g., "TAP TO REVEAL") at region 2526. Additionally, as illustrated in the example embodiment of FIG. 25, the gaming device may also be configured or designed to prevent display of the player's winnings at Win GUI portion 2510, in order to conceal the fact that that the player already has won, and to provide an opportunity for the player to experience increased anticipation by allowing the player to control the revealing of the third slot reel symbol. In one embodiment, after the player taps on the interactive reveal region content (e.g., "TAP TO REVEAL") at region 2526, the gaming device may respond by displaying the third Brain symbol at region 2526, along with displaying the player's winnings (if any) at Win GUI portion 2510.

In a second scenario, the gaming machine may determine that the symbols to be displayed as the slot reel spin outcome are: Brain, Brain, Cherry, which does not represent a jackpot win. In this example scenario, the gaming device may be configured or designed to display the first two Brain symbols at 2522, 2524, and to obscure the identity of the third slot reel symbol by displaying interactive reveal region content (e.g., "TAP TO REVEAL") at region 2526. In one embodiment, after the player taps on the interactive reveal region content (e.g., "TAP TO REVEAL") at region 2526, the gaming device may respond by displaying the Cherry symbol at region 2526, along with displaying the player's winnings (if any) at Win GUI portion 2510.

In at least one embodiment, as illustrated in the example embodiment of FIG. 25, while there still remains unrevealed game event outcome content, the gaming device may be configured or designed to prevent display of the player's winnings at Win GUI portion 2510, in order to conceal the fact that that the player already has won/lost, and to provide an opportunity for the player to experience increased anticipation by allowing the player to control the revealing of the third slot reel symbol. In this way, the interactive event outcome reveal techniques described herein may be advantageously employed to provide additional entertainment value to the player, regardless of whether or not the player obtains a favorable game event outcome and/or receives a winning payout.

In the specific example embodiment of FIG. 26, it is assumed that the player has triggered an occurrence of a wager-based triggering event, which initiates a wager-based spin of the slot reel GUI 2620. In this particular embodiment, as illustrated in FIG. 26, the gaming device is configured or designed to display the outcome of the slot reel spin at slot reel GUI 2620. However, in this particular embodiment, the gaming device may also be configured or designed to hide or obscure any winnings the player may have received by displaying interactive reveal region content at Win GUI portion 2610, thereby providing an opportunity for the player to experience increased anticipation by allowing the player to control the revealing of any winnings or payouts awarded to the player.

According to different embodiments, the patron's ability to interact with the interactive reveal content may vary based on the design and layout of a particular game. However, in at least one embodiment, it may be desirable to configure, design, and/or employ the interactive event outcome reveal techniques in a manner which does not significantly impede or slow the player's speed of game play. Additionally, it may be desirable to configure, design, and/or employ the interactive event outcome reveal techniques in a manner which does not significantly diminish the player's enjoyment of the game.

Further, it may be desirable to configure, design, and/or employ the interactive event outcome reveal techniques in a manner which provides additional entertainment value to the player (e.g., regardless of whether or not the player obtains a favorable game event outcome and/or receives a winning payout), for example, by providing opportunities for the player to experience a "deeper" emotional connection to game event outcomes.

For example, many players tend to get lost within a gaming machine's flashing lights, spinning reels, dancing symbols, etc. However, the interactive event outcome reveal techniques disclosed herein provides players with the added benefit of being able to physically and proactively interact with the gaming machine (and displayed content), rather than being a passive observer.

Additionally, the interactive event outcome reveal techniques disclosed herein may provide additional benefits to players who commonly exhibit the habit of physically interacting with gaming machines (even when not required by the game), by providing such players with an outlet for expressing their desires or habits to physically interact with the gaming machines. Moreover, the interactive event outcome reveal techniques disclosed herein provide a mechanism for channeling all of the "touchy feely" human aspects of interaction to the actual gameplay screen, where the action is really occurring.

According to different embodiments, a player can choose to interact with the interactive reveal region content in multiple ways. For example, in one example scenario, a player may be on a hot winning streak and just can't be bothered with any additional tapping or swiping gestures. In at least one embodiment, the player can simply bypass the graphical interactive outcome reveal interactions by initiating an additional slot reel spin, or by providing input to disable the graphical interactive outcome reveal interactions. In some embodiments, the gaming device may provide special graphical button for allowing the player to toggle interactive outcome reveal interaction feature on/off, and/or to allow the player to skip or dismiss some or all of graphical interactive outcome reveal interactions.

In another example scenario, a player may prefer to "tickle the gaming screen" as the virtual slot reels spin. Using one or more of the interactive event outcome reveal techniques described herein, the player may be provided with one or more opportunities to "tickle the reveal" game event outcome content, thereby providing an opportunity for the player to obtain greater fulfillment during the gaming experience by allowing the player to perform his or her preferred post hoc behavior(s) to cause the revealing of the winning symbols (and/or other game event outcome content). This facilitates the strengthening of the player bond between physical, emotional, and mechanical attachment to the game and/or gaming machine.

According to different embodiments, players may be allowed to interact with the interactive reveal region content in a number of ways, including one or more of the various types of player interactions described above. By way of illustration, in some embodiments, a player may use his palm to "flat-hand wipe the screen" to cause the game event outcome content to be revealed. All the while the player's hand is moving across the touchscreen, the gaming device may be configured or designed to respond by displaying various graphics and other content according to the gameplay design (such as, for example, explosions, collisions, physics based, etc.).

In yet another scenario, a player may prefer to take his time and individually reveal each portion of game event outcome content in order to enhance the player's own anticipation and suspense. For example, in one example embodiment, one or more of the displayed portions of interactive reveal region content may be configured or designed to resemble the "scratch-off" layer of a classic "scratch-off" ticket (e.g., resembling the ever popular silver metallic coating that is delightfully removed via coins, keys, fingernails, etc.). The resemblance of the sliver-metallic coating already brings a sense of "what needs to be done" in the players mind, yet how each chooses to perform the "scratch-off" interaction may vary greatly from player to player. For example, one player may start by slowly "scratching" a corner away, and while doing so, some sort of graphical animation may be displayed (e.g., sparkly dust, etc.). The player may continue to slowly scratch away at the interactive reveal region content to slowly reveal the game event outcome content (and winnings, if any). According to different embodiments, the display of the various portions of interactive reveal region content may be configurable in the sense that they can be displayed or presented in a multitude of ways (e.g., all the time, randomly, on big win combinations, on any win combination, obscuring all game event outcome content, obscuring only a portion of game event outcome content, etc.).

Another benefit of the interactive event outcome reveal techniques described herein is that they may be employed to provide a non-intrusive mechanism which may provide additional entertainment value to the player, and which may serve to "telegraph" winning combinations. Additionally, the ability for a player to choose or not to choose to participate in interactive event outcome reveal interaction(s) demonstrates the flexibility of the design, allowing current gameplay procedures to continue without interruption or allowing current gameplay to be extended via the player's desire to participate in interactive event outcome reveal interaction(s).

FIG. 1 illustrates a simplified block diagram of a specific example embodiment of a Hybrid Arcade/Wager-Based (e.g., "HAWG") Gaming System 100 which may be implemented via a computerized data network. As described in greater detail herein, different embodiments of Hybrid Arcade/Wager-Based Gaming Systems may be configured, designed, and/or operable to provide various different types of operations, functionalities, and/or features generally relating to Hybrid Arcade/Wager-Based Gaming System technology. Further, as described in greater detail herein, many of the various operations, functionalities, and/or features of the Hybrid Arcade/Wager-Based Gaming System(s) disclosed herein may provide may enable or provide different types of advantages and/or benefits to different entities interacting with the Hybrid Arcade/Wager-Based Gaming System(s).

According to different embodiments, at least some Hybrid Arcade/Wager-Based Gaming System(s) may be configured, designed, and/or operable to provide a number of different advantages and/or benefits and/or may be operable to initiate, and/or enable various different types of operations, functionalities, and/or features, such as, for example, one or more of those described and/or referenced herein.

According to different embodiments, at least a portion of the various functions, actions, operations, and activities performed by one or more component(s) of the Hybrid Arcade/Wager-Based Gaming System may be initiated in response to detection of one or more conditions, events, and/or other criteria satisfying one or more different types of minimum threshold criteria, such as, for example, one or more of those described and/or referenced herein.

According to different embodiments, at least a portion of the various types of functions, operations, actions, and/or other features provided by the Hybrid Arcade/Wager-Based Gaming System may be implemented at one or more client systems(s), at one or more System Server(s), and/or combinations thereof.

According to different embodiments, the Hybrid Arcade/Wager-Based Gaming System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Hybrid Arcade/Wager-Based Gaming System may include one or more types of systems, components, devices, processes, etc. (e.g., or combinations thereof) described and/or referenced herein.

According to different embodiments, the Hybrid Arcade/Wager-Based Gaming (e.g., HAWG) System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Hybrid Arcade/Wager-Based Gaming System may include one or more of the following types of systems, components, devices, processes, etc. (e.g., or combinations thereof):

- Local Casino System(s) 122 operable to perform and/or implement various types of functions, operations, actions, and/or other features such as those described or referenced herein. According to different embodiments, one or more Local Casino System(s) 122 may include, but are not limited to, one or more of the following (or combinations thereof):
  - Casino Gaming System Server(s) 120—In at least one embodiment, the Casino Gaming System Server(s) may be operable to perform and/or implement various types of functions, operations, actions, and/or other features such as those described or referenced herein.
  - Class 2 RNG System(s)/Service(s) 124 operable to perform and/or implement various types of functions, operations, actions, and/or other features such as those described or referenced herein. For example, in at least some embodiments, Class 2 RNG System(s)/Service(s) 124 may be operable to dynamically generate and/or provide Class 2 gaming type RNG outcomes to be used by Hybrid Arcade/Wager-Based Gaming devices as "predetermined" RNG outcome(s) relating to Class 2 type wager-based game event(s) occurring at the Hybrid Arcade/Wager-Based Gaming devices.
  - Class 3 RNG System(s)/Service(s) 126 operable to perform and/or implement various types of functions, operations, actions, and/or other features such as those described or referenced herein. For example, in at least some embodiments, Class 3 RNG System(s)/Service(s) 126 may be operable to dynamically generate and/or provide Class 3 gaming type RNG outcomes to be used by Hybrid Arcade/Wager-Based Gaming devices as "predetermined" RNG outcome(s) relating to Class 3 type wager-based game event(s) occurring at the Hybrid Arcade/Wager-Based Gaming devices.
  - Electronic Gaming Machine(s) (EGMs) 128 operable to perform and/or implement various types of functions, operations, actions, and/or other features such as those described or referenced herein.
  - Other Gaming Network(s).
- Client Computer System(s) 130 operable to perform and/or implement various types of functions, operations, actions, and/or other features such as those described or referenced herein.
- 3rd Party System(s) 150 operable to perform and/or implement various types of functions, operations, actions, and/or other features such as those described or referenced herein.
- Internet & Cellular Network(s) 110.
- Remote/Internet-based Gaming Service(s) 190 operable to perform and/or implement various types of functions, operations, actions, and/or other features such as those described or referenced herein.
- According to different embodiments, one or more Remote/Internet-based Gaming Service(s) 190 may include, but are not limited to, one or more of the following (or combinations thereof):
  - Class 2 RNG System(s)/Service(s) 194 operable to perform and/or implement various types of functions, operations, actions, and/or other features such as those described or referenced herein. For example, in at least some embodiments, Class 2 RNG System(s)/Service(s) 194 may be operable to dynamically generate and/or provide Class 2 type RNG outcomes to be used by remote Hybrid Arcade/Wager-Based Gaming devices as "predetermined" RNG outcome(s) relating to Class 2 type wager-based game event(s) occurring at the Hybrid Arcade/Wager-Based Gaming devices.
  - Class 3 RNG System(s)/Service(s) 196 operable to perform and/or implement various types of functions, operations, actions, and/or other features such as those described or referenced herein. For example, in at least some embodiments, Class 3 RNG System(s)/Service(s) 196 may be operable to dynamically generate and/or provide Class 3 type RNG outcomes to be used by remote Hybrid Arcade/Wager-Based Gaming devices as "predetermined" RNG outcome(s) relating to Class 3 type wager-based game event(s) occurring at the Hybrid Arcade/Wager-Based Gaming devices.
  - Remote Database System(s) 180 operable to perform and/or implement various types of functions, operations, actions, and/or other features such as those described or referenced herein.
  - Gaming Server(s) 192 operable to perform and/or implement various types of functions, operations, actions, and/or other features such as those described or referenced herein.
  - Remote System(s)/Service(s) 170, which, for example, may include, but are not limited to, one or more of the following (e.g., or combinations thereof):
    - Content provider servers/services
    - Media Streaming servers/services
    - Database storage/access/query servers/services
    - Financial transaction servers/services
    - Payment gateway servers/services
    - Electronic commerce servers/services
    - Event management/scheduling servers/services
    - Etc.
- Mobile Device(s) 160—In at least one embodiment, the Mobile Device(s) may be operable to perform and/or implement various types of functions, operations, actions, and/or other features such as those described or referenced herein.
- Etc.

In at least one embodiment, the Hybrid Arcade/Wager-Based Gaming System may be operable to utilize and/or generate various different types of data and/or other types of information when performing specific tasks and/or operations. This may include, for example, input data/information and/or output data/information. For example, in at least one embodiment, the Hybrid Arcade/Wager-Based Gaming System may be operable to access, process, and/or otherwise utilize information from one or more different types of sources, such as, for example, one or more local and/or remote memories, devices and/or systems. Additionally, in at least one embodiment, the Hybrid Arcade/Wager-Based Gaming System may be operable to generate one or more different types of output data/information, which, for example, may be stored in memory of one or more local and/or remote devices and/or systems. Examples of different types of input data/information and/or output data/information which may be accessed and/or utilized by the Hybrid Arcade/Wager-Based Gaming System may include, but are not limited to, one or more of those described and/or referenced herein.

According to specific embodiments, multiple instances or threads of the Hybrid Arcade/Wager-Based Gaming System may be concurrently implemented and/or initiated via the use of one or more processors and/or other combinations of hardware and/or hardware and software. For example, in at least some embodiments, various aspects, features, and/or functionalities of the Hybrid Arcade/Wager-Based Gaming System may be performed, implemented and/or initiated by one or more of the various systems, components, systems, devices, procedures, processes, etc., described and/or referenced herein.

In at least one embodiment, a given instance of the Hybrid Arcade/Wager-Based Gaming System may access and/or utilize information from one or more associated databases. In at least one embodiment, at least a portion of the database information may be accessed via communication with one or more local and/or remote memory devices. Examples of different types of data which may be accessed by the Hybrid Arcade/Wager-Based Gaming System may include, but are not limited to, one or more of those described and/or referenced herein.

According to different embodiments, various different types of encryption/decryption techniques may be used to facilitate secure communications between devices in Hybrid Arcade/Wager-Based Gaming System(s) and/or Hybrid Arcade/Wager-Based Gaming Network(s). Examples of the various types of security techniques which may be used may include, but are not limited to, one or more of the following (e.g., or combinations thereof): random number generators, SHA-1 (e.g., Secured Hashing Algorithm), MD2, MD5, DES (e.g., Digital Encryption Standard), 3DES (e.g., Triple DES), RC4 (e.g., Rivest Cipher), ARC4 (e.g., related to RC4), TKIP (e.g., Temporal Key Integrity Protocol, uses RC4), AES (e.g., Advanced Encryption Standard), RSA, DSA, DH, NTRU, and ECC (e.g., elliptic curve cryptography), PKA (e.g., Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Hybrid Arcade/Wager-Based Gaming System may be initiated in response to detection of one or more conditions or events satisfying one or more different types of minimum threshold criteria for triggering initiation of at least one instance of the Hybrid Arcade/Wager-Based Gaming System. Various examples of conditions or events which may trigger initiation and/or implementation of one or more different threads or instances of the Hybrid Arcade/Wager-Based Gaming System may include, but are not limited to, one or more of those described and/or referenced herein.

It will be appreciated that the Hybrid Arcade/Wager-Based Gaming System of FIG. 1 is but one example from a wide range of Hybrid Arcade/Wager-Based Gaming System embodiments which may be implemented. Other embodiments of the Hybrid Arcade/Wager-Based Gaming System (e.g., not shown) may include additional, fewer and/or different components/features that those illustrated in the example Hybrid Arcade/Wager-Based Gaming System embodiment of FIG. 1.

Generally, the Hybrid Arcade/Wager-Based Gaming techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the Hybrid Arcade/Wager-Based Gaming techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, system servers, cloud computing systems, network devices, etc.

Figure 2:
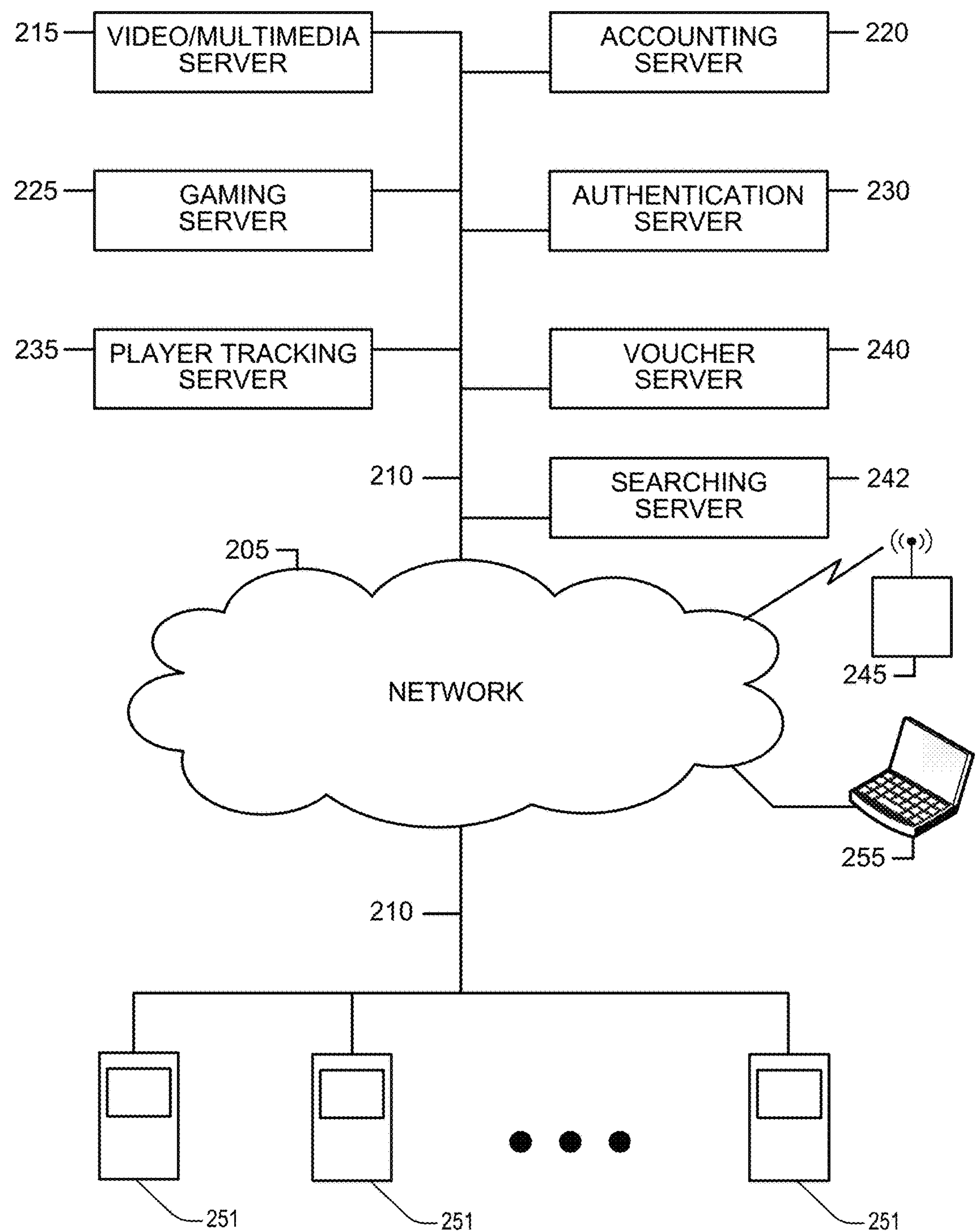
FIG. 2 shows an example block diagram of an electronic gaming system 200 in accordance with a specific embodiment.

FIG. 2 shows an example block diagram of an electronic gaming system 200 in accordance with a specific embodiment. Electronic gaming system 200 may include electronic gaming devices (e.g., electronic gaming terminals, electronic gaming machines, wager-based video gaming machines, etc.) 251, which may be coupled to network 205 via a network link 210. Network 205 may be the internet or a private network. One or more video streams may be received at video/multimedia server 215 from EGDs 251. Video/Multimedia server 215 may transmit one or more of these video streams to one or more: mobile devices 245, 255, electronic gaming devices (e.g., EGD) 251, and/or other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g., free play), promotions, and/or other awards (e.g., complimentary food, drinks, lodging, concerts, etc.).

Voucher server 240 may generate a voucher, which may include data relating to gaming options. For example, data relating to the structure may be generated. If there is a time deadline, that information may be generated by voucher server 240. Vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which hybrid arcade/wager-based games paid out the most money during a time period, which hybrid arcade/wager-based games kept the most money from players during a time period, which hybrid arcade/wager-based games are most popular (e.g., top games), which hybrid arcade/wager-based games are least popular, which hybrid arcade/wager-based games have the most amount of money wager during a period, which hybrid arcade/wager-based games have the highest wager volume, which hybrid arcade/wager-based games are more volatile (e.g., volatility, or deviation from the statistical norms, of wager volume, wager amount, pay out, etc.) during a time period, and the like. Search may also be associated with location queries, time queries, and/or people queries.

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific game types and/or themes (e.g., first person shooter types, first person rail types, TV themes, Movie themes, multiplayer types, etc.). Searching structure may search one or more of these games.

In another example, the searching structure may be based on a player's preferences, past transactional history, player input, a particular game, a particular EGD, a particular casino, a particular location within a casino, game outcomes over a time period, payout over a time period, and/or any other criteria.

Figure 3:
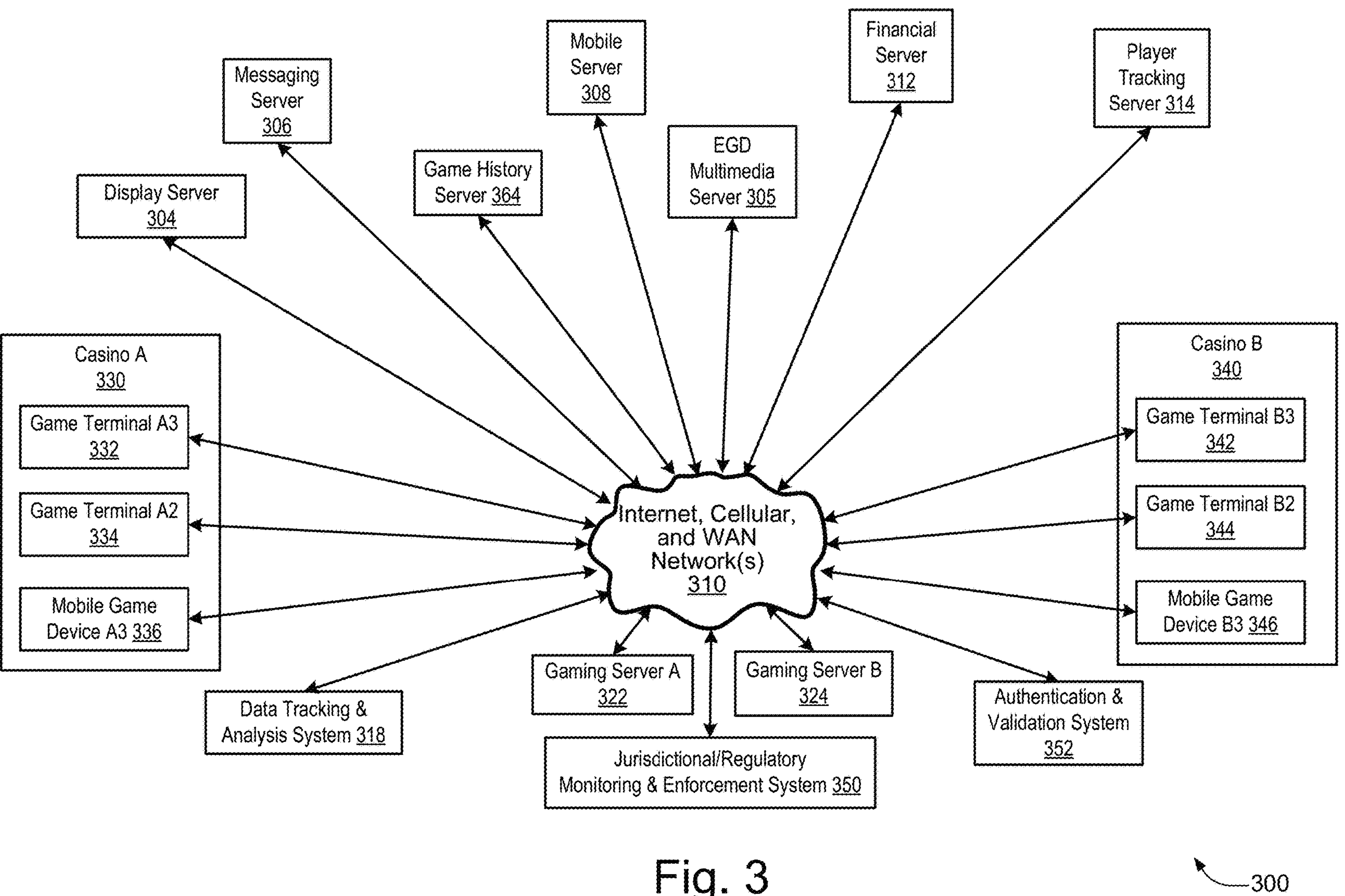
FIG. 3 illustrates a network diagram of an example embodiment of a Gaming Network 300 which may be configured or designed to implement various hybrid arcade/wager-based gaming techniques described and/or referenced herein.

Searching algorithms may be dynamic searching programs, which may be modified based on one or more past results. In one example, the search algorithm may determine that a specific triggering event occurs with a ninety percent success rate on a first EGD, a ten percent success rate on a second EGD, a fifty percent success rate on a third EGD, and a seventy percent success rate on a fourth EGD. The search algorithm may generate a search priority based on the probability of success, which may lead to the first EGD being searched first, the fourth EGD being searched second, the third EGD being searched third, and the second EGD being searched fourth. Search algorithm may utilize any dynamic feedback procedure to enhance current and/or future searching results FIG. 3 illustrates a network diagram of an example embodiment of a Gaming Network 300 which may be configured or designed to implement various hybrid arcade/wager-based gaming techniques described and/or referenced herein. As described in greater detail herein, different embodiments of Gaming Networks may be configured, designed, and/or operable to provide various different types of operations, functionalities, and/or features generally relating to Gaming Network technology. Further, as described in greater detail herein, many of the various operations, functionalities, and/or features of the Gaming Network(s) and/or Gaming System(s) disclosed herein may provide may enable or provide different types of advantages and/or benefits to different entities interacting with the Gaming Network(s).

According to different embodiments, at least some Gaming Network(s) may be configured, designed, and/or operable to provide a number of different advantages and/or benefits and/or may be operable to initiate, and/or enable various different types of operations, functionalities, and/or features, such as, for example, one or more of the following (e.g., or combinations thereof):

- Enable real-world casino venues to securely and legally provide opportunities for their players/players to participate in online or network-based wager-based gaming sessions. Examples of various types of games which may be played may include, but are not limited to, one or more hybrid arcade/wager-based game(s) such as those described and/or referenced herein.
- Enable casino venues to provide opportunities for their players/players to participate in live, multiplayer, wager-based, arcade-style video games where players from different casinos, different locations, and/or different EGDs, are able to compete against one another in a multiplayer, hybrid arcade/wager-based gaming environment. In at least one embodiment, players can be located at the same and/or at remote gaming venues that are connected via a wide area network such as the Internet, cellular networks, VPNs, cloud-based networks, etc.
    - Utilize live electronic gaming device dealers and attendants for conducting the wager-based, arcade-style video games.

- Deploy electronic gaming devices (e.g., EGDs) in multiple different physical casino venues, and utilize the EGDs for enabling casino players/players to participate in wager-based, arcade-style video games.
- Players may be allowed to manually switch or change their opponents (e.g., in heads-up game play).
- Players may be automatically switched (e.g., by gaming system) to play different opponents (e.g., auto switching feature; useful for tournament play).
- Gaming system may perform automated matching of players in tournament (e.g., based on various criteria such as, for example: skill level, experience, random, social relationships, etc.). In at least one embodiment, multi-property network connections between various different casino venues (e.g., located at different geographic locations) may be implemented and utilized to facilitate pairing of and/or participation by remote players.
- In at least one embodiment, a central clearing house may be utilized for financial transactions (e.g., deposit, debit of player accounts, payouts, lines of credit, etc.) relating to the hybrid arcade/wager-based game sessions.
- Various types of game play rules may be implemented and automatically enforced for the hybrid arcade/wager-based game sessions, such as, for example: time limit per play, amount per wager, max wager, maximum wager, rules to facilitate speed of game play, rules imposed for conformance with regulatory or jurisdiction requirements, etc. For example, in one embodiment, if a player failed to make a wager within an allotted time interval, the system may be configured or designed to automatically enter default wager for that player.

According to different embodiments, the Gaming Network 300 may include a plurality of different types of components, devices, modules, processes, systems, etc., which, for example, may be implemented and/or instantiated via the use of hardware and/or combinations of hardware and software. For example, as illustrated in the example embodiment of FIG. 3, the Gaming Network may include one or more of the following types of systems, components, devices, processes, etc. (e.g., or combinations thereof):

- Display System Server(s) 304. In at least one embodiment, the Display System Server(s) may be configured or designed to implement and/or facilitate management of content (e.g., graphics, images, text, video fees, etc.) to be displayed and/or presented at one or more EGDs (e.g., or at one or more groups of EGDs), dealer displays, administrator displays, etc.
- EGD Multimedia System Server(s) 305. In at least one embodiment, the Table Multimedia System Server(s) may be configured or designed to generate, implement and/or facilitate management of content (e.g., graphics, images, text, video fees, audio feeds, etc.), which, for example, is to be streamed or provided to one or more EGDs (e.g., or to one or more groups of EGDs).
- Messaging System Server(s) 306. In at least one embodiment, the Messaging System Server(s) may be configured or designed to implement and/or facilitate management of messaging and/or other communications among and between the various systems, components, devices, EGDs, players, dealers, and administrators of the gaming network.
- Mobile System Server(s) 308. In at least one embodiment, the Mobile System Server(s) may be configured or designed to implement and/or facilitate management of communications and/or data exchanged with various types of mobile devices, including for example: player-managed mobile devices (e.g., smart phones, PDAs, tablets, mobile computers), casino-managed mobile devices (e.g., mobile gaming devices), etc.
- Financial System Server(s) 312. In at least one embodiment, the Financial System Server(s) may be configured or designed to implement and/or facilitate tracking, management, reporting, and storage of financial data and financial transactions relating to one or more hybrid arcade/wager-based game sessions. For example, at least some Financial System Server(s) may be configured or designed to keep track of the game accounting (e.g., money in, money out) for a virtual hybrid arcade/wager-based game being played, and may also be configured or designed to handle various financial transactions relating to player wagers and payouts. For example, in at least one embodiment, Financial Servers may be configured or designed to monitor each remote player's account information, and may also manage or handle funds transfers between each player's account and the active game server (e.g., associated with the player's game session).
- Player Tracking System Server(s) 314. In at least one embodiment, the Player Tracking System Server(s) may be configured or designed to implement and/or facilitate management and exchange of player tracking information associated with one or more EGDs, hybrid arcade/wager-based game sessions, etc. In at least one embodiment, a Player Tracking System Server may include at least one database that tracks each player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for each game type, etc. A Player Tracking System Server may also help establish a player's preferences, which assists the casino in their promotional efforts to: award player comps (e.g., loyalty points); decide which promotion(s) are appropriate; generate bonuses; etc.
- Data Tracking & Analysis System(s) 318. In at least one embodiment, the Data Tracking & Analysis System(s) may be configured or designed to implement and/or facilitate management and analysis of game data. For example, in one embodiment the Data Tracking & Analysis System(s) may be configured or designed to aggregate multisite hybrid arcade/wager-based gaming trends, local wins, jackpots, etc.
- Gaming System Server(s) (e.g., 322, 324). In at least one embodiment, different game servers may be configured or designed to be dedicated to one or more specifically designated type(s) of game(s). Each game server has game logic to host one of more virtual hybrid arcade/wager-based game sessions. At least some game server(s) may also be capable of keeping track of the game accounting (e.g., money in, money out) for a virtual hybrid arcade/wager-based game being played, and/or for updating the Financial Servers at the end of each game. The game server(s) may also operable to generate the EGD graphics primitives (e.g., game virtual objects and game states), and may further be operable to update EGDs when a game state change (e.g., new card dealt, player upped the ante, player folds/busts, etc.) has been detected.

Jurisdictional/Regulatory Monitoring & Enforcement System(s) 350. In at least one embodiment, the Jurisdictional/Regulatory Monitoring & Enforcement System(s) may be configured or designed to handle tracking, monitoring, reporting, and enforcement of specific regulatory requirements relating to wager-based gameplay activities in one or more jurisdictions.

Authentication & Validation System(s) 352. According to different embodiments, the Authentication & Validation System(s) may be configured or designed to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player. In at least one implementation, various security features may be incorporated into the EGD to prevent unauthorized players from engaging in certain types of activities at the EGD. In some embodiments, the Authentication & Validation System(s) may be configured or designed to authenticate and/or validate various types of hardware and/or software components, such as, for example, hardware/software components residing at a remote EGDs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Casino Venues (e.g., 330, 340). In at least one embodiment, each casino venue may correspond to a real-world, physical casino which is located at a particular geographic location. In some embodiments, a portion of the multiple different casino venues may be affiliated with each other (e.g., Harrah's Las Vegas, Harrah's London). In other embodiments, at least a portion of the multiple different casino venues do not share any affiliation with each other.

Electronic gaming devices (e.g., EGDs) 332, 334, 336, 342, 344, 346. As described in greater detail herein, the EGDs may be configured or designed to facilitate and enable players to participate in wager-based, arcade-style video game sessions (e.g., and/or other types of hybrid arcade/wager-based game sessions). Different EGDs may be physically located in one or more different casino venues, and may be connected via a communication network. In some embodiments, EGDs may be implemented as stationary machines. In some embodiments, at least some EGDs may be implemented using mobile devices (e.g., tablets, smartphones, laptops, PC's, and the like).

Internet, Cellular, and WAN Network(s) 310

Game History Server(s) 364. In at least one embodiment, the Game History Server(s) may be configured or designed to track all (e.g., or selected) game types and game play history for all (e.g., or selected) hybrid arcade/wager-based games. In some embodiments, a Game History Server may also assist the casino manager in case of disputes between players and the casino by, for example, providing the ability to "replay" (e.g., by virtually recreating the game events) the game in dispute, step by step, based on previously stored game states. Such dispute resolution capability is a desirable feature in hybrid arcade/wager-based game environments.

Remote Database System(s) which, for example, may be operable to store and provide access to various types of information and data described herein.

Remote System Server(s)/Service(s), which, for example, may include, but are not limited to, one or more of the following (e.g., or combinations thereof):
- Content provider servers/services
- Media Streaming servers/services
- Database storage/access/query servers/services
- Financial transaction servers/services
- Payment gateway servers/services
- Electronic commerce servers/services
- Event management/scheduling servers/services
- Etc.

Figure 6:
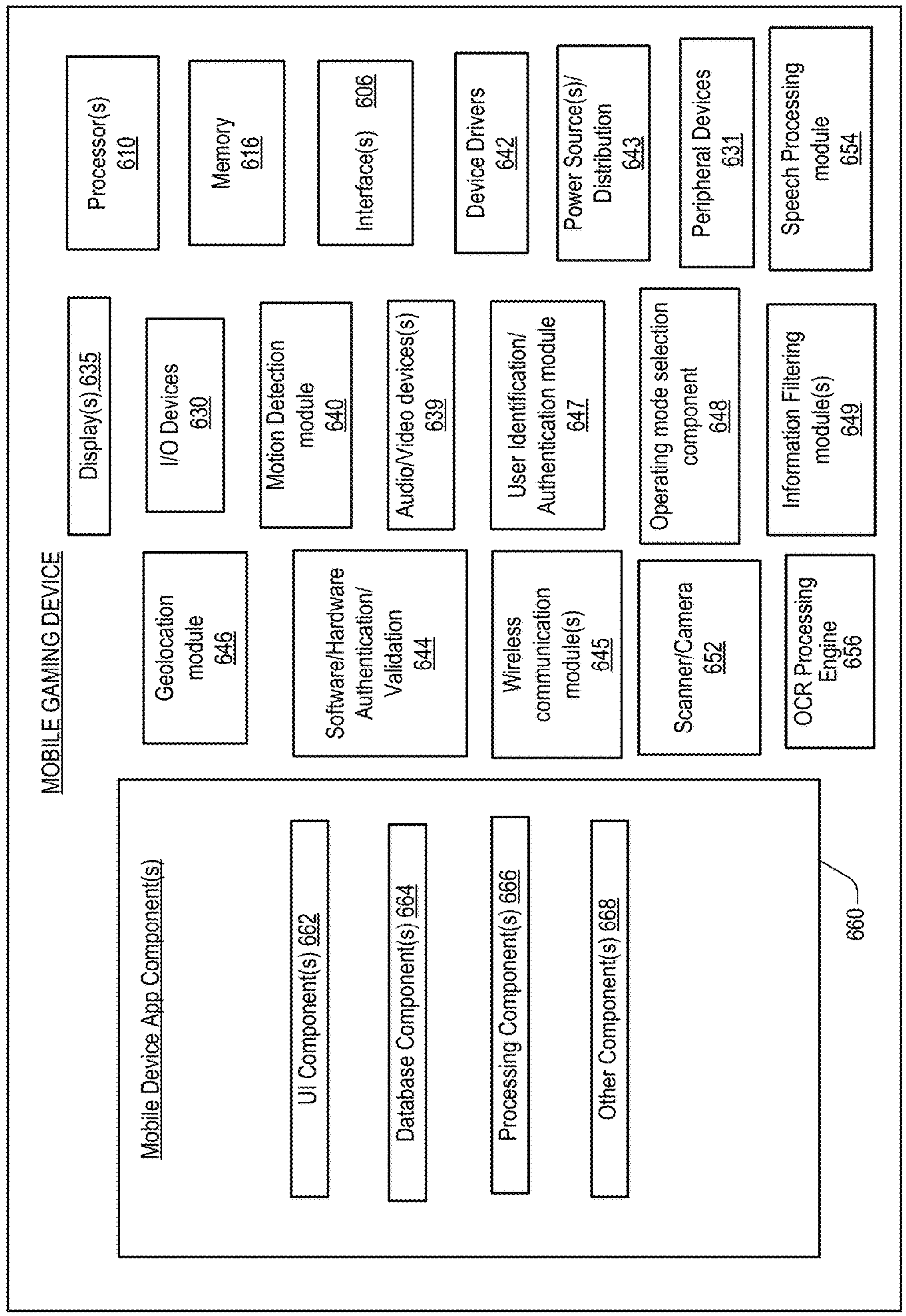
FIG. 6 is a simplified block diagram of an exemplary mobile gaming device 600 in accordance with a specific embodiment.

Mobile Game Device(s) 336, 346—In at least one embodiment, the Mobile Device(s) may be operable to perform and/or implement various types of functions, operations, actions, and/or other features such as those described or referenced herein (e.g., such as those illustrated and/or described with respect to FIG. 6).

According to specific embodiments, a variety of different game states may be used to characterize the state of current and/or past events which are occurring (e.g., or have occurred) at a given EGD. For example, in one embodiment, at any given time in a game, a valid current game state may be used to characterize the state of game play (e.g., and/or other related events, such as, for example, mode of operation of the EGD, etc.) at that particular time. In at least one embodiment, multiple different states may be used to characterize different states or events which occur at the EGD at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the EGD may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming EGD. Examples of such entities may include, but are not limited to, one or more of the following (e.g., or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the EGD may be operable to automatically monitor game play activities at the EGD, and/or to automatically identify key events which may trigger a transition of game state from one state to another as a game progresses.

Depending upon the type of game being played at the gaming table, examples of possible key events may include, but are not limited to, one or more of the following (e.g., or combination thereof):

- start of a new hybrid arcade/wager-based gaming session;
- end of a current hybrid arcade/wager-based gaming session;
- start of a virtual slot wheel spin;
- game start event;
- game end event;
- detection of event for triggering initiation of wager-based event (e.g., destroying a zombie on screen triggers spin of virtual slot reel, and subsequent payout/credit award);
- detection of event for triggering end of wager-based event (e.g., slot wheel spin, etc.);
- detection of event for triggering initiation of randomized game play event;
- detection of event for triggering end of randomized game play event;
- initial wager period start;
- initial wager period end;
- subsequent wager period start;
- subsequent wager period end;
- payout period start;
- payout period end;
- etc.

FIGS. 4, 5, 6, and 19 show block diagrams of different example embodiments of electronic gaming machines (e.g., EGMs) or electronic gaming devices ("EGDs) which may be used for facilitating, enabling, initiating, and/or implementing one or more of the hybrid arcade/wager-based gaming aspects described herein.

Figure 4:
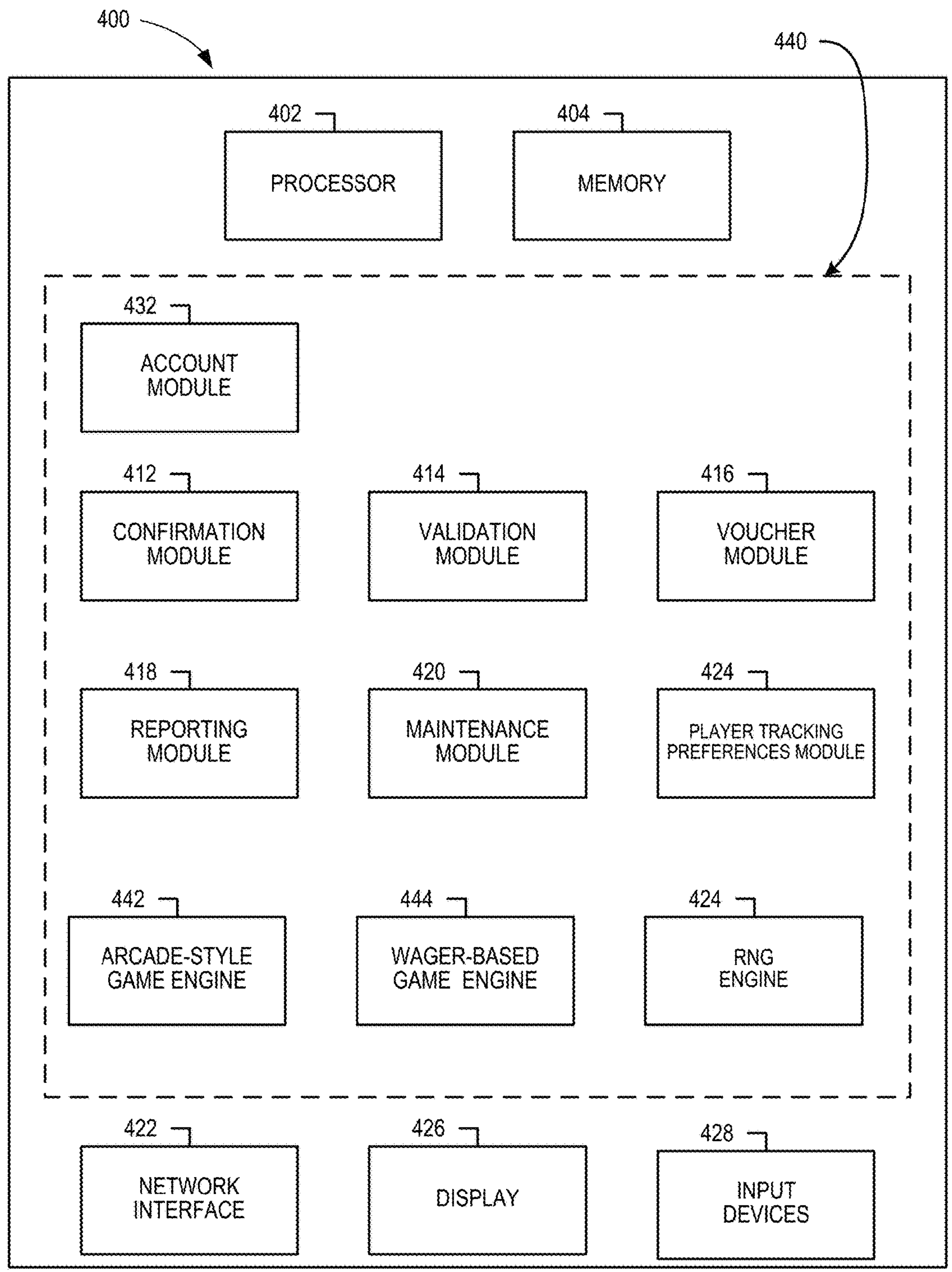
FIG. 4 shows a block diagram of electronic gaming device 400, in accordance with a specific embodiment.

FIG. 4 shows a block diagram 400 of electronic gaming device 400, in accordance with a specific embodiment. Electronic gaming device 400 may include a processor 402, a memory 404, a network interface 422, input devices 428, and a display 426.

Processor 402 may generate gaming options based on predetermined betting structures and/or outcome categories. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one EGD. Processor 402 may generate contingent gaming options and/or predetermined gaming options. Contingent gaming options 410 may be structures such that when a triggering event occurs over one or more than one gaming event, racing event, and/or sporting event, the wager is activated.

Network interface 422 may allow electronic gaming device 400 to communicate with remote devices/systems such as, for example, video/multimedia server(s), accounting/transaction server(s), gaming server(s), authentication server(s), player tracking server(s), voucher server(s), etc.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 400, to select a movie or music, to select type of content to be displayed on main and/or auxiliary screen(s) of EGD, or any combination thereof.

Arcade-Style Game Engine 442 may be configured or designed to manage the arcade-style game play portion (or entertainment portion) of the hybrid arcade/wager-based game.

Wager-Based Game Engine 444 may be configured or designed to manage the wager-based game event portion(s) of the hybrid arcade/wager-based game.

Random Number Generator (RNG) Engine 446 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).

Display 426 may show video streams from one or more gaming devices, gaming objects from one or more gaming devices, computer generated graphics, predetermined gaming options, and/or contingent gaming options.

Memory 404 may include various memory modules 440. Memory 404 via various memory modules 440 may include a confirmation module 412, a validation module 414, a voucher module 416, a reporting module 418, a maintenance module 420, a player tracking preferences module 424, and an account module 432.

Future betting module 406 may store data relating to the predetermined betting structure. Processor 402 may utilize data in future betting module 406 to generate predetermined gaming options and/or contingent gaming options. Any other processor (e.g., gaming server 225, any virtualized gaming server, etc.) may implement these functions of processor 402.

Predetermined game options module 408 may store data relating to predetermined gaming options, which may be offered to a player.

Contingent game options module 410 may store data relating to contingent gaming options, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Reporting module 418 may generate reports related to a performance of electronic gaming device 400, electronic gaming system(s), hybrid arcade/wager-based game(s), video streams, gaming objects, credit device(s), identification device(s), etc.

In one implementation, reporting module 418 may reside on a central server and can aggregate and generate real time statistics on betting activities at one or more hybrid arcade/wager-based games at one or more participating casino's. The aggregate betting statistics may include trends (e.g., aggregate daily wager volume and wager amount by game types, by casinos, and the like), top games with the most payouts, top tables with the most payouts, top search structures used by players, most popular hybrid arcade/wager-based game(s) by wager volume, most searched for game, hybrid arcade/wager-based game(s) with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten hybrid arcade/wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420 may track any maintenance that is implemented on electronic gaming device 400 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular hybrid arcade/wager-based game or game type, a particular EGD, a particular casino, a particular location within a casino, game outcomes over a time period, payout over a time period, and/or any other criteria. Searching algorithms may be dynamic searching programs, which may be modified based on one or more past results, as described previously.

In another example, the search algorithm may generate a search priority based on the probability of success various events and/or conditions, as described previously. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information. Data from account module 432 may be utilized to determine whether a wager may be accepted.

For example, when a search has determined a triggering event, the device and/or system may determine whether to allow this wager based on one or more of a wager amount, a number of wagers, a wager limit, an account balance, and/or any other criteria.

In at least one embodiment, at least a portion of the modules discussed in block diagram 400 may reside locally in gaming terminal 400. However, in at least some embodiments, the functions performed by these modules may be implemented in one or more remote servers. For instance, modules 406-420 and 424 may each be on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless.

In one implementation, reporting module 418 may reside on a central server and can aggregate and generate real time statistics on betting activities at one or more hybrid arcade/wager-based games at one or more participating casino's. The aggregate betting statistics may include trends (e.g., aggregate daily wager volume and wager amount by game types, by casinos, and the like), top games with the most payouts, top EGDs with the most payouts, top search structures used by players, most popular hybrid arcade/wager-based game(s) by wager volume, most searched for game(s), EGDs with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten hybrid arcade/wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
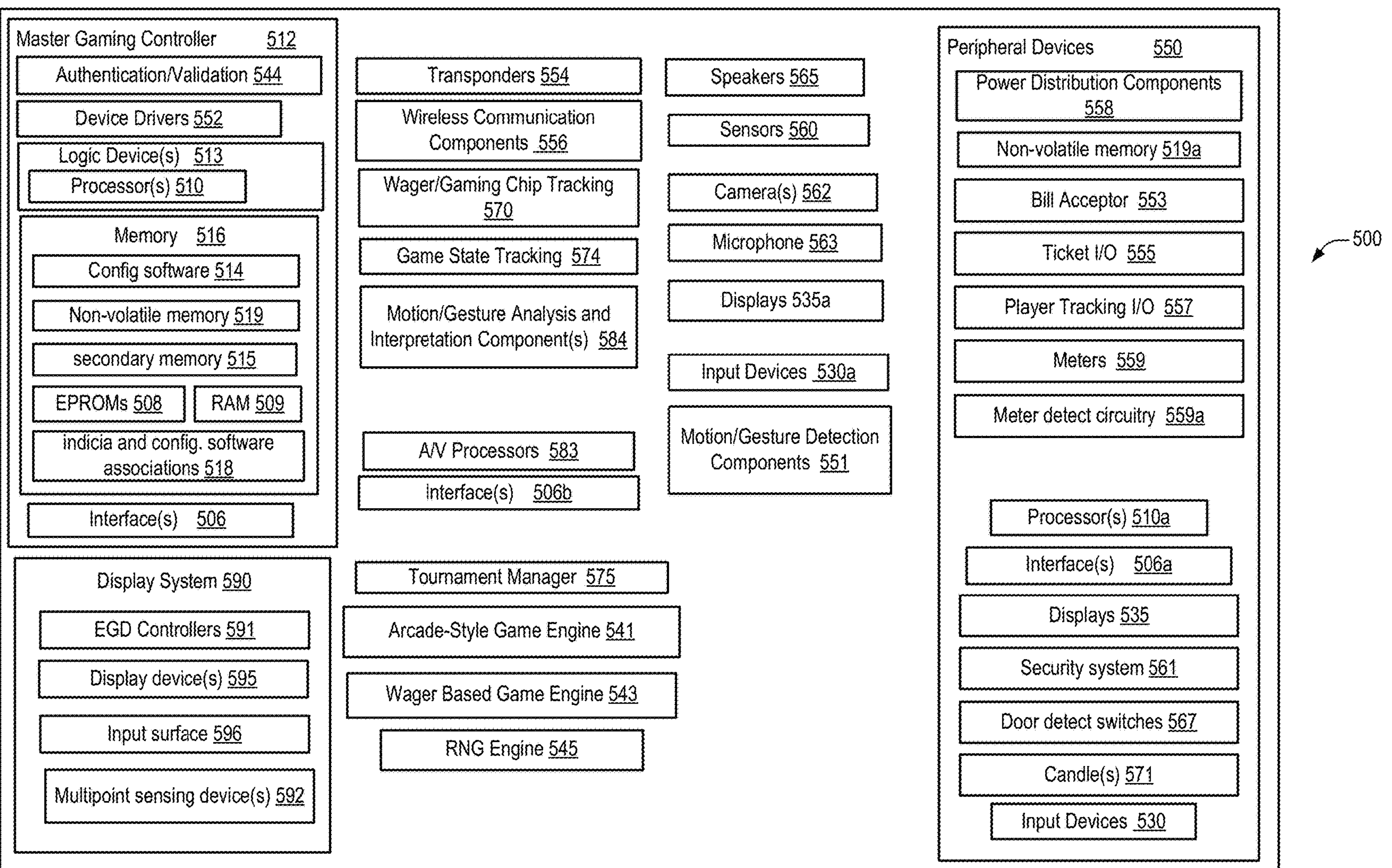
FIG. 5 is a simplified block diagram of an exemplary intelligent electronic gaming system 500 in accordance with a specific embodiment.

FIG. 5 is a simplified block diagram of an exemplary intelligent multi-player electronic gaming system 500 in accordance with a specific embodiment. In some embodiments, gaming system 500 may be implemented as a gaming server. In other embodiments, gaming system 500 may be implemented as an electronic gaming machine (e.g., EGM) or electronic gaming device (e.g., EGD).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (e.g., or combinations thereof):

Arcade-Style Game Engine(s) 541;

Wager-Based Game Engine(s) 543;

RNG Engine(s) 545;

Candle control system which, for example, may include functionality for determining and/or controlling the appearances of one or more candles, etc.;

Transponders 554;

Wireless communication components 556;

Gaming chip/wager token tracking components 570;

Games state tracking components 574;

Motion/gesture analysis and interpretation components 584.

Audio/video processors 583 which, for example, may include functionality for detecting, analyzing and/or managing various types of audio and/or video information relating to various activities at the gaming system.

Various interfaces 506*b* (e.g., for communicating with other devices, components, systems, etc.);

Tournament manager 575;

Sensors 560;

One or more cameras 562;

One or more microphones 563;

Secondary display(s) 535*a;*

Input devices 530*a;*

Motion/gesture detection components 551;

Peripheral Devices 550;

Arcade-Style Game Engine(s) 541 may be configured or designed to manage the arcade-style game play portion (or entertainment portion) of the hybrid arcade/wager-based game.

Wager-Based Game Engine(s) 543 may be configured or designed to manage the wager-based game event portion(s) of the hybrid arcade/wager-based game.

Random Number Generator (RNG) Engine(s) 545 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).

One or more cameras (e.g., 562) may be used to monitor, stream and/or record image content and/or video content relating to persons or objects within each camera's view. For example, in at least one embodiment where the gaming system is implemented as an EGD, camera 562 may be used to generate a live, real-time video feed of a player (e.g., or other person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (e.g., or combinations thereof):

EGD controllers 591;

Multipoint sensing device(s) 592 (e.g., multi-touch surface sensors/components);

Display device(s) 595;

Input/touch surface 596;

Etc.

According to various embodiments, display surface(s) 595 may include one or more display screens utilizing various types of display technologies such as, for example, one or more of the following (e.g., or combinations thereof): LCDs (e.g., Liquid Crystal Display), Plasma, OLEDs (e.g., Organic Light Emitting Display), TOLED (e.g., Transparent Organic Light Emitting Display), Flexible (e.g., F) OLEDs, Active matrix (e.g., AM) OLED, Passive matrix (e.g., PM) OLED, Phosphor-escent (e.g., PH) OLEDs, SEDs (e.g., surface-conduction electron-emitter display), EPD (e.g., ElectroPhoretic display), FEDs (e.g., Field Emission Displays) and/or other suitable display technology. EPD displays may be provided by E-ink of Cambridge, Mass. OLED displays of the type list above may be provided by Universal Display Corporation, Ewing, N.J.

In at least one embodiment, master gaming controller 512 may include one or more of the following (e.g., or combinations thereof):

Authentication/validation components 544;

Device drivers 552;

Logic devices 513, which may include one or more processors 510;

Memory 516, which may include one or more of the following (e.g., or combinations thereof): configuration software 514, non-volatile memory 519, EPROMS 508, RAM 509, associations 518 between indicia and configuration software, etc.;

Interfaces 506;

Etc.

In at least one embodiment, Peripheral Devices 550 may include one or more of the following (e.g., or combinations thereof):

Power distribution components 558;

Non-volatile memory 519*a* (e.g., and/or other types of memory);

Bill acceptor 553;

Ticket I/O 555;

Player tracking I/O 557;

Meters 559 (e.g., hard and/or soft meters);

Meter detect circuitry 559*a;*

Processor(s) 510*a;*

Interface(s) 506*a;*

Display(s) 535;

Independent security system 561;

Door detect switches 567;

Candles, etc. 571;

Input devices 530;

Etc.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of game play/event information, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Such personalized identification information could also be used to confirm credit use of a smart card, transponder, and/or player's personal player input device (e.g., UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 4) a secondary memory storage device 515 such as a non-volatile memory device, configured to store gaming software related information (e.g., the gaming software related information and memory may be used to store various audio files and games not currently being used and invoked in a configuration or reconfiguration); 5) communication transport protocols (e.g., such as, for example, TCP/IP, USB, Firewire, IEEE1394, Bluetooth, IEEE 802.11x (e.g., IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (e.g., a proprietary protocol developed by IGT, Reno, Nev.).

A plurality of device drivers 552 may be stored in memory 516. Example of different types of device drivers may include device drivers for gaming system components, device drivers for gaming system components, etc. Typically, the device drivers 552 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (e.g., WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (e.g., and/or other input) to the EGD using the touch keys and/or other player control sensors/buttons. Additionally, such input functionality may also be used for allowing players to provide input to other devices in the casino gaming network (e.g., such as, for example, player tracking systems, side wagering systems, etc.)

Wireless communication components 556 may include one or more communication interfaces having different architectures and utilizing a variety of protocols such as, for example, 802.11 (e.g., WiFi), 802.15 (e.g., including Bluetooth™), 802.16 (e.g., WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication—Interface and Protocol (e.g., NFCIP-1)", published by ECMA International (e.g., www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player movements and/or gestures and/or other input data from the player. In some embodiments, each gaming system may have its own respective motion/gesture detection component(s). In other embodiments, motion/gesture detection component(s) 551 may be implemented as a separate subsystem of the gaming system which is not associated with any one specific gaming system or device.

FIG. 19 shows an example block diagram of an alternate embodiment of an electronic gaming machine which may be configured or designed to implement one or more of the hybrid arcade/wager-based gaming aspects described herein. As illustrated in the example embodiment of FIG. 19, the electronic gaming machine 1900 may include, but are not limited to, one or more of the following component(s) (or combinations thereof):

One or more display(s) (1904, 1906).
HID I/O component(s) (1910, 1914).
Payout I/O component(s) (1908).
Cash/Credit/Coin I/O c component(s) (1912).
CPUs/Processor(s)/Gaming Controller(s) (1920).
Memory (1924).
One or more Graphics Processor(s) (GPU) (1918).
RNG I/O component(s) (1922, 1928).
Other I/O component(s) (1916, 1926).
Interface(s) to one or more External Services (1930).

FIG. 6 is a simplified block diagram of an exemplary mobile gaming device 600 in accordance with a specific embodiment. In at least one embodiment, one or more players may participate in a wager-based, arcade-style video game session using mobile gaming devices. In at least some embodiments, the mobile gaming device may be configured or designed to include or provide functionality which is similar to that of an electronic gaming device (e.g., EGD) such as that described, for example, in FIG. 4.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (e.g., or combinations thereof):

UI Components 662 such as those illustrated, described, and/or referenced herein.
Database Components 664 such as those illustrated, described, and/or referenced herein.
Processing Components 666 such as those illustrated, described, and/or referenced herein.
Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various hybrid arcade/wager-based game techniques at the mobile gaming device.

According to specific embodiments, various aspects, features, and/or functionalities of the mobile gaming device may be performed, implemented and/or initiated by one or more of the following types of systems, components, systems, devices, procedures, processes, etc. (e.g., or combinations thereof):

Processor(s) 610
Device Drivers 642
Memory 616
Interface(s) 606
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654
Scanner/Camera 652
OCR Processing Engine 656
etc.

Figure 7:
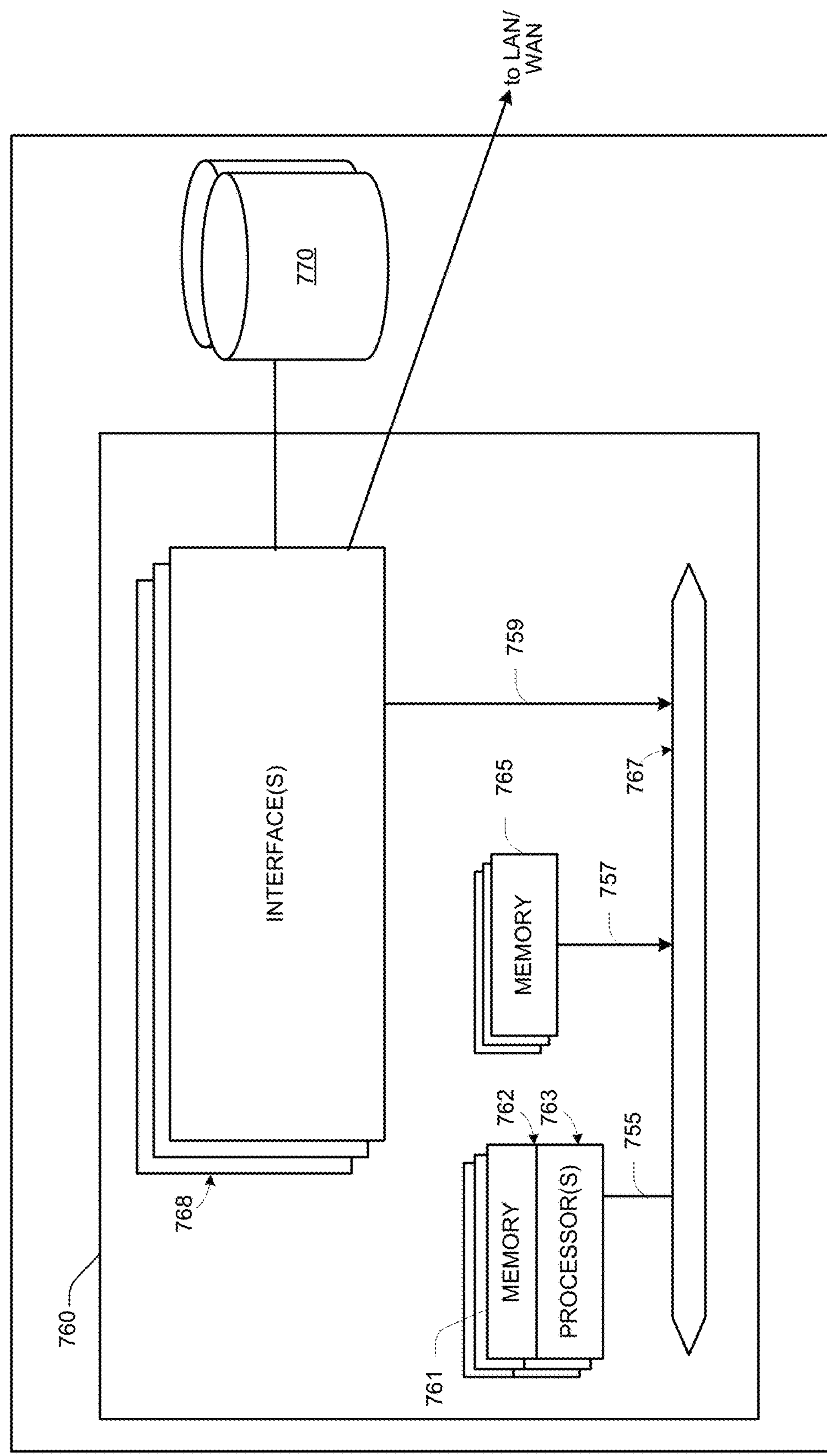
FIG. 7 illustrates an example embodiment of a System Server 780 which may be used for implementing various aspects/features described herein.

FIG. 7 illustrates an example embodiment of a system server 780 which may be used for implementing various aspects/features described herein. In at least one embodiment, the system server 780 includes at least one network device 760, and at least one storage device 770 (e.g., such as, for example, a direct attached storage device). In one embodiment, system server 780 may be suitable for implementing at least some of the hybrid arcade/wager-based game techniques described herein.

In according to one embodiment, network device 760 may include a master central processing unit (e.g., CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g., Linux), and any appropriate system software (e.g., such as, for example, AppLogic (e.g., TM) software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of system server 780. In a specific embodiment, a memory 761 (e.g., such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (e.g., sometimes referred to as "line cards"). Alternatively, one or more of the interfaces 768 may be provided as on-board interface controllers built into the system motherboard. Generally, they control the sending and receiving of data packets over the network and sometimes support other peripherals used with the system server 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (e.g., WiFi) interfaces, 802.15 interfaces (e.g., including Bluetooth™), 802.16 (e.g., WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the system server 780 to communicate with other network devices associated with various local area network (e.g., LANs) and/or wide area networks (e.g., WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (e.g., such as, for example, memory block 765, which, for example, may include random access memory (e.g., RAM)) configured to store data, program instructions for the general-purpose network operations and/or other information relating to the functionality of the various hybrid arcade/wager-based game techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (e.g., ROM) and random access memory (e.g., RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
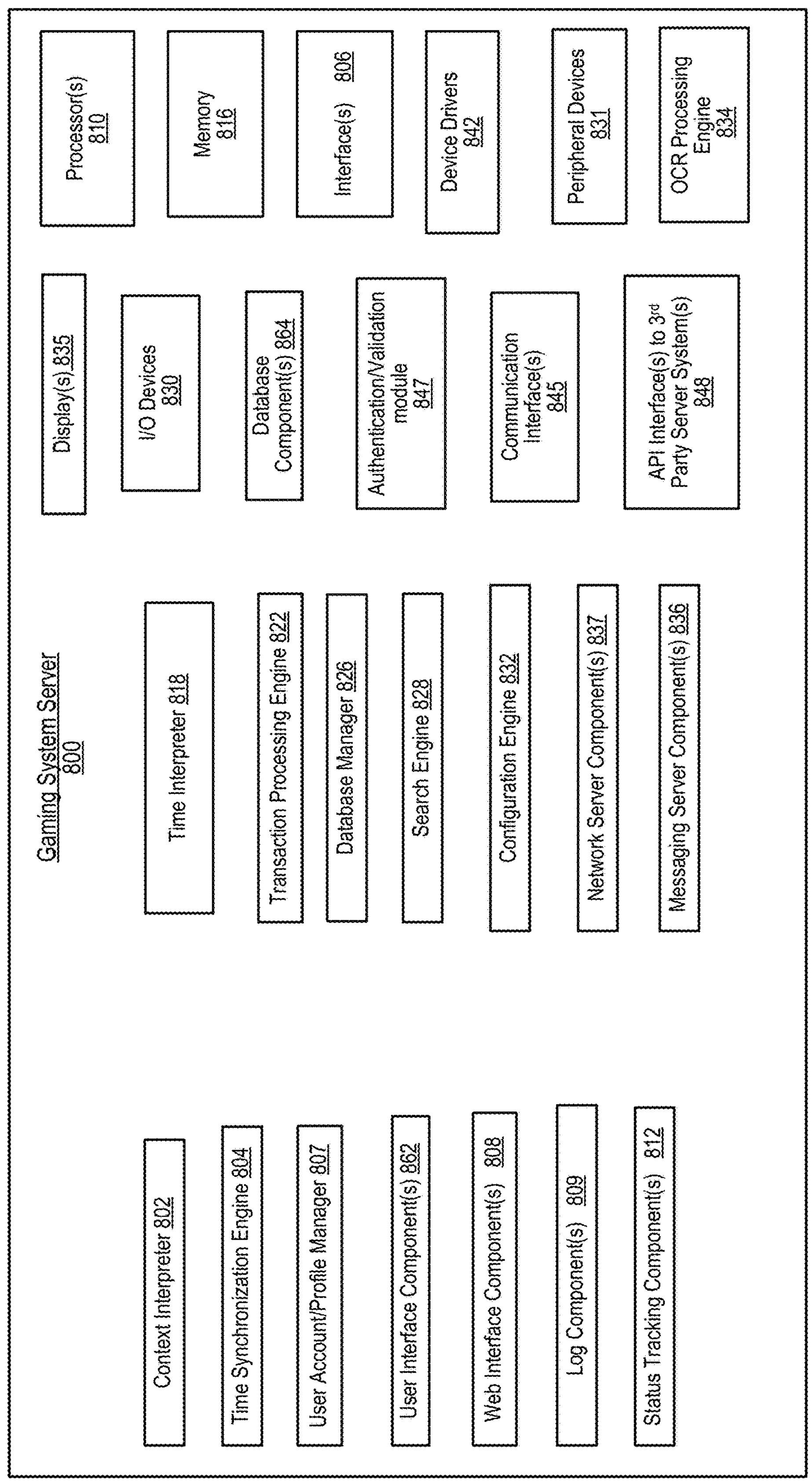
FIG. 8 illustrates an example of a functional block diagram of a Gaming System Server in accordance with a specific embodiment.

FIG. 8 illustrates an example of a functional block diagram of a Gaming System Server in accordance with a specific embodiment. In at least one embodiment, the Virtual Live electronic gaming device System Server may be operable to perform and/or implement various types of functions, operations, actions, and/or other features, such as, for example, one or more of those described and/or referenced herein.

In at least one embodiment, the Gaming System Server may include a plurality of components operable to perform and/or implement various types of functions, operations, actions, and/or other features such as, for example, one or more of the following (e.g., or combinations thereof):

- Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (e.g., or combinations thereof):
  - location-based criteria (e.g., geolocation of mobile gaming device, geolocation of EGD, etc.)
  - time-based criteria
  - identity of user(s)
  - user profile information
  - transaction history information
  - recent user activities
  - etc.

Time Synchronization Engine (e.g., 804) which, for example, may be operable to manage universal time synchronization (e.g., via NTP and/or GPS)

Search Engine (e.g., 828) which, for example, may be operable to search for transactions, logs, game history information, player information, hybrid arcade/wager-based game information, etc., which may be accessed from one or more local and/or remote databases.

Configuration Engine (e.g., 832) which, for example, may be operable to determine and handle configuration of various customized configuration parameters for one or more devices, component(s), system(s), process(es), etc.

Time Interpreter (e.g., 818) which, for example, may be operable to automatically and/or dynamically modify or change identifier activation and expiration time(s) based on various criteria such as, for example, time, location, transaction status, etc.

Authentication/Validation Component(s) (e.g., 847) (e.g., password, software/hardware info, SSL certificates) which, for example, may be operable to perform various types of authentication/validation tasks such as one or more of those described and/or referenced herein.

Transaction Processing Engine (e.g., 822) which, for example, may be operable to handle various types of transaction processing tasks such as, for example, one or more of those described and/or referenced herein.

OCR Processing Engine (e.g., 834) which, for example, may be operable to perform image processing and optical character recognition of images such as those captured by a gaming device camera, for example.

Database Manager (e.g., 826) which, for example, may be operable to handle various types of tasks relating to database updating, database management, database access, etc. In at least one embodiment, the Database Manager may be operable to manage game history databases, player tracking databases, etc.

Log Component(s) (e.g., 809) which, for example, may be operable to generate and manage transactions history logs, system errors, connections from APIs, etc.

Status Tracking Component(s) (e.g., 812) which, for example, may be operable to automatically and/or dynamically determine, assign, and/or report updated transaction status information based, for example, on the state of the transaction.

Gateway Component(s) which, for example, may be operable to facilitate and manage communications and transactions with external Payment Gateways.

Web Interface Component(s) (e.g., 808) which, for example, may be operable to facilitate and manage communications and transactions with virtual live electronic gaming device web portal(s).

API Interface(s) to Gaming System Server(s) which, for example, may be operable to facilitate and manage communications and transactions with API Interface(s) to Gaming System Server(s)

API Interface(s) to 3rd Party System Server(s) (e.g., 848) which, for example, may be operable to facilitate and manage communications and transactions with API Interface(s) to 3rd Party System Server(s)

At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (e.g., such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.

Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.

Device driver(s) 842. In at least one implementation, the device driver(s) 842 may include functionality similar to at least a portion of functionality implemented by one or more computer system driver devices such as those described herein and/or generally known to one having ordinary skill in the art.

One or more display(s) 835.

Messaging Server Component(s) 836, which, for example, may be configured or designed to provide various functions and operations relating to messaging activities and communications.

Network Server Component(s) 837, which, for example, may be configured or designed to provide various functions and operations relating to network server activities and communications.

User Account/Profile Manager component(s) 807.

Etc.

Figure 9:
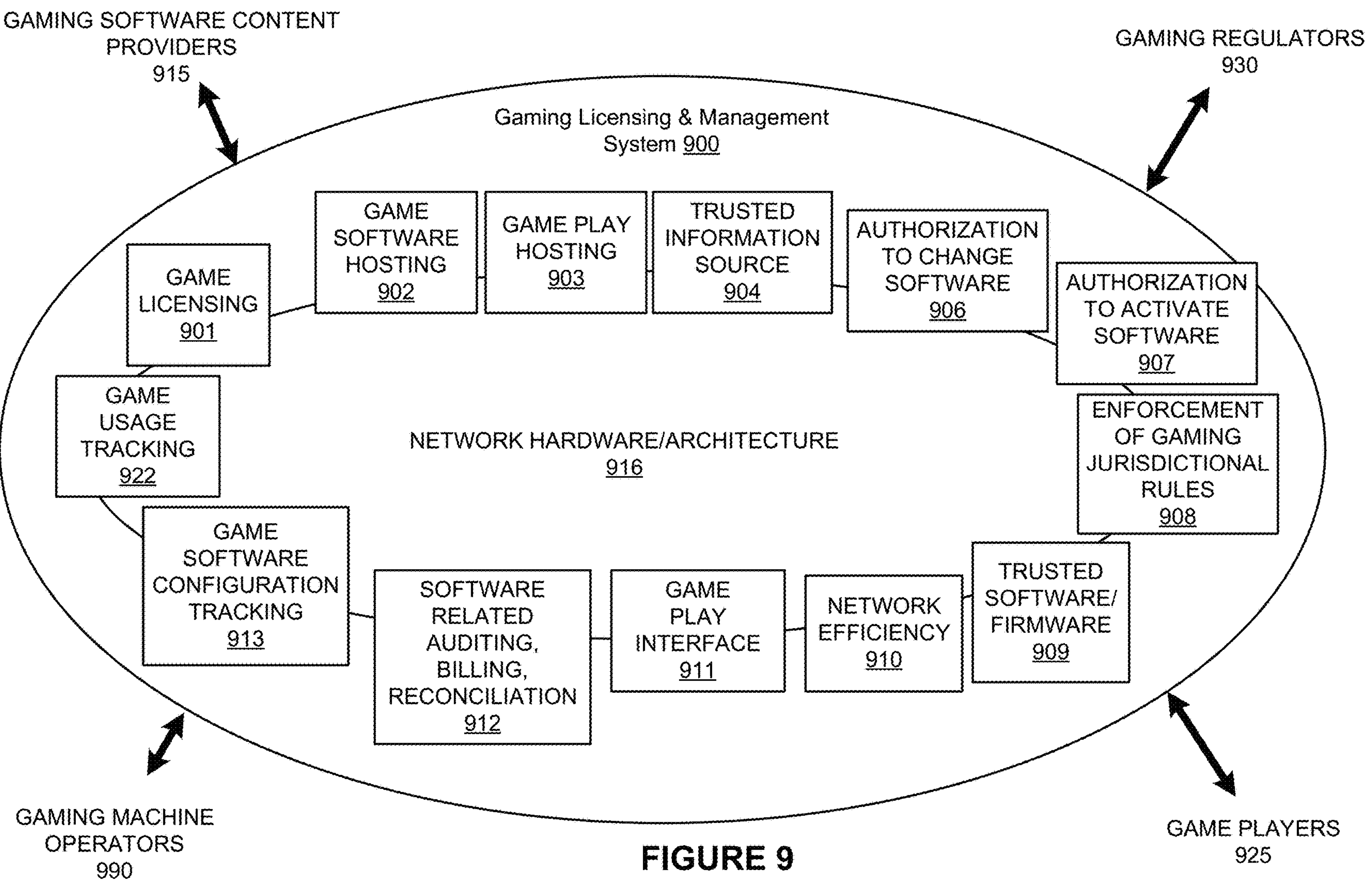
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 9) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 922 may track the usage of game software on a plurality of devices in communication with the host. The game usage-tracking host 922 may be in communication with a plurality of game play hosts and gaming machines. From the game play hosts and gaming machines, the game usage tracking host 922 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min wagers). Details of a game software host and a game software configuration host that may be used with example embodiments are described in co-pending U.S. Pat. No. 6,645,077, by Rowe, titled, "Gaming Terminal Data Repository and Information System," filed December 91, 9000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 9003/0203756, by Jackson, filed on April 95, 9002 and titled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, e.g., game software approved for use on gaming devices by a local gaming jurisdiction may be required on gaming devices on the gaming machine.

In example embodiments, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Figure 14:
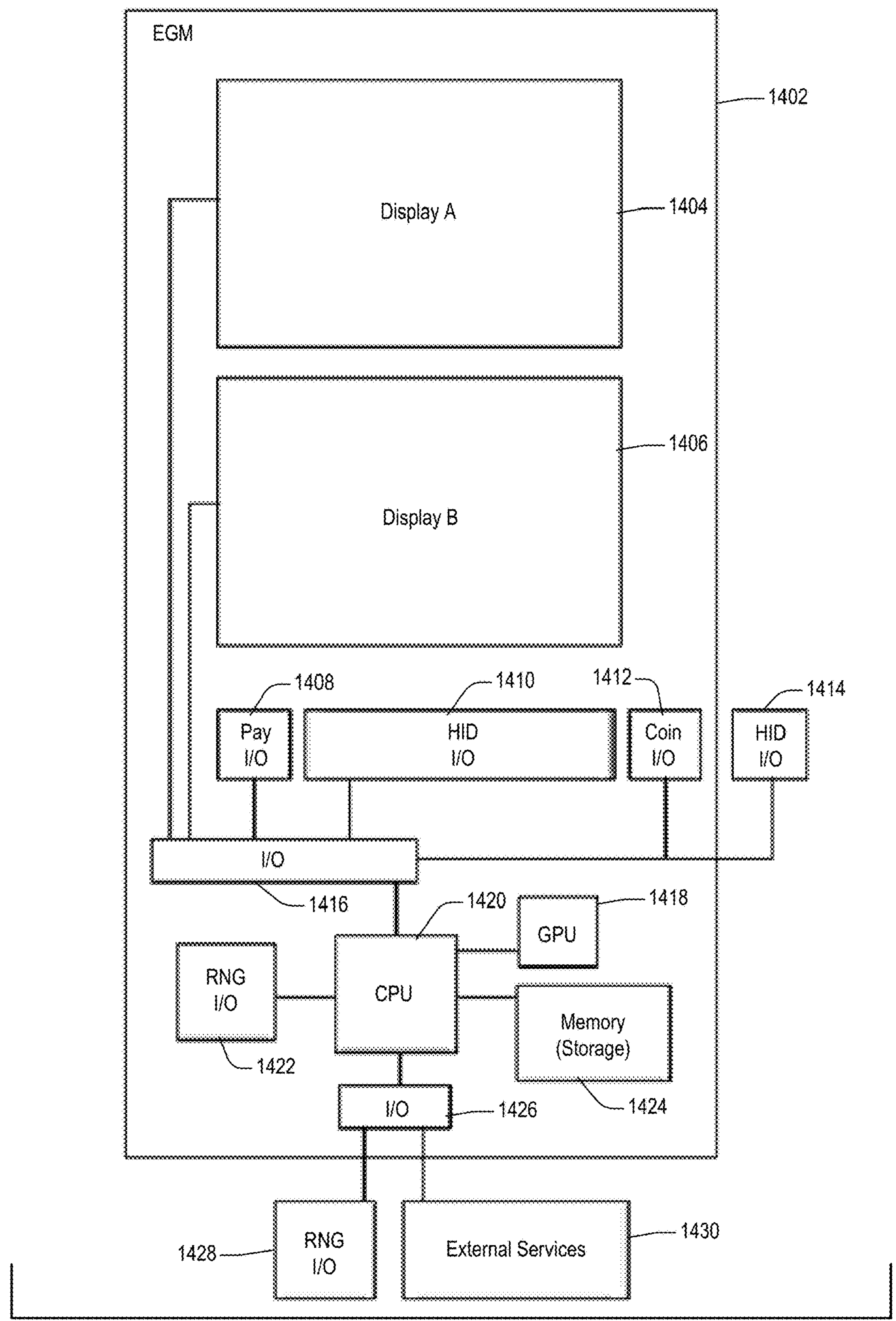
FIG. 14 shows a block diagram of electronic gaming machine (e.g., EGM), in accordance with a specific embodiment.

FIG. 14 shows an example block diagram of an alternate embodiment of an electronic gaming machine which may be configured or designed to implement one or more of the hybrid arcade/wager-based gaming aspects described herein. As illustrated in the example embodiment of FIG. 14, the electronic gaming machine 1400 may include, but are not limited to, one or more of the following component(s) (or combinations thereof):

One or more display(s) (1404, 1406).
HID I/O component(s) (1410, 1414).
Payout I/O component(s) (1408).
Cash/Credit/Coin I/O c component(s) (1412).
CPUs/Processor(s)/Gaming Controller(s) (1420).
Memory (1424).
One or more Graphics Processor(s) (GPU) (1418).
RNG I/O component(s) (1422, 1428).
Other I/O component(s) (1416, 1426).
Interface(s) to one or more External Services (1430).

ADDITIONAL BENEFITS/FEATURES/EMBODIMENTS

Different embodiments of the interactive event outcome reveal techniques described herein may be adapted and implemented in a variety of environments. For example, the interactive event outcome reveal techniques described herein are particularly well suited for deployment in any business establishments that house wager-based gaming devices (e.g., class 3 and/or class 2). Additionally, the interactive event outcome reveal techniques described herein may appeal to younger gamblers/gamers who enjoy playing arcade-style video games, middle aged gamblers/gamers who may have played some video games, and possibly even veteran gamblers who may be bored with existing wager-based video gaming technology.

According to different embodiments, interactive event outcome reveal techniques may be implemented in wager-based games and/or non-wager-based games.

According to different embodiments, the outcomes which are revealed via player interaction may related to wager-based event outcomes and/or non-wager-based event outcomes.

The interactive event outcome reveal techniques described herein provide the ability for patrons of casinos and other gaming establishments to experience new and exciting ways of engaging in wager-based video game play with minimized learning curve and intimidation factors. Additionally, using the interactive event outcome reveal techniques described herein, casinos and other gaming establishments hosting such hybrid arcade/wager-based gaming devices may increase their revenue by ensuring that the number of wager-based gaming event(s) occurring in a hybrid arcade/wager-based game (e.g., during specified time period) meet minimum specified threshold criteria.

One of the benefits of the interactive event outcome reveal techniques described herein is that it provides the ability for traditional video-type wager-based games (such as those deployed at Casino establishments) to be quickly and easily converted to wager-based games which include interactive event outcome reveal functionality, and in a manner which is already compliant with existing rules and regulations governing wager-based gaming, and/or in a manner which may avoid or significantly reduce requirements for additional regulatory approval.

Some benefits and advantages of the interactive event outcome reveal techniques described herein may include, but are not limited to, one or more of the following (e.g., or combinations thereof):

Enabling the utilization of the same (e.g., proven/GLI approved) slot machine back end and RNG for gambling functionality.
Enables new and unique ways to display a slot machine gambling game to specific demographics based on gameplay type and/or theme.
May increase overall house gambling demographics, revealing untapped markets, more profits, more coin-ins & more "butts in seats."
Deployment of interactive event outcome reveal techniques in wager-based games may be purposefully configured or designed to avoid (or to not require) any additional regulatory approval for deployment in Casino venues.
Etc.

The various interactive event outcome reveal techniques described herein may be used to improve the visual relationship between player and machine to increase player immersion and facilitate longer more exciting gambling durations without providing a completely new back-end delivery structure. It also improves the player method of interaction with the gambling game by allowing for a plethora of new age interface devices to be coupled with specific themed games (e.g., guns, joysticks, controllers, etc.). Existing technology and gameplay, although proven, is becoming dated and "not as fun" to younger players. The interactive event outcome reveal techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate. The interactive event outcome reveal techniques described herein may also be utilized for enabling enhanced slot machine gambling with new and exciting twists, while still being compliant with local/state/Federal gaming regulations.

In at least some embodiments, wager-based games supporting interactive event outcome reveal techniques may be developed using regulatory (e.g., GLI) approved third party engines such as, for example (Unreal, Unity) accompanied by a complex series of blueprints and code which, when compiled, creates a packaged executable ready for storage on a gaming machine, system, and/or device.

The present application herein incorporates by reference, in its entirety and for all purposes, U.S. patent application Ser. No. 14/865,538 titled "HYBRID ARCADE-TYPE, WAGER-BASED GAMING TECHNIQUES AND PREDETERMINED RNG OUTCOME BATCH RETRIEVAL TECHNIQUES" by Washington et al., filed on 25 Sep. 2015.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented system for facilitating user interaction with interactive digital content displayed via a computer network, the computer network including a first electronic, wager-based gaming device ("first EGD"), the first EGD including a first display and a first input device, the system comprising:

at least one processor;

at least one memory;

the at least one processor being operable to execute a plurality of instructions stored in the at least one memory to cause at least one component of the computer network to:

display, at the first display, a first game graphical user interface ("first game GUI") configured to enable a player to engage in interactive game play of a wager-based game at the first EGD, the first game GUI including a first wager-based game GUI portion;

store in the at least one memory a first plurality of data structures populated with interactive reveal content, including a first portion of interactive reveal content and a second portion of interactive reveal content;

store in the at least memory a second plurality of data structures populated with content relating to the wager-based game, including a plurality of symbols including a first symbol having a first value or identity associated therewith, and including a second symbol having a second value or identity associated therewith;

initiate a first wager-based game event at the first wager-based game GUI portion, wherein the first wager-based game event corresponds to a spin of a virtual slot reel;

dynamically determine a first outcome of the first wager-based game event, the first outcome having associated therewith a first set of symbols including the first symbol;

display, at the first game GUI, a first portion of layered content, the first portion of layered content including a background layer configured to display event outcome graphical content representing the first outcome of the first wager-based game event, including a first portion of event outcome graphical content representing the first value or identity of the first symbol, the first portion of layered content further including a foreground layer configured to display a first portion of interactive reveal content;

cause the first portion of layered content to be presented at the first display in a manner such that the first portion of event outcome graphical content representing the first value or identity of the first symbol is hidden or obscured by the first portion of interactive reveal content displayed at the foreground layer, thereby preventing or obscuring visual observation of the first value or identity of the first symbol by the player;

display, at the first game GUI, a second portion of layered content, the second portion of layered content including a third portion of content displayed at the background layer, and including a second portion of interactive reveal content displayed at the foreground layer;

cause the second portion of layered content to be presented at the first display in a manner such that the third portion of content is hidden or obscured by the second portion of interactive reveal content displayed at the foreground layer, thereby preventing or obscuring visual observation of the third portion of content by the player;

detect that the player has engaged in a first interaction activity with the second portion of interactive reveal content displayed at the foreground layer; and in response to detecting that the player has engaged in the first interaction activity with the second portion of interactive reveal content, modify or remove the first portion of interactive reveal content in a manner so as to cause the first portion of event outcome graphical content representing the first value or identity of the first symbol to be visually observable to the player.

2. The computer implemented system of claim 1 wherein the foreground layer is implemented as an overlay layer.

3. The computer implemented system of claim 1 wherein the second portion of interactive reveal content is different from the first portion of interactive reveal content displayed at the foreground layer.

4. The computer implemented system of claim 1 further comprising a random number generator engine ("RNG engine"), the system being further operable to cause the at least one processor to execute additional instructions to:

determine the first outcome of the first wager-based game event using the RNG engine.

5. The computer implemented system of claim 1 being further operable to cause the at least one processor to execute instructions stored in the at least one memory to:

cause the first portion of event outcome graphical content representing the first value or identity of the first symbol to be included in the background layer before the player has engaged in the first interaction activity with the second portion of interactive reveal content.

6. The computer implemented system of claim 1 being further operable to cause the at least one processor to execute instructions stored in the at least one memory to:

maintain the hiding or obscuring of the first value or identity of the first symbol until a first condition has been detected at the first EGD; and wherein the first condition corresponds to determining that the player has performed the first interaction activity with the second portion of interactive reveal content.

7. The computer implemented system of claim 1, wherein the first display is configured as a touchscreen display, and wherein the first interaction activity includes a first interaction involving the player touching a region of the touchscreen display where the second portion of interactive reveal content is displayed.

8. The computer implemented system of claim 1, wherein the first interaction activity with the second portion of interactive reveal content does not influence the first outcome of the first wager-based game event.

9. The computer implemented system of claim 1, wherein the first interaction activity with the second portion of interactive reveal content influences the first outcome of the first wager-based game event.

10. The computer implemented system of claim 1, wherein the first interaction activity with the second portion of interactive reveal content influences a payout or win amount associated with the first wager-based game event.

11. The computer implemented system of claim 1, wherein the first interaction activity with the second portion of interactive reveal content does not influence a payout or win amount associated with the first wager-based game event.

12. The computer implemented system of claim 1, wherein the first EGD includes a first bill or ticket acceptor, the system being further operable to cause the at least one processor to execute instructions stored in the at least one memory to:

establish an account balance using at least a portion of cash or credit received via the first bill or ticket acceptor; and automatically fund an amount wagered on the first wager-based game event using the account balance.

13. A computer implemented method for facilitating user interaction with interactive digital content displayed via a computer network, the computer network including a first electronic, wager-based gaming device ("first EGD"), the first EGD including a first display and a first input device, the method comprising causing at least one processor to execute a plurality of instructions stored in at least one memory to cause at least one component of the computer network to:

display, at the first display, a first game graphical user interface ("first game GUI") configured to enable a player to engage in interactive game play of a wager-based game at the first EGD, the first game GUI including a first wager-based game GUI portion;

store in the at least one memory a first plurality of data structures populated with interactive reveal content, including a first portion of interactive reveal content and a second portion of interactive reveal content;

store in the at least one memory a second plurality of data structures populated with content relating to the wager-based game, including a plurality of symbols including a first symbol having a first value or identity associated therewith, and including a second symbol having a second value or identity associated therewith;

initiate a first wager-based game event at the first wager-based game GUI portion, wherein the first wager-based game event corresponds to a spin of a virtual slot reel;

dynamically determine a first outcome of the first wager-based game event, the first outcome having associated therewith a first set of symbols including the first symbol;

display, at the first game GUI, a first portion of layered content, the first portion of layered content including a background layer configured to display event outcome graphical content representing the first outcome of the first wager-based game event, including a first portion of event outcome graphical content representing the first value or identity of the first symbol, the first portion of layered content further including a foreground layer configured to display a first portion of interactive reveal content;

cause the first portion of layered content to be presented at the first display in a manner such that the first portion of event outcome graphical content representing the first value or identity of the first symbol is hidden or obscured by the first portion of interactive reveal content displayed at the foreground layer, thereby preventing or obscuring visual observation of the first value or identity of the first symbol by the player;

display, at the first game GUI, a second portion of layered content, the second portion of layered content including a third portion of content displayed at the background layer, and including a second portion of interactive reveal content displayed at the foreground layer;

cause the second portion of layered content to be presented at the first display in a manner such that the third portion of content is hidden or obscured by the second portion of interactive reveal content displayed at the foreground layer, thereby preventing or obscuring visual observation of the third portion of content by the player;

detect that the player has engaged in a first interaction activity with the second portion of interactive reveal content displayed at the foreground layer; and in response to detecting that the player has engaged in the first interaction activity with the second portion of interactive reveal content, modify or remove the first portion of interactive reveal content in a manner so as to cause the first portion of event outcome graphical content representing the first value or identity of the first symbol to be visually observable to the player.

14. The computer implemented method of claim 13 wherein the foreground layer is implemented as an overlay layer.

15. The computer implemented method of claim 13 wherein the second portion of interactive reveal content is different from the first portion of interactive reveal content displayed at the foreground layer.

16. The computer implemented method of claim 13 further comprising a random number generator engine ("RNG engine"), the method further comprising causing the at least one processor to execute additional instructions to:

determine the first outcome of the first wager-based game event using the RNG engine.

17. The computer implemented method of claim 13 further comprising causing the at least one processor to execute instructions stored in the at least one memory to:

cause the first portion of event outcome graphical content representing the first value or identity of the first symbol to be included in the background layer before the player has engaged in the first interaction activity with the second portion of interactive reveal content.

18. A non-transitory computer usable medium for use in a computer network, the computer network including a first electronic, wager-based gaming device ("first EGD"), the first EGD including a first display and a first input device, the computer usable medium having computer readable code embodied therein, the computer readable code comprising computer code for causing at least one processor to execute instructions stored in at least one memory to:

display, at the first display, a first game graphical user interface ("first game GUI") configured to enable a player to engage in interactive game play of a wager-based game at the first EGD, the first game GUI including a first wager-based game GUI portion;

store in the at least one memory a first plurality of data structures populated with interactive reveal content, including a first portion of interactive reveal content and a second portion of interactive reveal content;

store in the at least one memory a second plurality of data structures populated with content relating to the wager-based game, including a plurality of symbols including a first symbol having a first value or identity associated therewith, and including a second symbol having a second value or identity associated therewith;

initiate a first wager-based game event at the first wager-based game GUI portion, wherein the first wager-based game event corresponds to a spin of a virtual slot reel;

dynamically determine a first outcome of the first wager-based game event, the first outcome having associated therewith a first set of symbols including the first symbol;

display, at the first game GUI, a first portion of layered content, the first portion of layered content including a background layer configured to display event outcome graphical content representing the first outcome of the first wager-based game event, including a first portion of event outcome graphical content representing the first value or identity of the first symbol, the first portion of layered content further including a foreground layer configured to display a first portion of interactive reveal content;

cause the first portion of layered content to be presented at the first display in a manner such that the first portion of event outcome graphical content representing the first value or identity of the first symbol is hidden or obscured by the first portion of interactive reveal content displayed at the foreground layer, thereby preventing or obscuring visual observation of the first value or identity of the first symbol by the player;

display, at the first game GUI, a second portion of layered content, the second portion of layered content including a third portion of content displayed at the background layer, and including a second portion of interactive reveal content displayed at the foreground layer;

cause the second portion of layered content to be presented at the first display in a manner such that the third portion of content is hidden or obscured by the second portion of interactive reveal content displayed at the foreground layer, thereby preventing or obscuring visual observation of the third portion of content by the player;

detect that the player has engaged in a first interaction activity with the second portion of interactive reveal content displayed at the foreground layer; and in response to detecting that the player has engaged in the first interaction activity with the second portion of interactive reveal content, modify or remove the first portion of interactive reveal content in a manner so as to cause the first portion of event outcome graphical content representing the first value or identity of the first symbol to be visually observable to the player.

* * * * *